(12) United States Patent
Takeuchi et al.

(10) Patent No.: US 11,016,494 B2
(45) Date of Patent: May 25, 2021

(54) FUEL EFFICIENCY ESTIMATION SYSTEM, FUEL EFFICIENCY ESTIMATION METHOD, AND COMPUTER READABLE MEDIUM

(71) Applicant: Mitsubishi Electric Corporation, Tokyo (JP)

(72) Inventors: Tomoharu Takeuchi, Tokyo (JP); Norimitsu Nagashima, Tokyo (JP); Takeshi Takeuchi, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 258 days.

(21) Appl. No.: 16/323,887

(22) PCT Filed: Sep. 29, 2016

(86) PCT No.: PCT/JP2016/078945
§ 371 (c)(1),
(2) Date: Feb. 7, 2019

(87) PCT Pub. No.: WO2018/061164
PCT Pub. Date: Apr. 5, 2018

(65) Prior Publication Data
US 2019/0212748 A1  Jul. 11, 2019

(51) Int. Cl.
*G05D 1/02* (2020.01)
*G08G 1/0968* (2006.01)
(Continued)

(52) U.S. Cl.
CPC .............. *G05D 1/0217* (2013.01); *B60L 3/00* (2013.01); *B60R 16/0236* (2013.01);
(Continued)

(58) Field of Classification Search
CPC ....... B60L 3/00; B60R 16/0236; G01C 21/26; G01C 21/34; G05D 1/0217; G05D 1/0268;
(Continued)

(56) References Cited

U.S. PATENT DOCUMENTS 6,055,488 A   4/2000  Nakajima
8,972,145 B2  3/2015  Mahler et al.
(Continued)

FOREIGN PATENT DOCUMENTS

JP   9-73593 A   3/1997
JP   9-79883 A   3/1997
(Continued)

OTHER PUBLICATIONS

Author Unknown, "Purposes and Present Situations at Speed Control", National Police Agency, Traffic Bureau, Aug. 28, 2013, pp. 1-19, with a partial English translation (21 pages total).
(Continued)

*Primary Examiner* — Khoi H Tran
*Assistant Examiner* — Shahzab Hussain Shah
(74) *Attorney, Agent, or Firm* — Birch, Stewart, Kolasch & Birch, LLP

(57) ABSTRACT

A fuel efficiency estimation system includes a traveling velocity calculation unit (233) to store a link traveling velocity (331) for each link as a road section configuring a road in a traveling velocity DB (252) and a traveling velocity extraction unit (243) to extract, based on a traveling route (411), a link traveling velocity (331) on a link included in the traveling route (411) from the traveling velocity DB (252). The fuel efficiency estimation system also includes a velocity profile generation unit (244) to generate a velocity profile (441) indicating a change in velocity of a motor vehicle traveling the traveling route (411) by using the link traveling (Continued)

velocity (331) and an estimated fuel efficiency calculation unit (246) to calculate fuel efficiency of the motor vehicle traveling the traveling route (411) based on the velocity profile (441).

14 Claims, 30 Drawing Sheets

(51) Int. Cl.
*G08G 1/01* (2006.01)
*B60R 16/023* (2006.01)
*B60L 3/00* (2019.01)
*G08G 1/00* (2006.01)
*G01C 21/26* (2006.01)

(52) U.S. Cl.
CPC .......... *G01C 21/26* (2013.01); *G05D 1/0268* (2013.01); *G08G 1/00* (2013.01); *G08G 1/0129* (2013.01); *G08G 1/096827* (2013.01); *G08G 1/096833* (2013.01); *Y02T 90/14* (2013.01); *Y02T 90/16* (2013.01)

(58) Field of Classification Search
CPC ... G08G 1/00; G08G 1/0129; G08G 1/096833
See application file for complete search history.

(56) References Cited

U.S. PATENT DOCUMENTS

| | | | |
|---|---|---|---|
| 8,972,162 B1* | 3/2015 | Koebler | G08G 1/096844 701/123 |
| 2008/0208441 A1 | 8/2008 | Cheung | |
| 2010/0049397 A1* | 2/2010 | Liu | G01C 21/3469 701/31.4 |
| 2010/0114473 A1 | 5/2010 | Kono et al. | |
| 2010/0145600 A1 | 6/2010 | Son et al. | |
| 2011/0106419 A1 | 5/2011 | Kim | |
| 2011/0153202 A1 | 6/2011 | Sengoku et al. | |
| 2011/0160990 A1 | 6/2011 | Mineta | |
| 2011/0160993 A1 | 6/2011 | Tsurutani et al. | |
| 2011/0320115 A1 | 12/2011 | Oh et al. | |
| 2012/0185162 A1 | 7/2012 | Ishido | |
| 2012/0185169 A1 | 7/2012 | Sengoku et al. | |
| 2013/0006508 A1 | 1/2013 | Li et al. | |
| 2013/0013164 A1* | 1/2013 | Taguchi | B60W 50/0097 701/96 |
| 2013/0253810 A1* | 9/2013 | Miyajima | G08G 1/0133 701/118 |
| 2013/0304347 A1* | 11/2013 | Davidson | G08G 1/052 701/99 |
| 2014/0365105 A1 | 12/2014 | Kono et al. | |
| 2015/0248795 A1* | 9/2015 | Davidson | G01C 21/34 701/1 |
| 2016/0187146 A1* | 6/2016 | He | G01C 21/30 701/532 |
| 2017/0138751 A1* | 5/2017 | Martyniv | G06Q 10/02 |
| 2018/0238696 A1 | 8/2018 | Takeda | |

FOREIGN PATENT DOCUMENTS

| | | |
|---|---|---|
| JP | 10-26535 A | 1/1998 |
| JP | 2001-183150 A | 7/2001 |
| JP | 2002-193027 A | 7/2002 |
| JP | 2004-248455 A | 9/2004 |
| JP | 2005-91112 A | 4/2005 |
| JP | 2005-184867 A | 7/2005 |
| JP | 2007-94703 A | 4/2007 |
| JP | 2009-31046 A | 2/2009 |
| JP | 2009-70101 A | 4/2009 |
| JP | 2009-110042 A | 5/2009 |
| JP | 2009-193425 A | 8/2009 |
| JP | 2010-48781 A | 3/2010 |
| JP | 2010-54385 A | 3/2010 |
| JP | 2010-107459 A | 5/2010 |
| JP | 2010-520454 A | 6/2010 |
| JP | 2010-164360 A | 7/2010 |
| JP | 2011-95251 A | 5/2011 |
| JP | 2011-232146 A | 11/2011 |
| JP | 2012-8113 A | 1/2012 |
| JP | 2013-72660 A | 4/2013 |
| JP | 2013-205348 A | 10/2013 |
| JP | 2014-32544 A | 2/2014 |
| JP | 2014-106068 A | 6/2014 |
| JP | 2014-106675 A | 6/2014 |
| WO | WO 2011/080881 A1 | 7/2011 |
| WO | WO 2011/101949 A1 | 8/2011 |
| WO | WO 2011/114582 A1 | 9/2011 |

OTHER PUBLICATIONS

International Search Report (PCT/ISA/210) issued is PCT/JP2016/078943, dated Jan. 10, 2017, with English translation.
International Search Report (PCT/ISA/210) issued in PCT/JP2016/078944, dated Jan. 10, 2017, with English translation.
International Search Report (PCT/ISA/210) issued in PCT/JP2016/078945, dated Jan. 10, 2017, with English translation.
Office Action issued in Japanese Patent Application No. 2017-516811, dated May 9, 2017, with English translation.
Office Action issued in Japanese Patent Application No. 2017-516818, dated May 9, 2017, with English translation.
Office Action issued in Japanese Patent Application No. 2017-516820, dated May 9, 2017, with English translation.
U.S. Notice of Allowance dated, Feb. 20, 2020, for U.S. Appl. No. 16/323,881.
U.S. Office Action, dated Sep. 29, 2020, for U.S. Appl. No. 16/323,881.
Office Action dated Feb. 5, 2021 for Copending U.S. Appl. No. 16/324,046.

* cited by examiner

Fig. 7

60: VELOCITY CATEGORY JUDGMENT TABLE

| VELOCITY CATEGORY | REGION | NUMBER OF LANES | MEDIAN STRIP | VOLUME OF PEDESTRIAN TRAFFIC | REFERENCE VELOCITY |
|---|---|---|---|---|---|
| 1 | URBAN DISTRICT | 2 | NONE | LARGE | 40 km/h |
| 2 | | | | SMALL | 50 km/h |
| 3 | | 4 OR MORE | PRESENT | LARGE | 50 km/h |
| 4 | | | | SMALL | 60 km/h |
| 5 | | | NONE | LARGE | 50 km/h |
| 6 | | | | SMALL | 50 km/h |
| 7 | NON-URBAN DISTRICT | 2 | NONE | LARGE | 50 km/h |
| 8 | | | | SMALL | 60 km/h |
| 9 | | 4 OR MORE | PRESENT | LARGE | 60 km/h |
| 10 | | | | SMALL | 60 km/h |
| 11 | | | NONE | LARGE | 50 km/h |
| 12 | | | | SMALL | 60 km/h |

FUEL EFFICIENCY ESTIMATION SYSTEM, FUEL EFFICIENCY ESTIMATION METHOD, AND COMPUTER READABLE MEDIUM

TECHNICAL FIELD

The present invention relates to fuel efficiency estimation systems, fuel efficiency estimation methods, and fuel efficiency estimation programs, which estimate traveling fuel efficiency of a motor vehicle. In particular, the present invention relates to technology of estimating traveling fuel efficiency of a motor vehicle with high accuracy by estimating with a high accuracy a velocity profile indicating a change in actual traveling velocity when the motor vehicle travels a specific traveling route.

BACKGROUND ART

In recent years, EVs (Electric Vehicles), HEVs (Hybrid Electric Vehicles), and PHEVs (plug-in Hybrid Electric Vehicles) have become increasingly widespread. With these becoming widespread, for the purpose of an increase in distance that can be traveled by motor vehicles and an improvement in fuel efficiency, technical developments have been made for optimization of a traveling plan with low fuel efficiency, such as switching between electric driving and gasoline driving.

In making this traveling plan with low fuel efficiency, it is required to estimate motor-vehicle traveling fuel efficiency when traveling a specific traveling route. As for a technique of estimating motor-vehicle traveling fuel efficiency, for example, as in Patent Literature 1, a scheme of performing estimation of fuel efficiency with high accuracy by utilizing vehicle traveling history information has been suggested.

Note that as for motor-vehicle traveling velocity, as disclosed in Non-Patent Literature 1, establishment of speed limits has been underway by introducing reference velocity. The reference velocity is a velocity as a uniform reference for speed limits all over the country by adding a viewpoint of reduction of traffic accidents to the 85th percentile speed, which is an effective speed, in order to reconsider speed control in accordance with road traffic environments and so forth.

CITATION LIST

Patent Literature

Patent Literature 1: JP 2005-91112

Non-Patent Literature

Non-Patent Literature 1: National Police Agency, Traffic Bureau, "Purposes and Present Situations of Speed Control", Aug. 28, 2013, https://www.npa.go.jp/koutsuu/kikaku/regulation_wg/1/siryou4.pdf

SUMMARY OF INVENTION

Technical Problem

In the scheme according to Patent Literature 1, the size of each divisional section of the road is changed in accordance with the amount of collection of vehicle traveling history information, and a traveling velocity pattern is stored. Accuracy of estimation of motor-vehicle traveling fuel efficiency by this scheme largely depends on the amount of collection of vehicle traveling history information. Each divisional section is increased on a new road and a road from which vehicle traveling history information is difficult to be collected. When the divisional section is increased, reproduction cannot be made if the traveling velocity pattern actually changes finely, and reproduction accuracy is degraded. In particular, on ordinary roads, it is difficult to collet vehicle traveling history information compared with expressways, because of differences in the number of road lanes, space between intersections, speed limits, and so forth, and it is difficult to enhance accuracy of reproducing the traveling velocity pattern.

The present invention relates to estimation of traveling fuel efficiency of a motor vehicle, and has an object of enhancing accuracy of reproducing a traveling velocity even on a new road and a road from which traveling history information is difficult to be collected to insure estimation accuracy of traveling fuel efficiency.

Solution to Problem

A fuel efficiency estimation system according to the present invention includes: a traveling velocity calculation unit to calculate a traveling velocity of a motor vehicle for each of a plurality of road sections configuring a road and to store the calculated traveling velocity in a traveling velocity storage unit;

a traveling velocity extraction unit to extract, based on traveling route information indicating a traveling route on the road, a traveling velocity in a road section included in the traveling route from the traveling velocity storage unit;

a velocity profile generation unit to generate a velocity profile indicating a change in velocity of the motor vehicle traveling the traveling route by using the traveling velocity extracted by the traveling velocity extraction unit; and an estimated fuel efficiency calculation unit to calculate fuel efficiency of the motor vehicle traveling the traveling route based on the velocity profile.

Advantageous Effects of Invention

According to the fuel efficiency estimation system of the present invention, the traveling velocity calculation unit calculates a traveling velocity of a motor vehicle for each of the plurality of road sections configuring a road, and stores the calculated traveling velocity in the traveling velocity storage unit. Also, the traveling velocity extraction unit extracts, based on the traveling route, a traveling velocity in a road section included in the traveling route from the traveling velocity storage unit. Also, the velocity profile generation unit generates a velocity profile indicating a change in velocity of the motor vehicle traveling the traveling route by using the traveling velocity extracted by the traveling velocity extraction unit. Then, the estimated fuel efficiency calculation unit calculates fuel efficiency of the motor vehicle traveling the traveling route based on the velocity profile. Thus, it is possible to enhance accuracy of reproducing a traveling velocity even on a new road and a road from which traveling history information is difficult to be collected to insure estimation accuracy of traveling fuel efficiency.

BRIEF DESCRIPTION OF DRAWINGS

FIG. 7 illustrates a structure of a velocity category judgment table 60 according to Embodiment 1.

DESCRIPTION OF EMBODIMENTS

Figure 1:
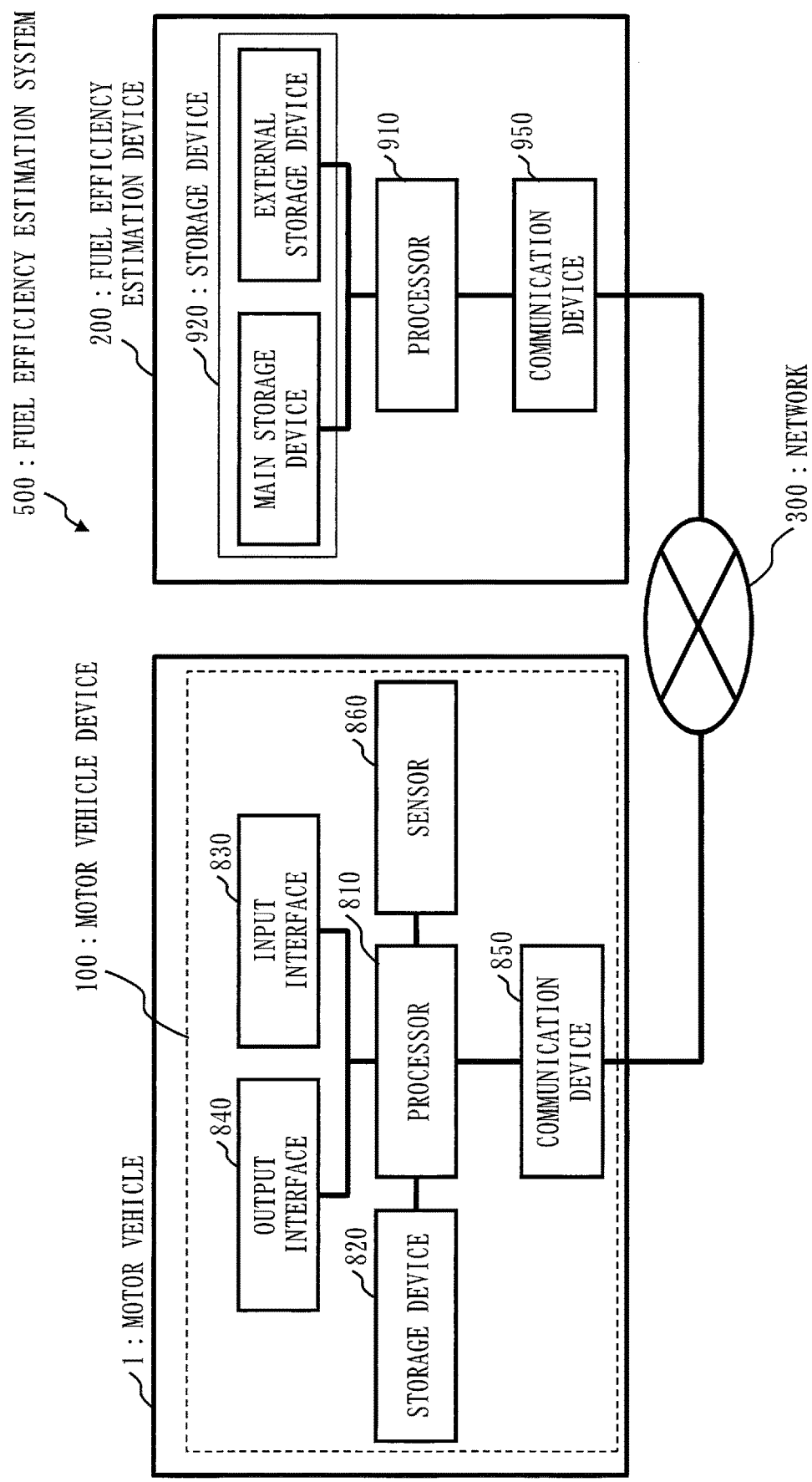
FIG. 1 illustrates an entire structure of a fuel efficiency estimation system 500 according to Embodiment 1.

In the following, embodiments of the present invention are described by using the drawings. In each drawing, identical or equivalent portions are provided with a same reference character. In the description of the embodiments, description of identical or equivalent portions is omitted or simplified as appropriate.

Embodiment 1

*Description of Structure*

Figure 2:
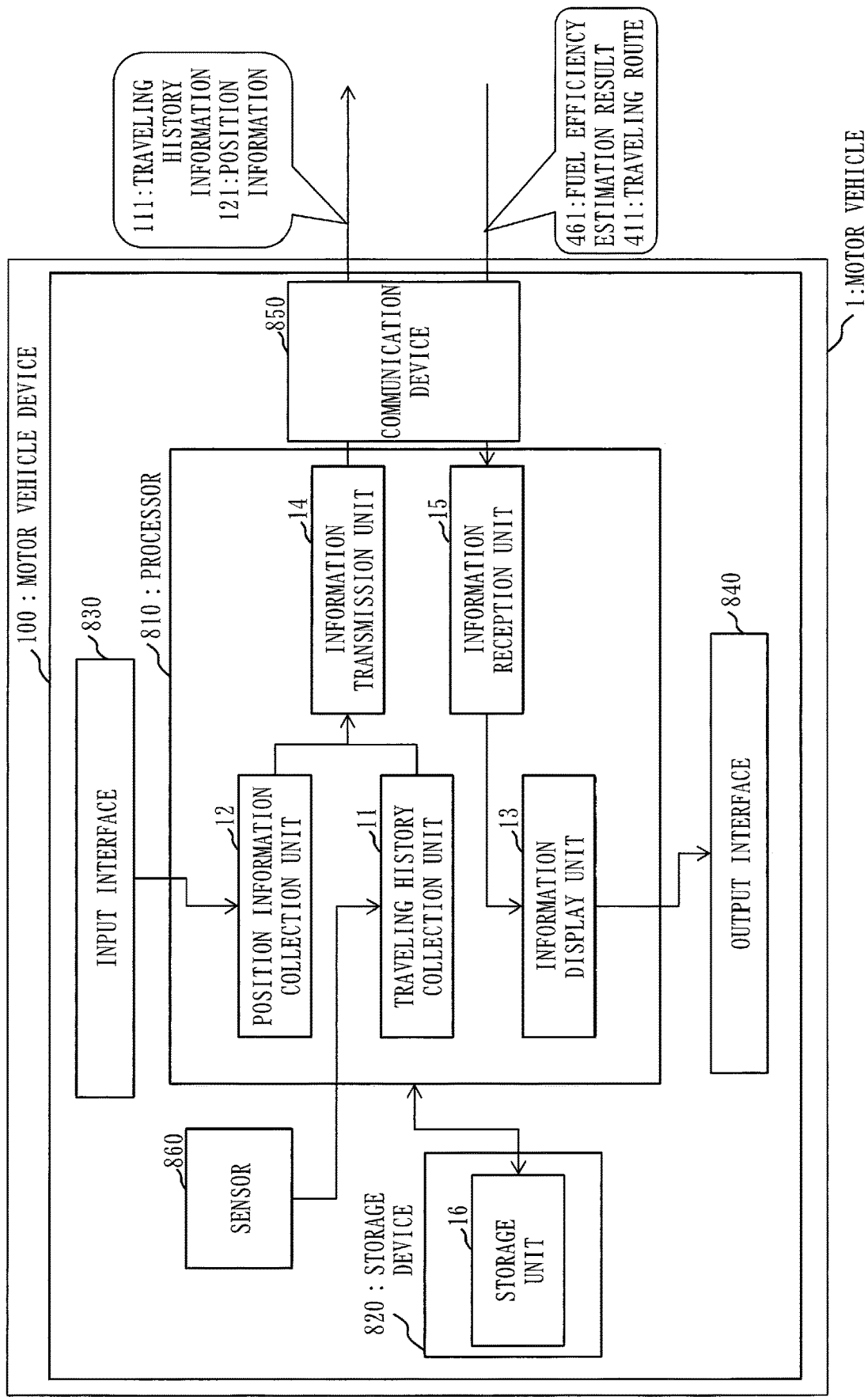
FIG. 2 illustrates a structure of a motor vehicle device 100 mounted on a motor vehicle 1 according to Embodiment 1.
Figure 3:
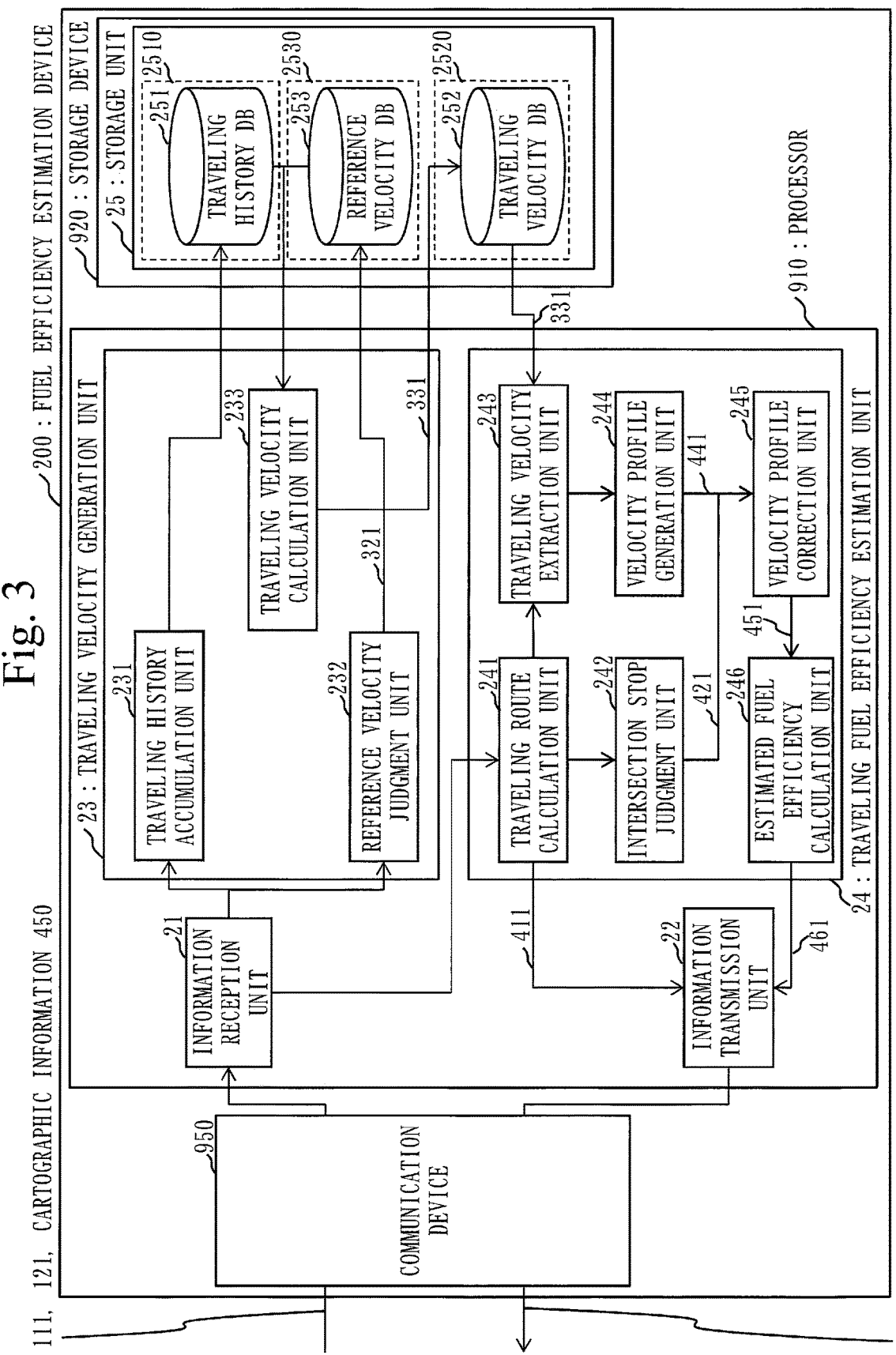
FIG. 3 illustrates a structure of a fuel efficiency estimation device 200 according to Embodiment 1.

FIG. 1 illustrates an entire structure of a fuel efficiency estimation system 500 according to the present embodiment. FIG. 2 illustrates a structure of a motor vehicle device 100 mounted on a motor vehicle 1 according to the present embodiment. FIG. 3 illustrates a structure of a fuel efficiency estimation device 200 according to the present embodiment. FIG. 1 also illustrates a hardware structure of each device configuring the fuel efficiency estimation system 500.

As illustrated in FIG. 1, the fuel efficiency estimation system 500 includes the motor vehicle device 100 mounted on the motor vehicle 1 as a fuel efficiency estimation target and the fuel efficiency estimation device 200 which communicates with the motor vehicle device 100 via a network 300.

The motor vehicle device 100 is a computer mounted on the motor vehicle 1. The motor vehicle 1 is a vehicle traveling by using fuel.

The fuel efficiency estimation device 200 is a computer. The fuel efficiency estimation device 200 estimates motor-vehicle traveling fuel efficiency of the motor vehicle 1 on a specific traveling route. In the following, the motor-vehicle traveling fuel efficiency is also referred to as traveling fuel efficiency or fuel efficiency. The fuel efficiency estimation device 200 is also referred to as a central server. The fuel efficiency estimation device 200 may be a substantial data server or may be configured in the cloud.

As illustrated in FIG. 2, the motor vehicle device 100 includes a processor 810 and other hardware such as a storage device 820, an input interface 830, an output interface 840, a communication device 850, and a sensor 860. The storage device 820 has a memory and an auxiliary storage device.

As illustrated in FIG. 2, the motor vehicle device 100 includes, as functional structures, a traveling history collection unit 11, a position information collection unit 12, an information display unit 13, an information transmission unit 14, an information reception unit 15, and a storage unit 16.

In the following description, the functions of the traveling history collection unit 11, the position information collection unit 12, the information display unit 13, the information transmission unit 14, and the information reception unit 15 of the motor vehicle device 100 are referred to as functions of "units" of the motor vehicle device 100.

The functions of the "units" of the motor vehicle device 100 are implemented by software.

The storage unit 16 is implemented by the storage device 820. Various types of information to be displayed via the output interface 840 on a display, position information 121 received from the input device via the input interface 830, the process results by the processor 810, and so forth are stored in the storage unit 16.

The sensor 860 collects traveling history information 111 such as a traveling position, traveling velocity, and traveling direction of the motor vehicle 1.

Also as illustrated in FIG. 3, the fuel efficiency estimation device 200 includes a processor 910 and other hardware such as a storage device 920 and a communication device 950. Note that the fuel efficiency estimation device 200 may include hardware such as an input interface or an output interface.

As illustrated in FIG. 3, the fuel efficiency estimation device 200 includes, as functional structures, an information reception unit 21, an information transmission unit 22, a traveling velocity generation unit 23, a traveling fuel efficiency estimation unit 24, and a storage unit 25. The traveling velocity generation unit 23 includes a traveling history accumulation unit 231, a reference velocity judgment unit 232, and a traveling velocity calculation unit 233. Also, the traveling fuel efficiency estimation unit 24 includes a traveling route calculation unit 241, an intersection stop judgment unit 242, a traveling velocity extraction unit 243, a velocity profile generation unit 244, a velocity profile correction unit 245, and an estimated fuel efficiency calculation unit 246. Also, a traveling history DB (database) 251, a traveling velocity DB 252, and a reference velocity DB 253 are stored in the storage unit 25. Also, values and results of the respective arithmetic operation processes regarding fuel efficiency estimation are stored in the storage unit 25. The traveling history DB 251 is an example of a traveling history storage unit 2510. The traveling velocity DB 252 is an example of a traveling velocity storage unit 2520. The reference velocity DB 253 is an example of a reference velocity storage unit 2530.

In the following description, the functions of the traveling velocity generation unit 23 and the traveling fuel efficiency estimation unit 24 of the fuel efficiency estimation device 200 are referred to as functions of "units" of the fuel efficiency estimation device 200.

The functions of the "units" of the fuel efficiency estimation device 200 are implemented by software.

The storage unit 25 is implemented by the storage device 920.

In the following, a specific example of hardware of each of the motor vehicle device 100 and the fuel efficiency estimation device 200 is described.

The processor 810, 910 is connected to other hardware via a signal line to control the other hardware.

The processor 810, 910 is an IC (Integrated Circuit) for processing. The processor 810, 910 is specifically a CPU (Central Processing Unit) or the like.

The input interface 830 is a port connected to an input device such as a mouse, keyboard, or touch panel. The input interface 830 is specifically a USB (Universal Serial Bus) terminal. Note that the input interface 830 may be a port connected to a LAN (Local Area Network).

The output interface 840 is a port to which a cable of a display device such as a display is connected. The output interface 840 is, for example, a USB terminal or HDMI (registered trademark) (High Definition Multimedia Interface) terminal. The display is specifically an LCD (Liquid Crystal Display). In the motor vehicle device 100, the information display unit 13 causes information to be displayed on the display device such as a display of the motor vehicle 1 via the output interface 840. The information display unit 13 causes various types of information such as a traveling route 411 and a fuel efficiency estimation result 461 to be displayed on the display device via the output interface 840 for display and transmission to a driver.

The communication device 850, 950 includes a receiver and a transmitter. Specifically, the communication device 850, 950 is a communication chip or NIC (Network Interface Card). The communication device 850, 950 functions as a communication unit which communicates data. The receiver functions as a reception unit which receives data, and the transmitter functions as a transmission unit which transmits data. The communication device 850, 950 transmits and receives various types of information such as the traveling history information 111, the position information 121, cartographic information 450, and the fuel efficiency estimation result 461.

The storage devices 820 and 920 each have a main storage device and an external storage device.

The external storage device is specifically a ROM (Read Only Memory), flash memory, or HDD (Hard Disk Drive). The main storage device is specifically a RAM (Random Access Memory). The storage unit 16, 25 may be implemented by the external storage device, may be implemented by the main storage device, or may be implemented by both of the main storage device and the external storage device. Any method of implementing the storage unit 16, 25 can be taken.

In the external storage device, a program for achieving the functions of the "units" of each device is stored. This program is loaded onto the main storage device, is read to the processor 810, 910, and is executed by the processor 810, 910. In the external storage device, an OS (Operating System) is also stored. At least part of the OS is loaded onto the main storage device, and the processor 910, 810 executes the program for achieving the functions of the "units" of each device while executing the OS.

Each device may include a plurality of processors replacing the processor 810, 910. The plurality of these processors share execution of the program for achieving the functions of the "units". Each of these processors is an IC for processing, like the processor 810, 910.

Information, data, a signal value, and a variable value indicating the result of the process by the functions of the "units" of each device is stored in the main storage device, the external storage device, or a register or cache memory of the processor 810, 910. In each of FIG. 2 and FIG. 3, arrows connecting each unit and the respective storage units represent that each unit stores the process result in the storage unit or each unit reads information from the storage unit. Also, arrows connecting the respective units represent flows of control.

The program for achieving the functions of the "units" of each device may be stored in a portable recording medium such as a magnetic disc, flexible disc, optical disc, compact disc, Blu-ray (registered trademark) disc, or DVD (Digital Versatile Disc).

Note that a program for achieving the functions of the "units" of the fuel efficiency estimation system 500 is also referred to as a fuel efficiency estimation program 520. Also, a thing called a fuel efficiency estimation program product is a storage medium and storage device having the fuel efficiency estimation program 520 recorded thereon, and has loaded thereon a computer-readable program, irrespective of what visual format it takes.

*Description of Functional Structures*

First, the functional structure of the motor vehicle device 100 is described.

The traveling history collection unit 11 collects the traveling history information 111 at the time of traveling of the motor vehicle 1 by using the sensor 860.

The position information collection unit 12 receives, from the driver, information about an origin and a destination in the traveling of the motor vehicle 1 as the position information 121. The position information collection unit 12 accepts the position information 121 from the driver via the input interface 830.

The information display unit 13 causes the traveling route 411 calculated by the fuel efficiency estimation device 200 from the position information 121 and the fuel efficiency estimation result 461 of the motor vehicle 1 on the traveling route 411 to be displayed on the display device via the output interface 840.

The information transmission unit 14 transmits the position information 121 including the origin and the destination on the traveling route 411 and the traveling history information 111 indicating traveling history of the motor vehicle 1 via the communication device 850 to the fuel efficiency estimation device 200.

The information reception unit 15 receives the traveling route 411 and the fuel efficiency estimation result 461 via the communication device 850.

Next, the functional structure of the fuel efficiency estimation device 200 is described.

The information reception unit 21 receives the traveling history information 111 and the position information 121 transmitted from the motor vehicle device 100 and the cartographic information 450, which is infrastructure information, via the communication device 950.

The information transmission unit 22 transmits the traveling route 411 and the fuel efficiency estimation result 461 in the traveling route 411 via the communication device 950 to the motor vehicle device 100.

The traveling velocity generation unit 23 calculates a link traveling velocity 331 indicating a traveling velocity at normal time in a digital road map based on the traveling history information 111 received by the information reception unit 21 and the cartographic information 450, and accumulates the link traveling velocity 331 in the traveling velocity DB 252. Here, a link indicates a road section between nodes on the digital road map. Also, a node on the digital road map indicates an intersection, another node in road network representation, or the like. The link is one example of each of a plurality of road sections configuring a road.

The traveling fuel efficiency estimation unit 24 calculates the traveling route 411 based on the position information 121 and the cartographic information 450 received by the information reception unit 21. Also, the traveling fuel efficiency estimation unit 24 calculates traveling fuel efficiency of the motor vehicle on the traveling route 411 as the fuel efficiency estimation result 461.

Each functional structure of the traveling velocity generation unit 23 is described.

The traveling history accumulation unit 231 accumulates the traveling history information 111 received by the information reception unit 21 in the traveling history DB 251 of the storage unit 25.

The reference velocity judgment unit 232 calculates a link reference velocity 321 as a traveling velocity as a calculation reference in traveling at normal time at each link, based on features of the road acquired from the cartographic information 450 received by the information reception unit 21. The reference velocity judgment unit 232 stores the calculated link reference velocity 321 in the reference velocity DB 253 of the storage unit 25. The link reference velocity 321 is an example of a reference velocity defined for each of a plurality of road sections.

The traveling velocity calculation unit 233 calculates the link traveling velocity 331 for each link based on the link reference velocity 321 and the traveling history information 111. The traveling velocity calculation unit 233 accumulates the calculated link traveling velocity 331 in the traveling velocity DB 252. The link traveling velocity 331 is an example of a traveling velocity of a motor vehicle calculated for each of a plurality of road sections configuring a road, that is, for each link.

Here, the traveling velocity calculation unit 233 is further described.

The traveling velocity calculation unit 233 calculates the link traveling velocity 331 for each of a plurality of road sections configuring a road, that is, for each link, and stores the link traveling velocity 331 in the traveling velocity DB 252. The traveling velocity calculation unit 233 calculates the link traveling velocity 331 by using the traveling history information 111 for each of the plurality of road sections collected from the motor vehicle traveling the road and the link reference velocity 321 defined for each of the plurality of road sections. Also, the traveling velocity calculation unit 233 uses an attribute of the road section, that is, a velocity category determined based on a road attribute as a link attribute, as the link reference velocity 321 for each link. Furthermore, the traveling velocity calculation unit 233 stores the link traveling velocity 331 in the traveling velocity DB 252 for each of date and time attributes as attributes of date and time.

Each functional structure of the traveling fuel efficiency estimation unit 24 is described.

The traveling route calculation unit 241 acquires the position information 121 received by the information reception unit 21. The position information 121 includes the origin and the destination. The position information 121 and the cartographic information 450 are examples of traveling route information indicating a traveling route. Also, the information reception unit 21 is an example of an acquisition unit which acquires the traveling route information. The traveling route calculation unit 241 calculates the traveling route 411 in movement from the origin to the destination based on the position information 121 and the cartographic information 450. The traveling route calculation unit 241 outputs traveling route information indicating the traveling route 411 to the traveling velocity extraction unit 243.

The intersection stop judgment unit 242 judges stop/nonstop at an intersection included in the traveling route 411. For all intersections on the traveling route 411 calculated by the traveling route calculation unit 241, the intersection stop judgment unit 242 judges temporary stop/nonstop at each intersection and generates an intersection stop judgment 421. The intersection stop judgment unit 242 generates the intersection stop judgment 421 based on a previously-set probability.

The traveling velocity extraction unit 243 extracts, from the traveling velocity DB 252, the link traveling velocity 331 on the link included in the traveling route 411 based on the traveling route information indicating the traveling route 411 among roads. For all links on the traveling route 411 calculated by the traveling route calculation unit 241, the traveling velocity extraction unit 243 extracts each link traveling velocity 331 from the traveling velocity DB 252.

Each link traveling velocity 331 on all links are used for calculation of a velocity profile indicating a change in traveling velocity in traveling a specific route.

The velocity profile generation unit 244 generates a velocity profile 441 indicating a change in velocity of the motor vehicle traveling the traveling route 411 by using the link traveling velocity 331 extracted from the traveling velocity extraction unit 243. The velocity profile generation unit 244 couples the link traveling velocities 331 for all links extracted at the traveling velocity extraction unit 243 in the order of link passing in traveling the traveling route 411, and generates the velocity profile 441 with intersection nonstop.

The velocity profile correction unit 245 corrects the velocity profile 441 based on stop/nonstop at an intersection. The velocity profile correction unit 245 generates a velocity profile 451 in consideration of intersection stop based on the nonstop velocity profile 441 calculated by the velocity profile generation unit 244 and the intersection stop judgment 421 calculated by the intersection stop judgment unit 242. The velocity profile correction unit 245 adds a change in acceleration/deceleration due to intersection stop to the nonstop velocity profile 441 to generate the velocity profile 451 in consideration of intersection stop.

The estimated fuel efficiency calculation unit 246 calculates fuel efficiency of the motor vehicle traveling the traveling route 411 based on the velocity profile 451. The estimated fuel efficiency calculation unit 246 estimates fuel efficiency in route traveling of the traveling route 411 based on the velocity profile 451 calculated by the velocity profile correction unit 245, and outputs it to the information transmission unit 22 as the fuel efficiency estimation result 461.

*Description of Operation*

Next, operations of a fuel efficiency estimation method 510 and the fuel efficiency estimation program 520 of the fuel efficiency estimation system 500 according to the present embodiment are described.

<Traveling Velocity Generation Process S110 by Fuel Efficiency Estimation Device 200>

Figure 4:
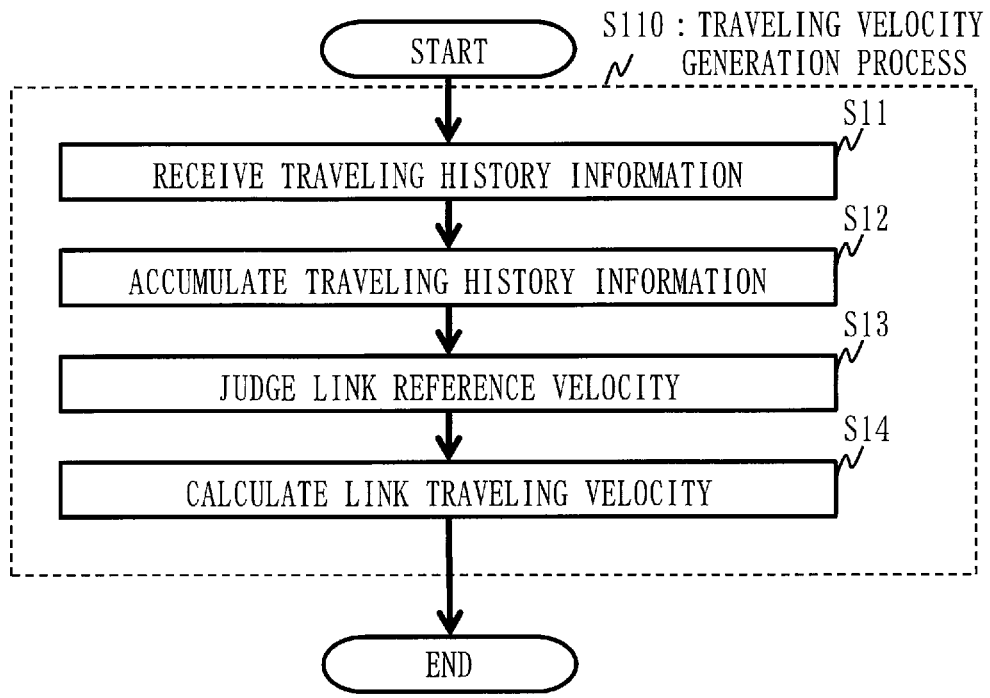
FIG. 4 is a process flowchart of a traveling velocity generation process S110 by a traveling velocity generation unit 23 of the fuel efficiency estimation device 200 according to Embodiment 1.

FIG. 4 is a process flowchart of a traveling velocity generation process S110 by the traveling velocity generation unit 23 of the fuel efficiency estimation device 200 according to the present embodiment. The traveling velocity generation process S110 is performed entirely at the fuel efficiency estimation device 200 as a central server. The traveling velocity generation process S110 is sequentially performed when the information reception unit 21 receives the traveling history information 111 from the motor vehicle device 100 at step S11.

At step S11, the information reception unit 21 receives the traveling history information 111 from the motor vehicle device 100 mounted on the motor vehicle 1.

At step S12, the traveling history accumulation unit 231 accumulates the traveling history information 111 received from the motor vehicle device 100 in the traveling history DB 251 by date and time.

At step S13, the reference velocity judgment unit 232 judges the link reference velocity 321 for each link based on the cartographic information 450 as infrastructure information, and accumulates it in the link reference velocity DB 253.

At step S14, the traveling velocity calculation unit 233 calculates the link traveling velocity 331 for each link by date and time based on the traveling history information 111 and the link reference velocity 321 accumulated in the storage unit 25, and accumulates it in the traveling velocity DB 252.

Here, "by date and time" specifically refers to classification by date and time attribute such as time, day of the week, or season. Classification by time specifically refers to classification at thirty-minute intervals, one-hour intervals, or the like. Classification by season specifically refers to "by month". A division interval of time and season can improve estimation accuracy of traveling fuel efficiency of the motor vehicle as fragmentation proceeds. On the other hand, the division interval of date and time may be increased in accordance with the process load on the fuel efficiency estimation device 200 and the number of motor vehicles capable of transmitting the traveling history information 111.

Also, in the traveling velocity generation process S110, each of the processes at step S12, step S13, and step S14 may be in a mode of being each processed independently. Here, the process at step S14 is assumed to be performed after at least the process at step S13 is performed once or more. On the other hand, it is assumed that each of the processes at step S13 and step S14 can be performed if the process at step S12 is never performed even once.

Also, when the respective processes in the traveling velocity generation process S110 are performed independently, the respective processes at step S12, step S13, and step S14 may be offline processes. In the offline processes, for example, the process at step S12 is performed once a day, the process at step S13 is performed once a month, and the process at step S14 is performed once a month. In this manner, a process execution interval is required to be appropriately set in consideration of the process load to be applied to the fuel efficiency estimation device 200.

Figure 5:
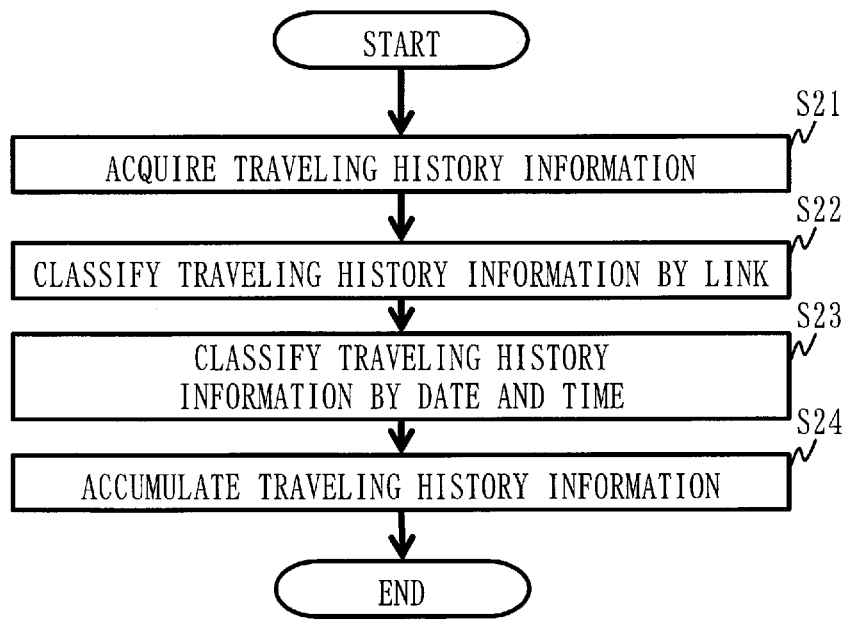
FIG. 5 is a process flowchart of a traveling history accumulation unit 231 according to Embodiment 1.

FIG. 5 is a process flowchart of the traveling history accumulation unit 231 according to the present embodiment. FIG. 5 illustrates details of the process at step S12 of FIG. 4.

At step S21, the traveling history accumulation unit 231 acquires the traveling history information 111 from the information reception unit 21. Here, the traveling history information 111 includes at least a traveling position, traveling velocity, traveling direction, and traveling date and time information. Also, the traveling history information 111 can be information-divided by link and by date and time. Also, the traveling history information 111 may have a traveling link, acceleration, gradient, weather at the time of traveling, road congestion situation at the time of traveling, and so forth.

At step S22, the traveling history accumulation unit 231 classifies the traveling history information 111 by link. Here, the traveling history accumulation unit 231 extracts position information for each link from the cartographic information 450, matches the extracted information with the traveling position in the traveling history information 111, and judges a link which the motor vehicle 1 having the motor vehicle device 100 that has transmitted the traveling history information 111 mounted thereon has traveled. Note that if the traveling history information 111 includes traveling link information as information about a link traveled, this traveling link information may be extracted to judge a link. Also, the traveling history accumulation unit 231 may acquire the cartographic information 450 and configuration information about links on the roads nationwide by utilizing digital cartographic information and link information being used in, for example, VICS (registered trademark) (Vehicle Information and Communication System: road traffic information communication system) or the like.

At step S23, the traveling history accumulation unit 231 classifies the link-divided traveling history information 111 by date and time. Here, based on the traveling date and time information included in the traveling history information 111, the information is divided by time (for example, thirty-minute intervals), day of the week, and season (for example, by month) as a division unit.

At step S24, the traveling history accumulation unit 231 accumulates the traveling history information 111 classified by link and by date and time in the traveling history DB 251. Here, statistical information such as an average traveling velocity and the number of pieces of accumulated data of the traveling history information 111 by link and by date and time may be simultaneously accumulated.

Figure 6:
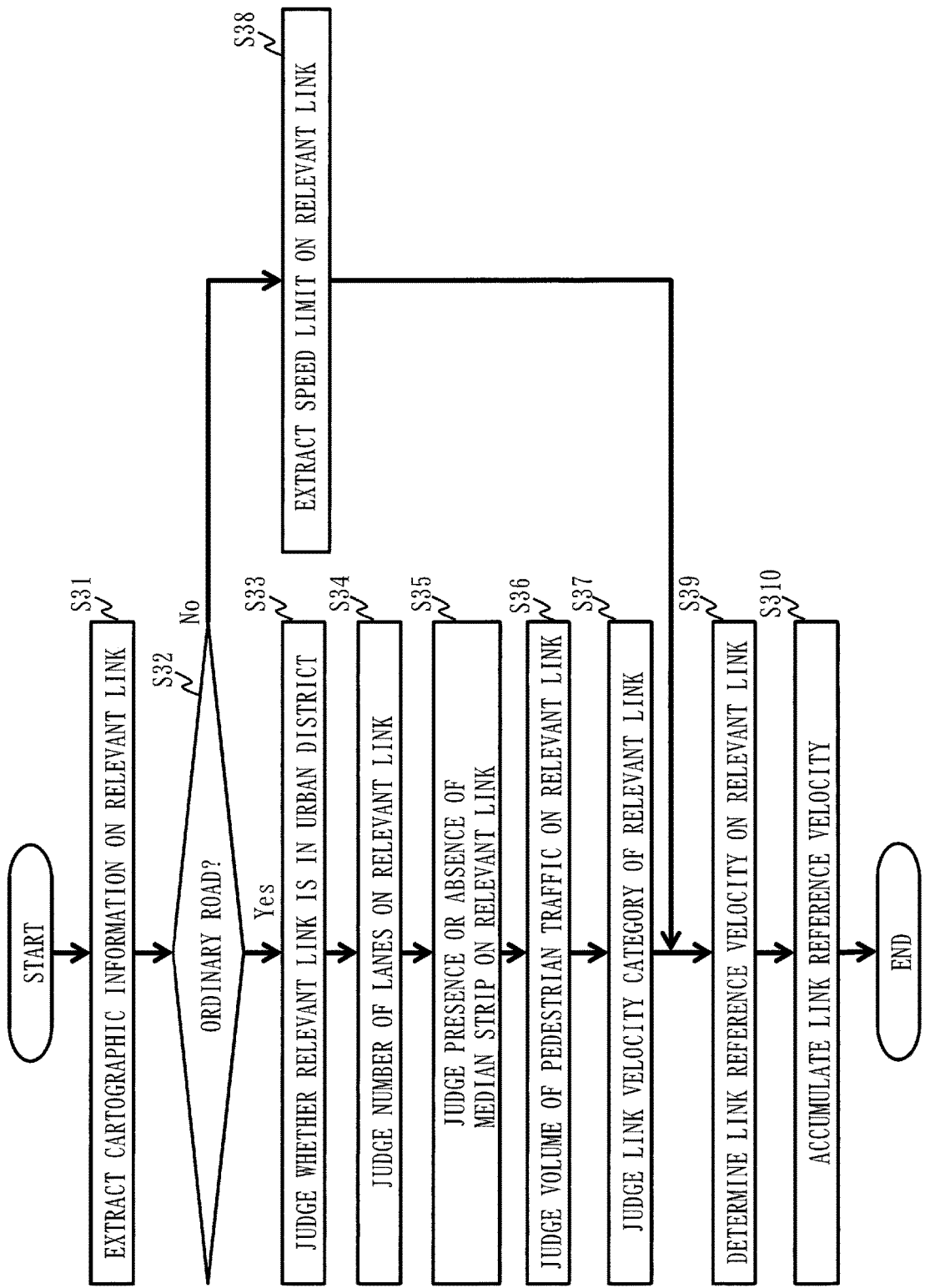
FIG. 6 is a process flowchart of a reference velocity judgment unit 232 according to Embodiment 1.

FIG. 6 is a process flowchart of the reference velocity judgment unit 232 according to the present embodiment. FIG. 6 illustrates details of the process of step S13 of FIG. 4.

At step S31, the reference velocity judgment unit 232 extracts the cartographic information 450 on the link L (relevant link) as a target for calculation of the link reference velocity 321. Here, the reference velocity judgment unit 232 extracts, as the cartographic information 450 to be extracted, information about at least a road type, the number of traveling lanes, the presence or absence of a median strip, the presence or absence of a walkway, and a site area of commercial facilities or shopping streets around the road. As the cartographic information 450, the reference velocity judgment unit 232 may use digital cartographic information being utilized by a car navigation system or the like for map display and route calculation.

At step S32, the reference velocity judgment unit 232 judges, based on the extracted cartographic information 450, whether the link L is an ordinary road. Expressways or bypass roads have features of hardly having intersections and often being straight roads, where the traveling velocity is constant and tends to be stable. On the other hand, on ordinary roads, intersections are present at relatively short spacings, the speed limit changes for each road, the volume of motor-vehicle traffic greatly changes as being influenced by a surrounding commercial facility or the like, for example. For these reasons, the traveling velocity significantly changes for each road. From this, a distinction is made between ordinary roads and the other roads, and different methods of calculating the link reference velocity 321 are taken. This allows enhancement of reproducibility of the traveling velocity in traveling any traveling route 411, in particular, in ordinary roads and also allows enhancement of estimation accuracy of traveling fuel efficiency of the motor vehicle.

The reference velocity judgment unit 232 makes a judgment as to whether the link L is an ordinary road, based on the road type information of the extracted cartographic information 450. When the link L is an ordinary road, the process flow proceeds to step S33. Also, when the link L is not an ordinary road, the process flow proceeds to step S38.

At step S38, the reference velocity judgment unit 232 acquires the speed limit on the link L based on the cartographic information 450.

FIG. 7 illustrates a velocity category judgment table 60 according to the present embodiment. The velocity category judgment table 60 is, for example, twelve velocity categories for ordinary roads disclosed in Non-Patent Literature 1. The reference velocity judgment unit 232 judges at step S33 to step S37 to which velocity category on the velocity category judgment table 60 the link L as an ordinary road applies.

When it is judged that the link L is an ordinary road, by using the cartographic information 450, the reference velocity judgment unit 232 judges at step S33 whether the location where the link L is positioned is in an urban district. The reference velocity judgment unit 232 makes a judgment as to whether the link L is in an urban district from the site area of commercial facilities and shopping streets of the cartographic information 450. The reference velocity judgment unit 232 judges that the link L is in an urban district when the percentage of the site area of commercial facilities and shopping streets in a certain range including the link L exceeds a previously-set threshold a. As for the threshold a, an administrator of the fuel efficiency estimation device 200 can set any value, and can also change the value in the course of operation while comparing an actual traveling velocity and the calculation result of the link reference velocity.

At step S34, the reference velocity judgment unit 232 judges the number of traveling lanes on the link L based on the cartographic information 450. The reference velocity judgment unit 232 extracts the information on the number of lanes on the link L from the cartographic information 450, and judges whether the link L has two lanes or four lanes or more.

At step S35, the reference velocity judgment unit 232 judges, based on the cartographic information 450, whether the road on the link L has a median strip. The reference velocity judgment unit 232 extracts median strip information on the link L from the cartographic information 450, and judges the presence or absence of a median strip on the link L.

At step S36, the reference velocity judgment unit 232 judges the volume of pedestrian traffic on the link L based on the cartographic information 450. If the cartographic information 450 does not include information on the volume of pedestrian traffic, the reference velocity judgment unit 232 extracts the presence or absence of a walkway from the cartographic information 450, and judges that the volume of pedestrian traffic is large if a walkway is present. Also, if the cartographic information 450 includes information on the volume of pedestrian traffic, the reference velocity judgment unit 232 may use that information. Also, information on the volume of pedestrian traffic may be extracted from the infrastructure information or the traveling history information 111.

At step S37, the reference velocity judgment unit 232 judges a velocity category of the link L based on the judgment result from step S33 to step S36 and the velocity category judgment table 60 of FIG. 7. The reference velocity judgment unit 232 judges a velocity category of the link L from the velocity category judgment table 60 based on respective pieces of information including the result of judging the region for the link L (urban district or non-urban district), the result of judging the number of traveling lanes (two or four or more), the result of judging a median strip (presence or absence), and the volume of pedestrian traffic (large or small).

At step S39, the reference velocity judgment unit 232 extracts a reference velocity corresponding to the velocity category judged from the velocity category judgment table 60, and determines it as a link reference velocity $V_r(L)$ on the link L. Alternately, if step S38 is performed, the reference velocity judgment unit 232 determines the acquired speed limit on the link L as the link reference velocity $V_r(L)$ on the link L. In this manner, the processes from step S31 to step S38 allow the motor-vehicle traveling velocity close to reality on ordinary roads and non-ordinary roads to be extracted as the link reference velocity 321. The link reference velocity $V_r(L)$ on the link L is determined based on the reference velocity on the velocity category judgment table 60 extracted by the processes from step S33 to step S37 or the speed limit extracted by the process at step S38.

At step S310, the reference velocity judgment unit 232 accumulates the link reference velocity $V_r(L)$ determined at step S39 in the reference velocity DB 253.

Figure 8:
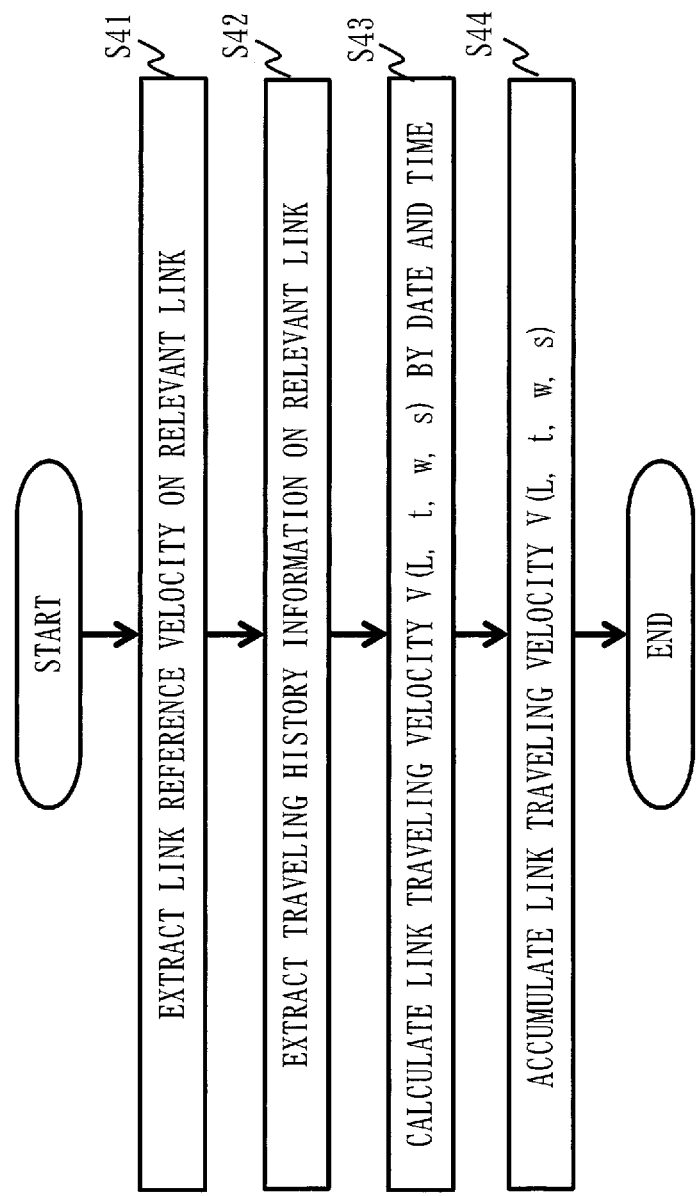
FIG. 8 is a process flowchart of a traveling velocity calculation unit 233 according to Embodiment 1.

FIG. 8 is a process flowchart of the traveling velocity calculation unit 233 according to the present embodiment. FIG. 8 illustrates details of the process of step S14 of FIG. 4.

In the following, description is exemplarily made to calculation of the link traveling velocity 331 on the link L when the calculation date and time for the link traveling velocity 331 includes a traveling time t, a traveling day of the week w, and a traveling season s. That is, based on the acquisition date and time when the acquisition unit has acquired the traveling route information, the link traveling velocity 331 with the date and time equal to the date and time attributes of the acquisition date and time is calculated.

At step S41, the traveling velocity calculation unit 233 extracts the link reference velocity $V_r(L)$ on the link L from the link reference velocity DB 253.

At step S42, the traveling velocity calculation unit 233 extracts the traveling history information 111 on the link L from the traveling history DB 251. The traveling velocity calculation unit 233 extracts, from the traveling history DB 251, $N_L$ actual traveling velocities $V_{hist}(L, t, w, s, n)$ ($1 \leq n \leq N_L$) at the traveling time t, the traveling day of the week w, and the traveling season s as the traveling history information 111 on the link L.

At step S43, the traveling velocity calculation unit 233 calculates the link traveling velocity $V(L, t, w, s)$ on the link L by date and time. The link traveling velocity V is found by adding the link reference velocity $V_r$ and the actual traveling velocity history $V_{hist}$ together as illustrated in an expression (1).

FORMULA 1

$$V(L, t, w, s) = \frac{1}{k+1} \times \left( V_r(L) + k \cdot \frac{\sum_{n=1}^{N_L} V_{hist}(L, t, w, s, n)}{N_L} \right) \quad (1)$$

Here, as for a coefficient k (0<k), the administrator of the fuel efficiency estimation device 200 can set any value, and sets the value in consideration of the amount of accumulation in the traveling history DB 251 and an importance ratio between an actual traveling velocity $V_{hist}$ and the link reference velocity $V_r$ in calculation of the link traveling velocity. When the link reference velocity $V_r$ is desired to be prioritized, k is set to have a small value. When the actual traveling velocity $V_{hist}$ is desired to be prioritized, k is set to have a large value. This allows measures to be taken such that, for example, as in the case in which the actual traveling velocity significantly exceeds the speed limit on the link L and becomes a velocity to a degree as a target for a speed trap on a charge of overspeed, when it is judged that the actual traveling velocity is not suitable as information to be provided to a driver via a car navigation or the like, k is set to have a small value and the value of the link reference velocity $V_r$ is prioritized.

At step S44, the traveling velocity calculation unit 233 accumulates the calculated link traveling velocity $V(L, t, w, s)$ on the link L in the traveling velocity DB 252.

<Traveling Fuel Efficiency Estimation Process S120 by Fuel Efficiency Estimation Device 200>

Figure 9:
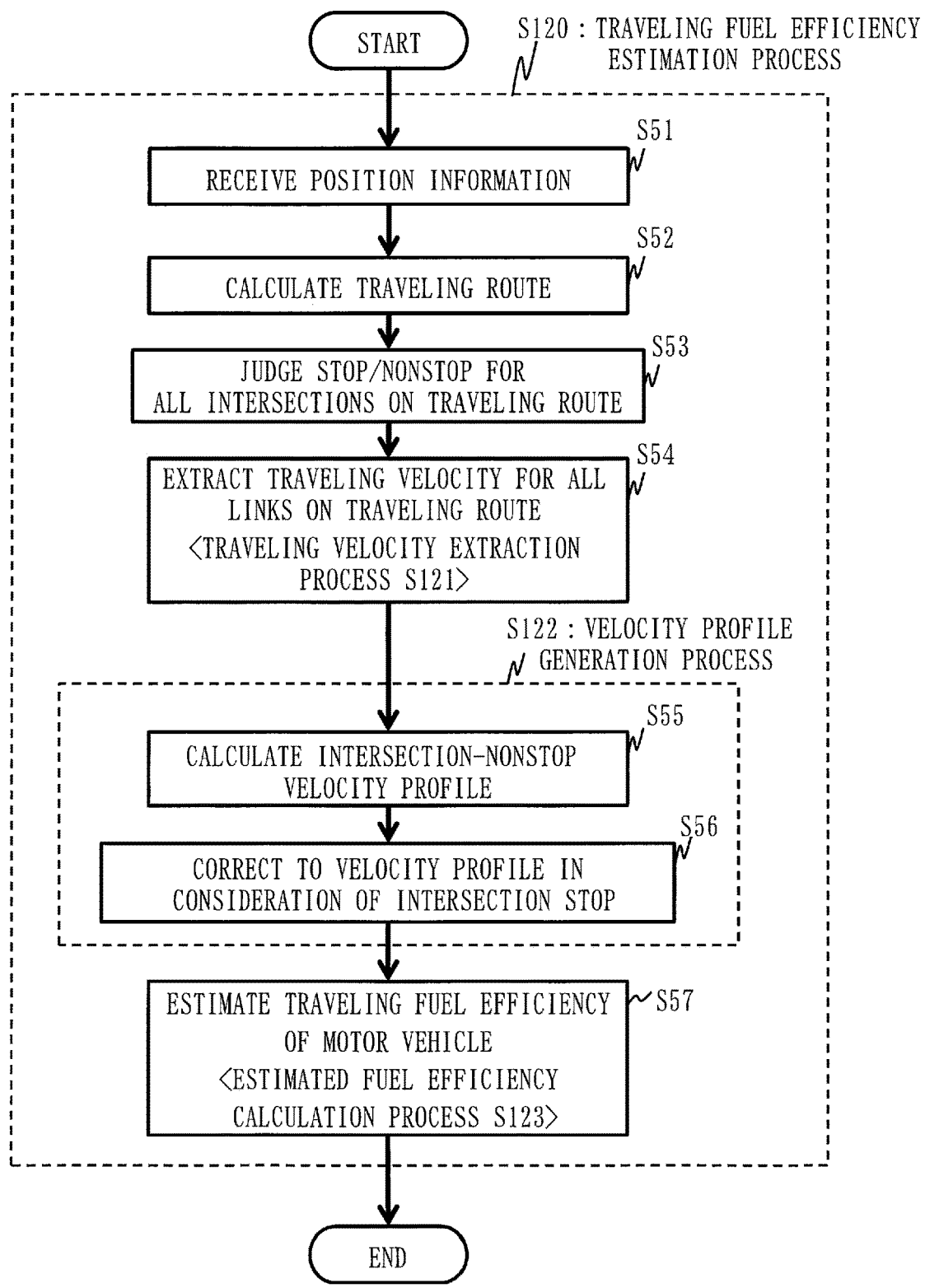
FIG. 9 is a process flowchart of a traveling fuel efficiency estimation process S120 by a traveling fuel efficiency estimation unit 24 of the fuel efficiency estimation device 200 according to Embodiment 1.

FIG. 9 is a process flowchart of a traveling fuel efficiency estimation process S120 by the traveling fuel efficiency estimation unit 24 of the fuel efficiency estimation device 200 according to the present embodiment. The traveling fuel efficiency estimation process S120 is performed at the fuel efficiency estimation device 200 as a central server. The traveling fuel efficiency estimation process S120 is sequentially performed when the information reception unit 21 receives the position information 121 including the origin and the destination from the motor vehicle 1 (step S51). Note that, in the following, description is exemplarily made to the case in which an acquisition date and time (time $t_0$, day of the week $w_0$, season $s_0$) when the information reception unit 21 as the acquisition unit has acquired the position information 121 as traveling route information is taken as an estimation date and time for estimation of traveling fuel efficiency of the motor vehicle 1.

At step S52, the traveling route calculation unit 241 calculates a traveling route X of the motor vehicle based on the position information 121 including the origin and the destination received from the motor vehicle 1.

At step S53, the intersection stop judgment unit 242 judges intersection stop/nonstop $S(i_1)$ to $S(i_m)$ for all intersections $i_1$ to $i_m$ on the traveling route X.

At step S54, the traveling velocity extraction unit 243 extracts the link traveling velocity $V(L_k, t_k, w_k, s_k)$ ($1 \leq k \leq n$) for all passage links on the traveling route X. Step S54 is an example of a traveling velocity extraction process S121 of extracting, from the traveling velocity DB 252, a link traveling velocity on a link (road section) included in the traveling route X based on the traveling route information indicating the traveling route X among the roads. For each link as a road section configuring the traveling route X, the traveling velocity extraction unit 243 calculates an inflow date and time of inflow to the link $L_k$ based on the date and time of inflow to a previous link (previous road section (taken as a link $L_{k-1}$)) to be traveled before traveling the relevant link (which is referred to as a link $L_k$) and traveling time $T_{k-1}$ when traveling the link $L_{k-1}$, and extracts the link traveling velocity $V(L_k, t_k, w_k, s_k)$ ($1 \leq k \leq n$) on the link $L_k$ based on the inflow date and time of inflow to the link $L_k$.

At step S55, by using the link traveling velocity $V(L_k, t_k, w_k, s_k)$ ($1 \leq k \leq n$) extracted by the traveling velocity extraction unit 243, the velocity profile generation unit 244 calculates an intersection-nonstop velocity profile $V_{profile\text{-}nonstop}(X)$ in traveling the traveling route X. That is, based on the acquisition date and time (time $t_0$, day of the week $w_0$, season $s_0$) and the link traveling velocity $V(L_k, t_k, w_k, s_k)$ ($1 \leq k \leq n$) for all passage links on the traveling route X, the velocity profile generation unit 244 generates a velocity profile when the traveling route X is traveled at the date and time with the same date and time attributes as those of the acquisition date and time.

At step S56, the velocity profile correction unit 245 reproduces, on the intersection-nonstop velocity profile $V_{profile\text{-}nonstop}(X)$ calculated by the velocity profile generation unit 244, an acceleration/deceleration occurring due to intersection stop by the intersection stop/nonstop $S(i_1)$ to $S(i_m)$ judged at the intersection stop judgment unit 242, and calculates the velocity profile $V_{profile}(X)$ in consideration of intersection stop. Step S55 and step S56 are an example of a velocity profile generation process S122 of generating a velocity profile indicating a change in velocity of the motor vehicle traveling the traveling route X by using the link traveling velocity extracted by the traveling velocity extraction process S121.

At step S57, for the velocity profile $V_{profile}(X)$ in consideration of intersection stop calculated by the velocity profile correction unit 245, the estimated fuel efficiency calculation unit 246 estimates traveling fuel efficiency of the motor vehicle in traveling the traveling route X by using a relational expression of fuel efficiency and traveling velocity. The process at step S57 is an example of an estimated fuel efficiency calculation process S123 of calculating fuel efficiency of the motor vehicle traveling the traveling route X based on the velocity profile.

Here, as a scheme for use in calculation of the traveling route X in the process at step S52, a scheme such as Dijkstra method for use in current car navigation or the like may be used. Also, when a plurality of traveling routes can be thought from the origin to the destination, the process of FIG. 9 is repeatedly performed as many as the number of traveling routes.

Also, as for the process at step S57, traveling fuel efficiency of the motor vehicle 1 is calculated by using a relational expression of traveling velocity and fuel efficiency. When a relational expression of the traveling velocity V and fuel efficiency is represented as $f_{fuel}(V)$, consumed fuel efficiency $F_{fuel}$ in traveling the traveling route X is as in an expression (2).

FORMULA 2

$$F_{fuel} = \int_X f_{fuel}(V_{profile}(X))dX \quad (2)$$

Figure 10:
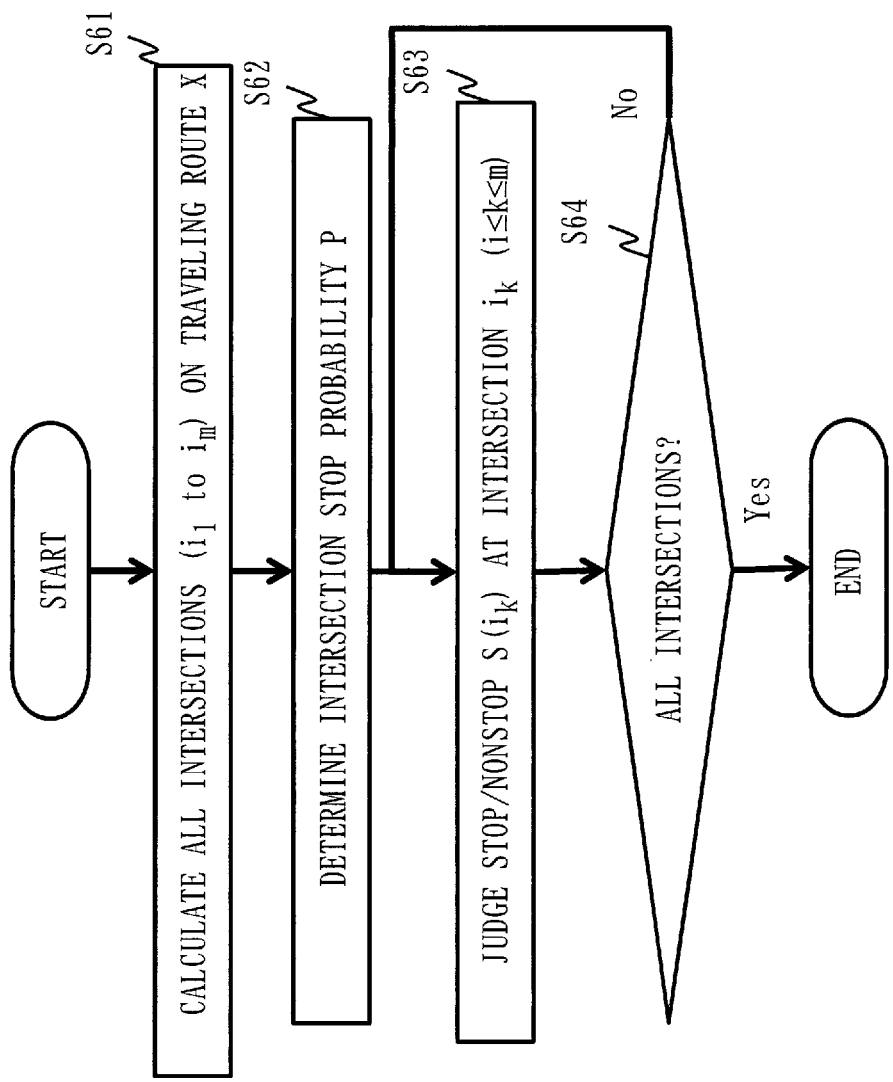
FIG. 10 is a process flowchart of an intersection stop judgment unit 242 according to Embodiment 1.

FIG. 10 is a process flowchart of the intersection stop judgment unit 242 according to the present embodiment. FIG. 10 illustrates details of the process at step S53 of FIG. 9.

At step S61, the intersection stop judgment unit 242 calculates all intersections ($i_1$ to $i_m$) on the traveling route X calculated by the traveling route calculation unit 241. Here, in calculating all intersections on the traveling route, the intersection stop judgment unit 242 performs extraction based on the cartographic information 450, and takes the intersections as $i_1, i_2, \ldots, i_m$ in the order of passing.

At step S62, the intersection stop judgment unit 242 determines an intersection stop probability $P_{stop}$ for judging a probability of stop/nonstop at each intersection for all intersections ($i_1$ to $i_m$) on the traveling route X. The intersection stop probability $P_{stop}$ may be a uniform stop probability for all intersections, or the setting value of the $P_{stop}$ may be changed with an intersection with a traffic signal and an intersection without a traffic signal, intersection entrance from a priority road and an intersection entrance from a non-priority road, or the like.

Next, at step S63, as for stop/nonstop at the intersection $i_k$ (1≤k≤m) on the traveling route X, the intersection stop judgment unit 242 makes a stop judgment based on the intersection stop probability $P_{stop}$ determined at step S62, and stores the judgment in the intersection stop/nonstop $S(i_k)$. Here, a judgment expression for the intersection stop/nonstop $S(i_k)$ is as in an expression (3).

FORMULA 3

$$S(i_k) = \begin{cases} \text{stop} & (P | P_{stop}) \\ \text{pass} & (P | 1 - P_{stop}) \end{cases} \quad (3)$$

Lastly, at step S64, the intersection stop judgment unit 242 judges whether the process of judging intersection stop/nonstop has ended for all intersections. If the judgment as to intersection stop/nonstop has ended for all intersections (k=m), the intersection stop judgment unit 242 ends the process. If the judgment as to intersection stop/nonstop has not ended for all intersections (k<m), the process returns to the process at step S63, and is repeated until the judgment as to intersection stop/nonstop ends for all intersections.

Figure 11:
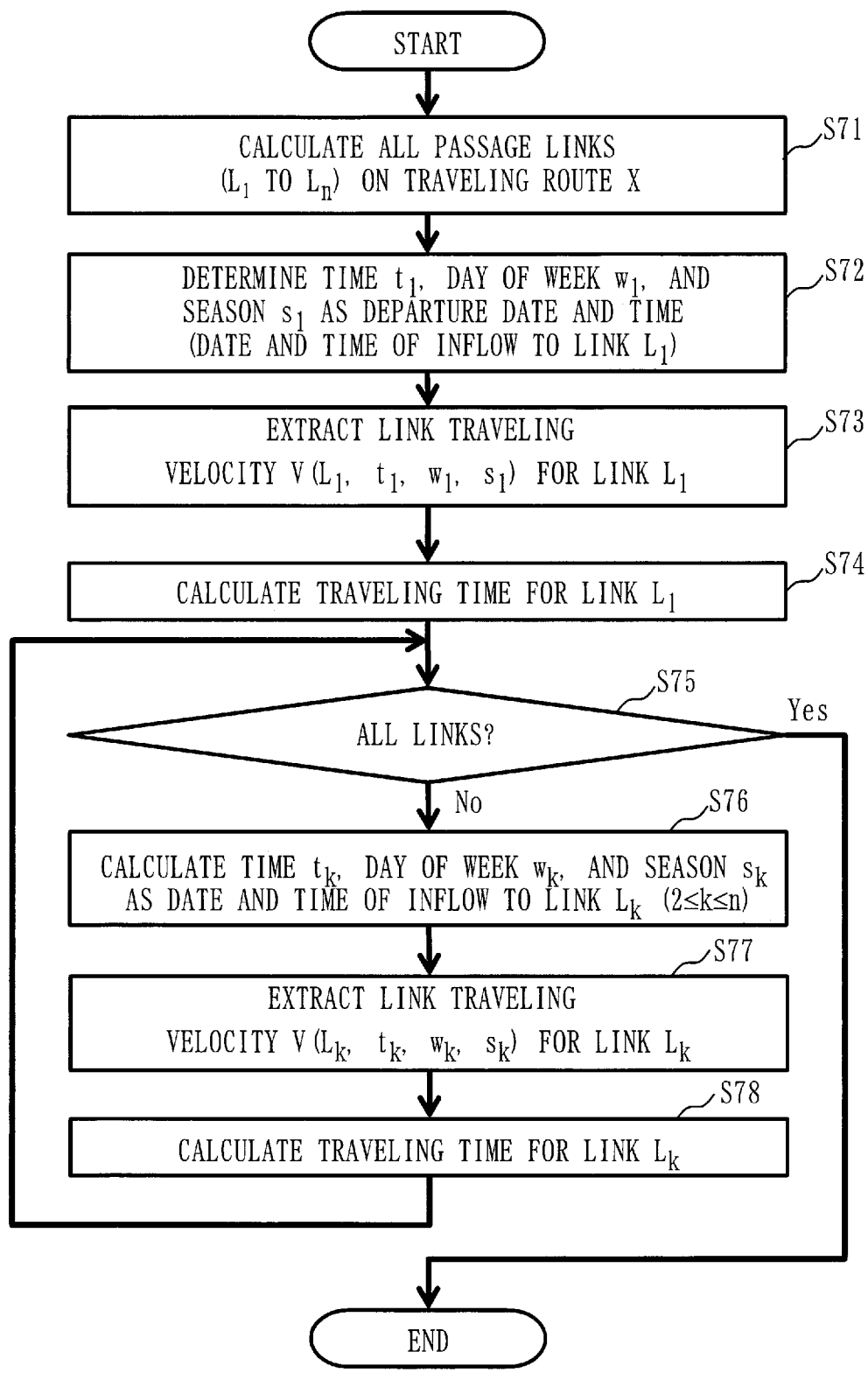
FIG. 11 is a process flowchart of a traveling velocity extraction unit 243 according to Embodiment 1.

FIG. 11 is a process flowchart of the traveling velocity extraction unit 243 according to the present embodiment. FIG. 11 illustrates details of the process at step S54 of FIG. 9.

At step S71, the traveling velocity extraction unit 243 calculates all links ($L_1$ to $L_n$) on the traveling route X calculated by the traveling route calculation unit 241. Here, in calculating all links on the traveling route, the traveling velocity extraction unit 243 performs extraction based on the cartographic information 450, and takes the links as $L_1, L_2, \ldots, L_n$ in the order of passing.

At step S72, the traveling velocity extraction unit 243 determines a time $t_1$, day of the week $w_1$, and season $s_1$, as a departure date and time in traveling the traveling route X, that is, a date and time of inflow to the link $L_1$ to be first traveled on the traveling route X. Here, when a date and time when the position information 121 is received (time $t_0$, day of the week $w_0$, season $s_0$) is taken as a date and time for estimation of traveling fuel efficiency of the motor vehicle, $t_1=t_0$, $w_1=w_0$, and $s_1=s_0$ hold. Also, any time and date ($t_\phi$, $w_\phi$, $s_\phi$) other than the date and time when the position information 121 is received is taken as a date and time for estimation of traveling fuel efficiency of the motor vehicle, $t_1=t_\phi$, $w_1=w_\phi$, and $s_1=s_\phi$ hold.

Next at step S73, the traveling velocity extraction unit 243 extracts, from the traveling velocity DB 252, a link traveling velocity $V(L_1, t_1, w_1, s_1)$ for the link $L_1$ at the time $t_1$, the day of the week $w_1$, and the season $s_1$.

At step S74, the traveling velocity extraction unit 243 calculates a traveling time Ti in traveling on the link $L_1$. Here, when the link length of the link $L_1$ is taken as $X_1$, the traveling time Ti for the link $L_1$ is calculated from the product of the link traveling velocity $V(L_1, t_1, w_1, s_1)$ and the link length $X_1$.

At step S75, the traveling velocity extraction unit 243 judges whether extraction of the link traveling velocity has been completed for all links. If extraction of the link traveling velocity has been completed for all links, the process ends. If there is a link for which extraction of the link traveling velocity has not been completed, the process proceeds to step S76.

At step S76, for a link $L_k$ (2≤k≤n) for which extraction of the link traveling velocity has not been completed, the traveling velocity extraction unit 243 determines a time $t_k$, day of the week $w_k$, and season $s_k$ as a date and time of inflow to the link $L_k$. Here, calculation is performed based on the traveling time $T_{k-1}$ for the link $L_{k-1}$ calculated in the process at step S74 or step S78. The time $t_k$, the day of the week $w_k$, and the season $s_k$ are determined by taking a date and time passing from a time $t_{k-1}$, day of the week $w_{k-1}$, and season $s_{k-1}$, which are a date and time of inflow to the link $L_{k-1}$, by $T_{k-1}$ as a date and time of inflow to the link $L_k$.

Next at step S77, the traveling velocity extraction unit 243 extracts the link traveling velocity $V(L_k, t_k, w_k, s_k)$ for the link $L_k$ at the time $t_k$, the day of the week $w_k$, and the season $s_k$ from the traveling velocity DB 252.

At step S78, the traveling velocity extraction unit 243 calculates a traveling time $T_k$ in traveling on the link $L_k$.

Here, when the link length of the link $L_k$ is $X_k$, the traveling time $T_k$ for the link $L_k$ is calculated from the product of the link traveling velocity $V(L_k, t_k, w_k, s_k)$ and the link length $X_k$. After the process at step S78 ends, the process returns to the process at step S75.

Figure 12:
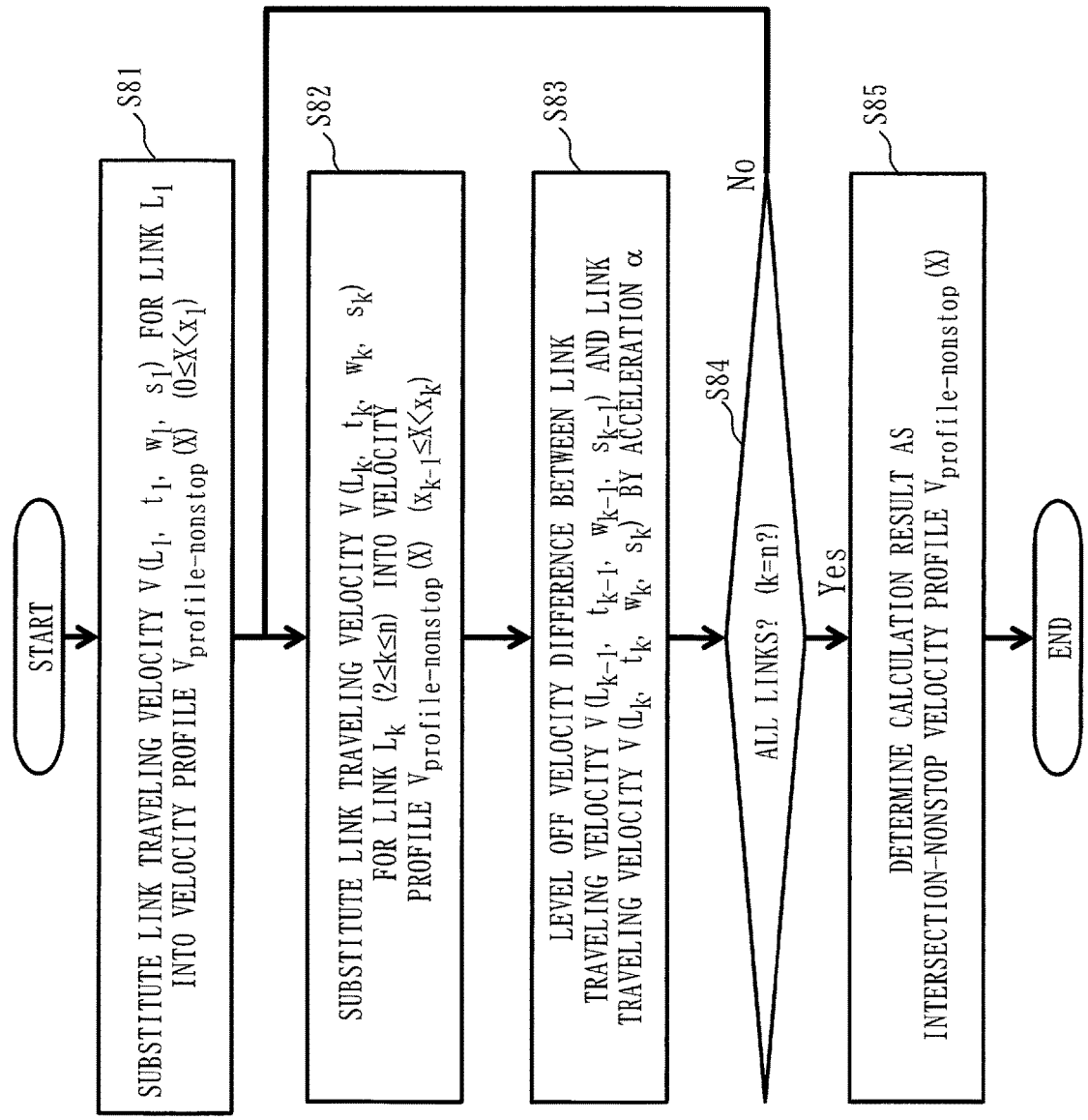
FIG. 12 is a process flowchart of a velocity profile generation unit 244 according to Embodiment 1.

FIG. 12 is a process flowchart of the velocity profile generation unit 244 according to the present embodiment. FIG. 12 illustrates details of the process at step S55 of FIG. 9.

At step S81, the velocity profile generation unit 244 substitutes the link traveling velocity $V(L_1, t_1, w_1, s_1)$ for the link $L_1$ into $0 \leq X < x_1$ of the velocity profile $V_{profile-nonstop}(X)$. Here, $x_1$ indicates a cumulative value of the traveling distance to the link $L_1$, that is, $x_1 = X_1$.

Next at step S82, the velocity profile generation unit 244 substitutes the link traveling velocity $V(L_k, t_k, w_k, s_k)$ for the link $L_k$ ($2 \leq k \leq n$) into $x_{k-1} \leq X \leq x_k$ of the velocity profile $V_{profile-nonstop}(X)$. Here, $x_k$ indicates a cumulative value of the traveling distance to the link $L_k$, that is, $x_k = X_1 + X_2 + \ldots + X_k$.

Next at step S83, the velocity profile generation unit 244 performs process of leveling off a velocity difference between the link traveling velocity $V(L_{k-1}, t_{k-1}, w_{k-1}, s_{k-1})$ occurring at a position $x_{k-1}$ from the starting position of the traveling route X, that is, $V_{profile-nonstop}(X_{k-1})$, and the link traveling velocity $V(L_k, t_k, w_k, s_k)$, by an acceleration $\alpha$. Here, the acceleration $\alpha$ is set in advance by an administrator of the fuel efficiency estimation device 200. In setting the acceleration $\alpha$, setting is appropriately performed in consideration of a general change in acceleration/deceleration at the time of motor-vehicle traveling.

Next at step S84, the velocity profile generation unit 244 judges whether substitutions of the link traveling velocity into the velocity profile $V_{profile-nonstop}(X)$ have been completed for all links. If the processes for all links have been completed, the process proceeds to step S85. If the processes for all links have not been completed, the process returns to step S82.

When judging that the processes for all links have been completed in the process at step S84, the velocity profile generation unit 244 determines the velocity profile $V_{profile-nonstop}(X)$ as an intersection-nonstop velocity profile at step S85.

The processes from step S81 to step S85 are organized as in an expression (4).

FORMULA 4

$$V_{profile-nonstop}(X) = \begin{cases} V(L_1, t_1, w_1, s_1) & (0 \leq X < x_1) \\ V(L_2, t_2, w_2, s_2) & (x_1 \leq X < x_2) \\ \vdots \\ V(L_n, t_n, w_n, s_n) & (x_{n-1} \leq X \leq x_n) \end{cases} \quad (4)$$

Figure 13:
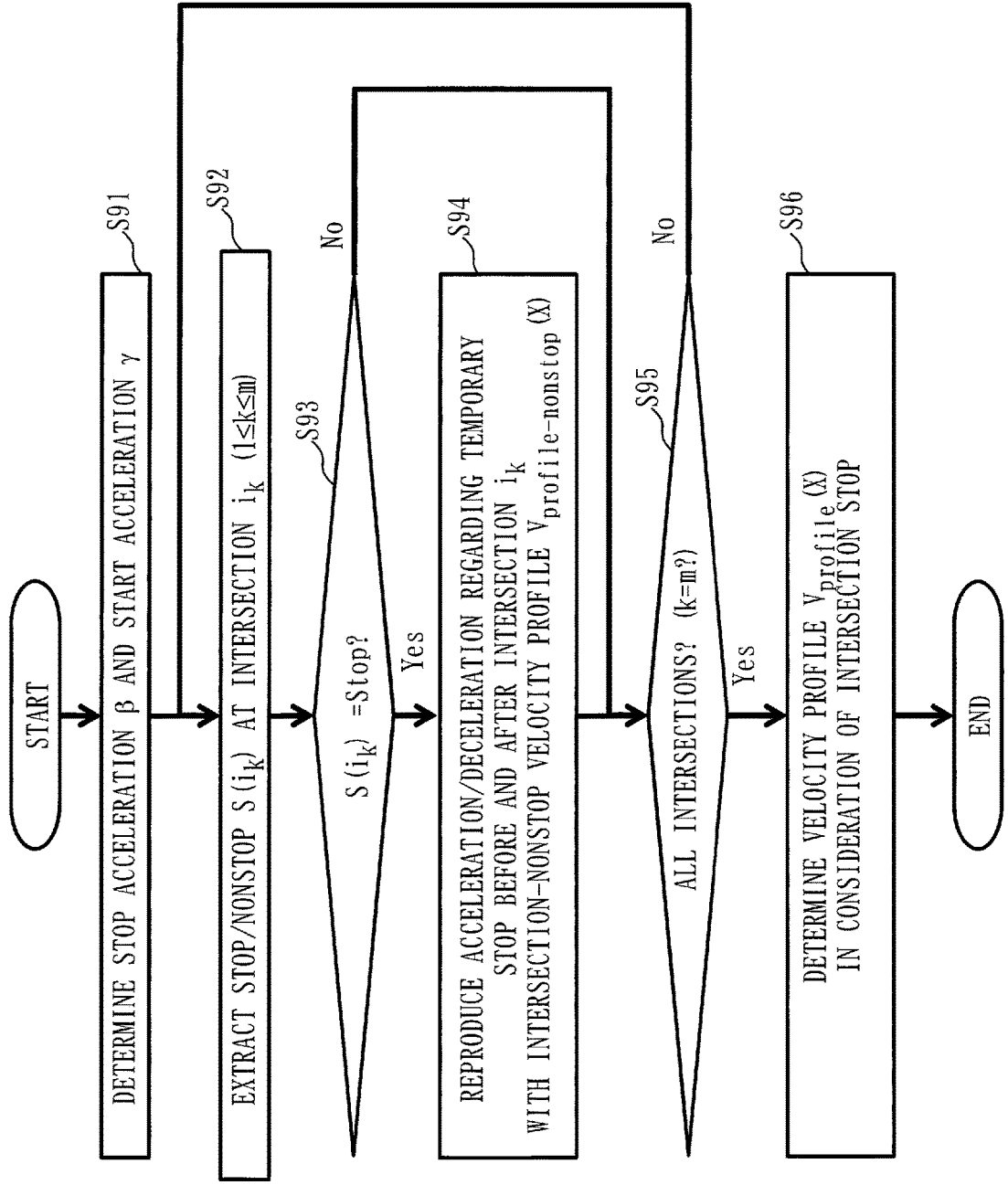
FIG. 13 is a process flowchart of a velocity profile correction unit 245 according to Embodiment 1.

FIG. 13 is a process flowchart of the velocity profile correction unit 245 according to the present embodiment. FIG. 13 illustrates details of the process at step S56 of FIG. 9.

First at step S91, the velocity profile correction unit 245 determines an acceleration $\beta$ for stopping and an acceleration $\gamma$ for starting moving at intersection stop. Here, in determining the acceleration $\beta$ and the acceleration $\gamma$, they are appropriately set in consideration of a change in acceleration/deceleration for a general stop and start at the time of motor-vehicle traveling.

Next at step S92, the velocity profile correction unit 245 extracts a stop/nonstop $S(i_k)$ at the intersection $i_k$ ($1 \leq k \leq m$) calculated in the process at step S63.

Next at step S93, in traveling the traveling route X, the velocity profile correction unit 245 judges, based on the stop/nonstop $S(i_k)$, whether the motor vehicle stops at the intersection $i_k$. When a stop is made at the intersection $i_k$ ($S(i_k)$=Stop), the process proceeds to step S94. On the other hand, when a stop is not made at the intersection $i_k$ ($S(i_k)$=Pass), the process proceeds to step S95.

At step S94, when a stop is made at the intersection $i_k$, the velocity profile correction unit 245 reproduces acceleration/deceleration regarding a temporary stop before and after the intersection $i_k$ with the intersection-nonstop velocity profile $V_{profile-nonstop}(X)$. As reproduction of acceleration/deceleration, the velocity profile correction unit 245 calculates a change in velocity based on the stop acceleration $\beta$ and the start acceleration $\gamma$ determined at step S91 so that the velocity becomes 0 at a position of the intersection $i_k$. $V_{profile-nonstop}(X)$ is overwritten with the calculation result.

Next at step S95, the velocity profile correction unit 245 judges whether judgments regarding intersection stop/nonstop and acceleration/deceleration reproduction regarding intersection stop have been completed for all intersections. If the processes for all intersections have been completed, the process proceeds to step S96. If the processes for all intersections have not been completed, the process returns to step S92.

If the processes for all intersections have been completed, at step S96, the velocity profile correction unit 245 determines $V_{profile-nonstop}(X)$ overwritten with the result of acceleration/deceleration reproduction based on intersection stop/nonstop as the velocity profile $V_{profile}(X)$ in consideration of intersection stop.

And, as described above, at step S57 of FIG. 9, the estimated fuel efficiency calculation unit 246 estimates traveling fuel efficiency in traveling the traveling route X by using the velocity profile $V_{profile}(X)$ calculated by the velocity profile correction unit 245. The estimated fuel efficiency calculation unit 246 outputs the estimated fuel efficiency estimation result 461 to the information transmission unit 22. The information transmission unit 22 transmits the fuel efficiency estimation result 461 to the motor vehicle device 100 mounted on the motor vehicle 1.

\*\*\*Other Structures\*\*\*

Also in the present embodiment, each function of the motor vehicle device 100 and the fuel efficiency estimation device 200 is implemented by software. As a modification example, each function of the motor vehicle device 100 and the fuel efficiency estimation device 200 may be implemented by hardware.

Figure 14:
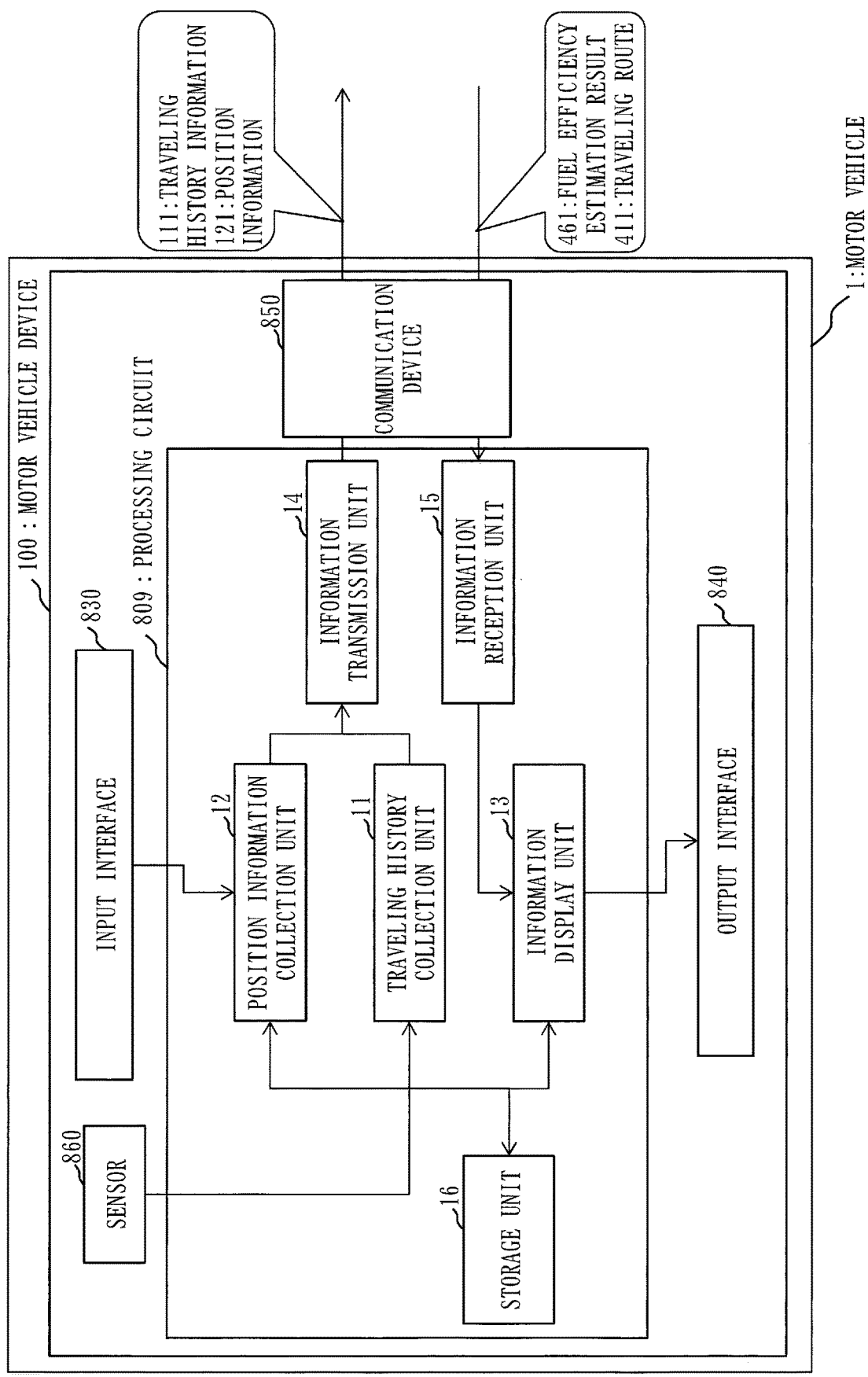
FIG. 14 illustrates a structure of the motor vehicle device 100 according to a modification example of Embodiment 1.

FIG. 14 illustrates a structure of the motor vehicle device 100 according to a modification example of the present embodiment. Also, FIG. 15 illustrates a structure of the fuel efficiency estimation device 200 according to a modification example of the present embodiment.

Figure 15:
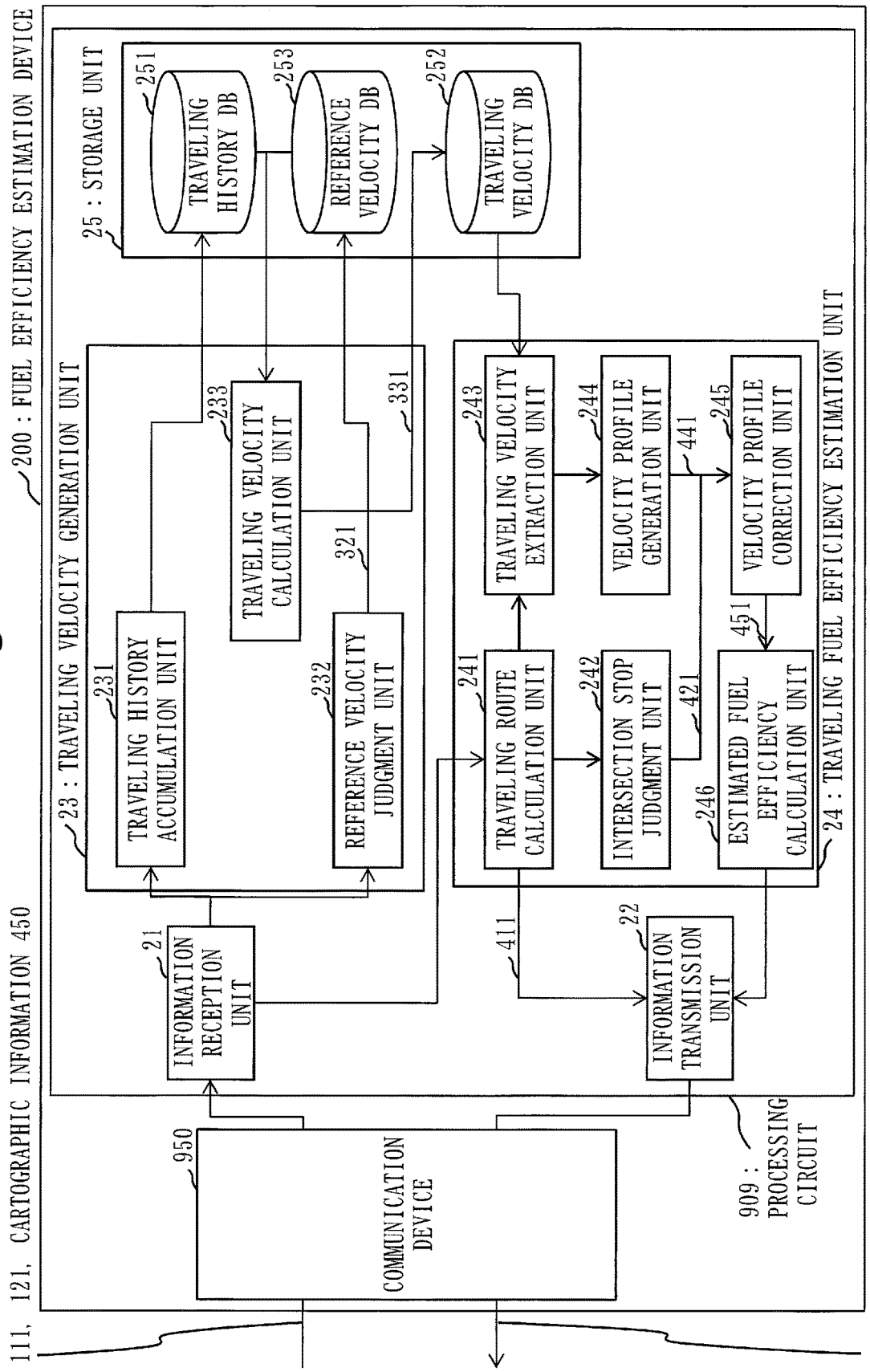
FIG. 15 illustrates a structure of the fuel efficiency estimation device 200 according to a modification example of Embodiment 1.

As illustrated in FIG. 14 and FIG. 15, each of the motor vehicle device 100 and the fuel efficiency estimation device 200 includes hardware such as processing circuit 809, 909, the input interface 830, the output interface 840, and the communication device 850, 950.

The processing circuit 809, 909 is a dedicated electronic circuit for achieving the functions of the "units" and the storage unit described above. The processing circuit 809, 909 is specifically a single circuit, composite circuit, programmed processor, parallel programmed processor, logic IC, GA (Gate Array), ASIC (AppLication Specific Integrated Circuit), or FPGA (FieLd-Programmable Gate Array).

Each of the motor vehicle device 100 and the fuel efficiency estimation device 200 may include a plurality of processing circuits replacing the processing circuit 809, 909. The plurality of these processing circuits achieve the functions of the "units" as a whole. Each of these processing circuits is a dedicated electronic circuit, like the processing circuit 809, 909.

As another modification example, each function of the motor vehicle device 100 and the fuel efficiency estimation device 200 may be implemented by a combination of software and hardware. That is, part of the functions of each of the motor vehicle device 100 and the fuel efficiency estimation device 200 may be implemented by dedicated hardware, and the remaining functions may be implemented by software.

The processor 810, 910, the storage device 820, 920, and the processing circuit 809, 909 are collectively referred to as "processing circuitry". That is, if the structure of each of the motor vehicle device 100 and the fuel efficiency estimation device 200 is any of those illustrated in FIGS. 2, 3, 14, and 15, the functions of the "units" and the storage unit are achieved by the processing circuitry.

The "units" may be read as "steps", "procedures", or "processes". Also, the functions of the "units" may be achieved by firmware.

*Description of Effects of Present Embodiment*

The fuel efficiency estimation system 500 according to the present embodiment has a function of generating, for fuel efficiency estimation in motor-vehicle traveling, a link traveling velocity as a traveling velocity at normal time by date and time for each link as a road section configuring cartographic information. Also, for a specific traveling route, a process by the traveling fuel efficiency estimation unit which calculates a velocity profile indicating a velocity change situation at the time of traveling also in consideration of intersection stop and estimates traveling fuel efficiency is performed inside the central server. Furthermore, as for generation of a link traveling velocity, the fuel efficiency estimation system 500 has a function of calculating a link reference velocity as a reference in generation of a link traveling velocity. Still further, as for generation of a link traveling velocity, the fuel efficiency estimation system 500 has a function of making divisions at least by time (for example, thirty-minute intervals), day of the week, and season (for example, one-month intervals) as date and time division units and generating a link traveling velocity at the relevant date and time.

Also, as for motor-vehicle traveling fuel efficiency estimation, the fuel efficiency estimation system 500 according to the present embodiment has a function of reproducing a velocity profile in accordance with a date and time when fuel efficiency estimation is desired by extracting and coupling link traveling velocities for a specific traveling route in consideration of passage times of all passage links. Furthermore, as for motor-vehicle traveling fuel efficiency estimation, the fuel efficiency estimation system 500 has a function of reproducing acceleration/deceleration due to intersection stop by judging stop/nonstop at all passage intersections for a specific traveling route, thereby improving calculation accuracy of the velocity profile. Still further, as for motor-vehicle traveling fuel efficiency estimation, the fuel efficiency estimation system 500 has a function of estimating, from the velocity profile in consideration of intersection stop, motor-vehicle traveling fuel efficiency by the relational expression of traveling velocity and traveling fuel efficiency.

As described above, according to the fuel efficiency estimation system 500 of the present embodiment, as for motor-vehicle traveling fuel efficiency estimation, a link reference velocity is calculated from the cartographic information for each link, and a link traveling velocity is calculated by using the traveling history information and the link reference velocity collected irrespective of motor vehicles. Thus, according to the fuel efficiency estimation system 500 of the present embodiment, the traveling velocity can be reproduced with certain accuracy or higher even on a new road and a road from which vehicle traveling history information is difficult to be collected. This can insure estimation accuracy of traveling fuel efficiency. In particular, as for ordinary roads, classification into twelve traveling velocities in consideration of road features improves reproduction accuracy of the traveling velocity to achieve motor-vehicle traveling fuel efficiency estimation with high accuracy.

Embodiment 2

In the present embodiment, differences from Embodiment 1 are mainly described.

In the present embodiment, a structure similar to the structure described in Embodiment 1 is provided with a same reference character, and its description is omitted.

*Description of Structure*

The fuel efficiency estimation system 500 according to Embodiment 1 includes the motor vehicle device 100 mounted on the motor vehicle 1 and the fuel efficiency estimation device 200 implemented by a central server in the cloud or the like. The motor vehicle device 100 collects the traveling history information 111, and requests the fuel efficiency estimation device 200 to calculate traveling fuel efficiency of the motor vehicle 1. The fuel efficiency estimation device 200 performs calculation and accumulation of the link traveling velocity 331 regarding estimation of traveling fuel efficiency of the motor vehicle 1, calculation of the velocity profile 451, and calculation of traveling fuel efficiency of the motor vehicle 1.

In the present embodiment, a fuel efficiency estimation system 500a is described which estimates traveling fuel efficiency for each motor vehicle by performing a process of estimating traveling fuel efficiency for each motor vehicle.

*Description of Structure*

Figure 16:
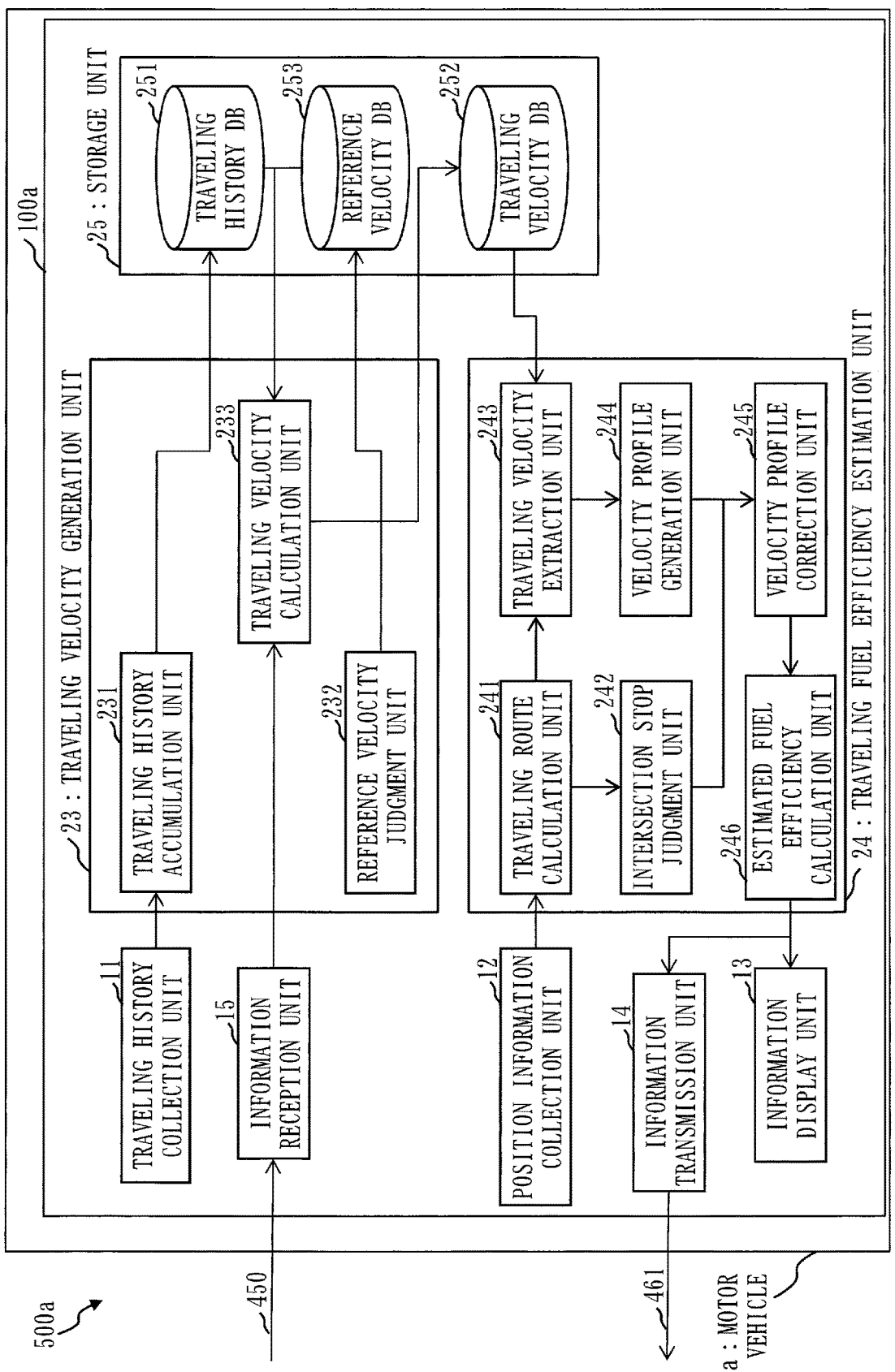
FIG. 16 illustrates a functional structure of a fuel efficiency estimation system 500a according to Embodiment 2.
Figure 17:
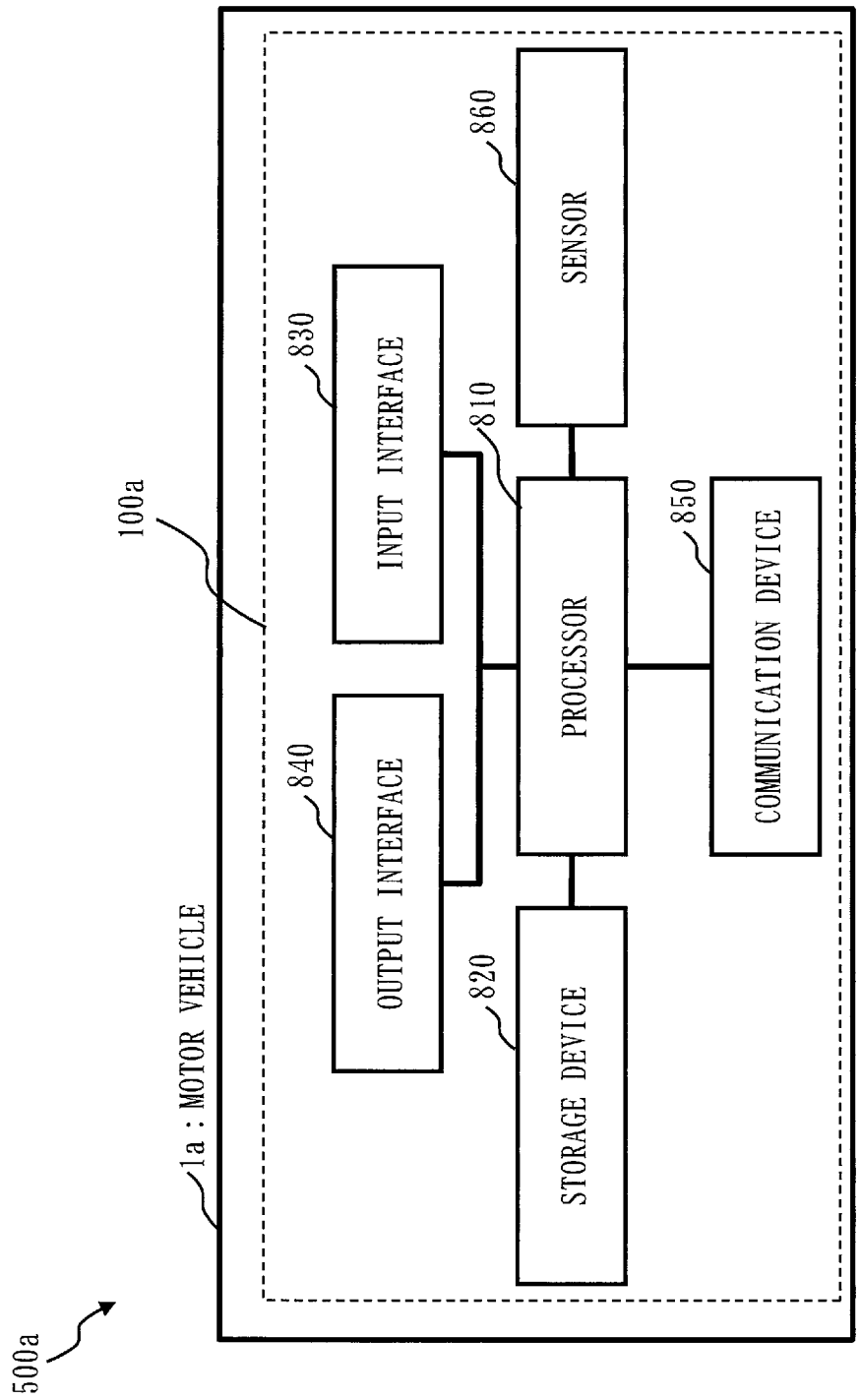
FIG. 17 illustrates a hardware structure of the fuel efficiency estimation system 500a according to Embodiment 2.

FIG. 16 illustrates a functional structure of the fuel efficiency estimation system 500a according to the present embodiment. Also, FIG. 17 illustrates a hardware structure of the fuel efficiency estimation system 500a according to the present embodiment.

In the present embodiment, the functional structure diagram and the hardware structure diagram of the fuel efficiency estimation system 500a are described as separate diagrams. However, a structure similar to the structure described in Embodiment 1 is provided with a same reference character and its description may be omitted.

The fuel efficiency estimation system 500a according to the present embodiment is configured only of a motor vehicle device 100a mounted on a motor vehicle 1a.

The motor vehicle device 100a of the motor vehicle 1a includes, as functional structures, the traveling history collection unit 11, the position information collection unit 12, the information display unit 13, the information transmission unit 14, the information reception unit 15, the traveling velocity generation unit 23, and the traveling fuel efficiency estimation unit 24.

The functional structure of each of the traveling history collection unit 11, the position information collection unit 12, the information display unit 13, the information transmission unit 14, and the information reception unit 15 is similar to the functional structure of the motor vehicle device 100 of Embodiment 1.

Also, the functional structure of each of the traveling velocity generation unit 23 and the traveling fuel efficiency estimation unit 24 is similar to the functional structure of the fuel efficiency estimation device 200 of Embodiment 1.

*Description of Functional Structure*

Next, in the respective functional structures of the motor vehicle device 100a of the motor vehicle 1a, differences from Embodiment 1 are described.

The traveling history collection unit 11 outputs the traveling history information 111 collected by using the sensor 860 directly to the traveling history accumulation unit 231 of the traveling velocity generation unit 23. The traveling history accumulation unit 231 directly acquires the traveling history information 111 from the traveling history collection unit 11.

The position information collection unit 12 outputs the position information 121 inputted via the input interface 830 directly to the traveling route calculation unit 241 of the traveling fuel efficiency estimation unit 24. The traveling route calculation unit 241 directly acquires the position information 121 from the position information collection unit 12.

As described above, the motor vehicle 1a has the functional structure of the motor vehicle device 100 and the functional structure of the fuel efficiency estimation device 200 described in Embodiment 1. The traveling history collection unit 11, the position information collection unit 12, the information display unit 13, the information transmission unit 14, and the information reception unit 15 correspond to the functions of the motor vehicle device 100. Also, the traveling velocity generation unit 23 and the traveling fuel efficiency estimation unit 24 correspond to the functional structure of the fuel efficiency estimation device 200.

Note that the functions of the information reception unit 21 and the information transmission unit 22 of the fuel efficiency estimation device 200 described in Embodiment 1 are assumed to be included in the functions of the information transmission unit 14 and the information reception unit 15 of the motor vehicle device 100a described above. Also, the function of the storage unit 16 of the motor vehicle device 100 described in Embodiment 1 is assumed to be included in the function of the storage unit 25 of the motor vehicle device 100a described above.

Next, as for the hardware structure of the motor vehicle device 100a of the motor vehicle 1a configuring the fuel efficiency estimation system 500a, differences from Embodiment 1 are described.

The processor 810 performs processes of the motor vehicle device 100a, such as an instruction for displaying various types of information to be displayed on the display, a process of collecting the traveling history information 111 and the position information 121, a process of accumulating the traveling history information 111, a process of calculating the link traveling velocity 331, a process of calculating a velocity profile, and a process of estimating traveling fuel efficiency.

Also, the storage device 820 achieves the functions of the storage unit 16 and the storage unit 25 described in Embodiment 1.

Furthermore, the communication device 850 achieves the functions of the information transmission unit 14 and the information reception unit 15 and the functions of the information transmission unit 22 and the information reception unit 21 described in Embodiment 1.

As described above, the fuel efficiency estimation system 500a includes the motor vehicle device 100a mounted on the motor vehicle 1a as a fuel efficiency estimation target. The motor vehicle device 100a includes at least the traveling velocity calculation unit 233, the traveling velocity extraction unit 243, the estimated fuel efficiency calculation unit 246, the velocity profile generation unit 244, the intersection stop judgment unit 242, and the velocity profile correction unit 245.

Next, operation is described.

Embodiment 2 is different from Embodiment 1 in that the traveling velocity generation unit 23 and the traveling fuel efficiency estimation unit 24 are mounted on the motor vehicle 1a. However, as for the operation of each unit, the traveling velocity generation unit 23 in Embodiment 1 and the traveling velocity generation unit 23 in Embodiment 2 perform similar operations, and the traveling fuel efficiency estimation unit 24 in Embodiment 1 and the traveling fuel efficiency estimation unit 24 in Embodiment 2 perform similar operations. Detailed inner operations are also similar, and therefore description of operation is omitted.

*Other Structures*

In the present embodiment, the motor vehicle device 100a having the functions of the motor vehicle device 100 and the functions of the fuel efficiency estimation device 200 described in Embodiment 1 is mounted on the motor vehicle 1a. Here, while description has been made to the case in which the motor vehicle device 100a is a single computer in FIG. 16, the structure is not limited to the structure of FIG. 16. For example, the functions corresponding to the motor vehicle device 100 and the functions corresponding to the fuel efficiency estimation device 200 may be mounted on separate vehicle-mounted devices. Also, units included in the functions corresponding to the motor vehicle device 100 and the functions corresponding to the fuel efficiency estimation device 200 may be combined in any manner and be mounted on a plurality of vehicle-mounted devices.

*Description of Effects According to Present Embodiment*

As described above, according to the fuel efficiency estimation system 500a of the present embodiment, traveling history information is accumulated for each motor vehicle and link traveling velocity is calculated for each motor vehicle, thereby estimating traveling fuel efficiency for each motor vehicle. Therefore, it is possible to estimate traveling fuel efficiency with high accuracy for each motor vehicle.

Embodiment 3

In the present embodiment, differences from Embodiments 1 and 2 are mainly described.

In the present embodiment, a structure similar to the structure described in Embodiments 1 and 2 is provided with a same reference character and its description is omitted.

*Description of Structure*

In the fuel efficiency estimation system 500 according to Embodiment 1, the motor vehicle device 100 performs the traveling history collection process and the position information collection process, and the fuel efficiency estimation device 200 as a central server performs the traveling velocity generation process and the traveling fuel efficiency estimation process. Also, in the fuel efficiency estimation system 500a according to Embodiment 2, the process of the motor vehicle device 100 and the process of the fuel efficiency estimation device 200 in Embodiment 1 are all converged into the motor vehicle 1a.

In the present embodiment, for process load distribution, a structure is taken in which separate servers are prepared for the traveling history accumulation process, the reference velocity judgment process, the traveling velocity calculation process, and the traveling fuel efficiency estimation process, respectively, among the processes of the fuel efficiency estimation device 200 for performing the processes. This allows a reduction in the amount of processing at each server, thereby making it possible to increase the processing speed. Note that the processes to be performed on a motor vehicle side are identical to those of Embodiment 1.

Figure 18:
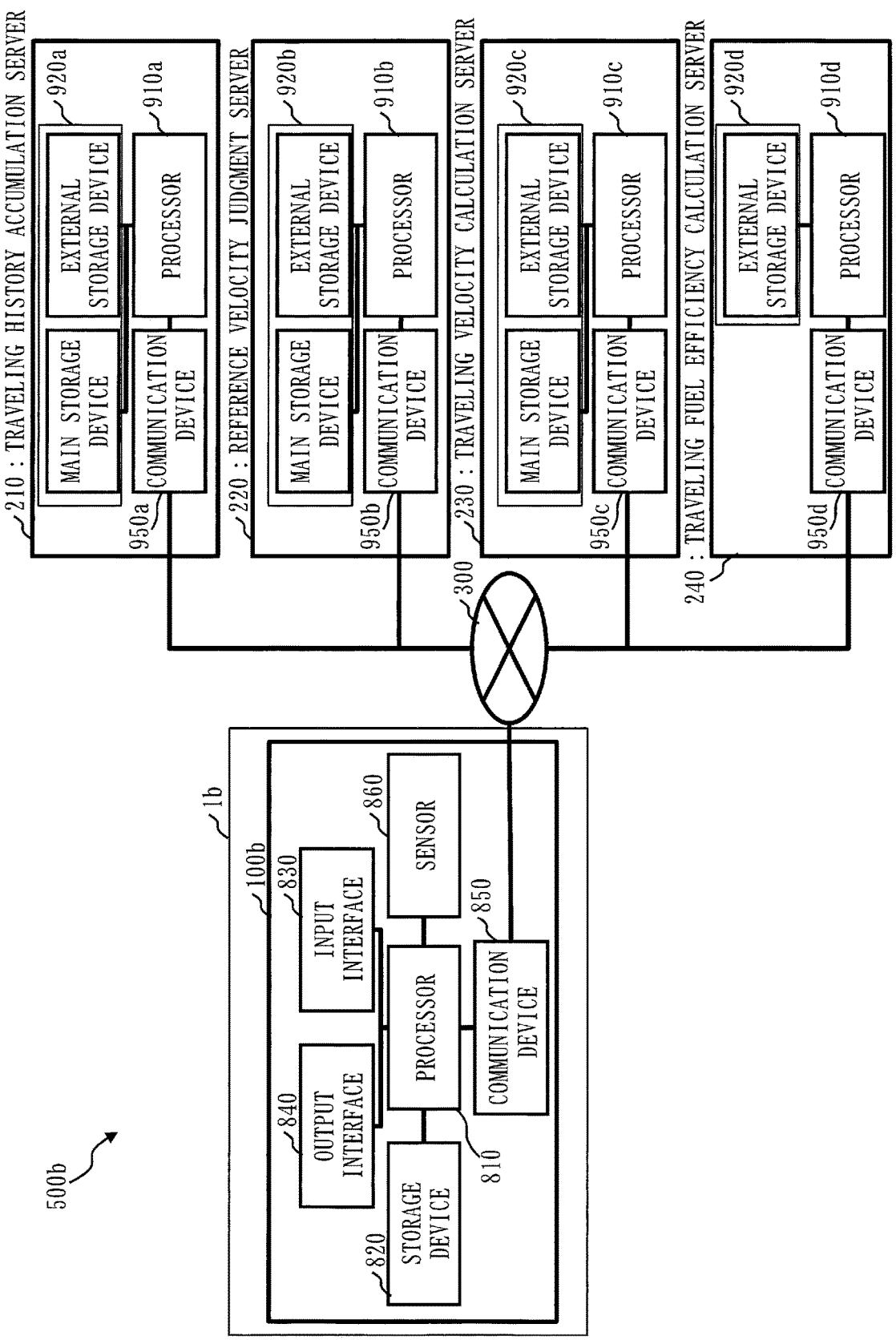
FIG. 18 illustrates a system structure of a fuel efficiency estimation system 500b according to Embodiment 3.

FIG. 18 illustrates a system structure of a fuel efficiency estimation system 500b according to the present embodiment. FIG. 18 illustrates a hardware structure of each device configuring the fuel efficiency estimation system 500b.

As illustrated in FIG. 18, the fuel efficiency estimation system 500b includes a motor vehicle 1b, a traveling history accumulation server 210, a reference velocity judgment server 220, a traveling velocity calculation server 230, and a traveling fuel efficiency calculation server 240. The motor vehicle 1b, the traveling history accumulation server 210, the reference velocity judgment server 220, the traveling velocity calculation server 230, and the traveling fuel efficiency calculation server 240 communicate via the network 300.

The traveling history accumulation server 210, the reference velocity judgment server 220, the traveling velocity calculation server 230, and the traveling fuel efficiency calculation server 240 each may be a substantial data server or may be configured in the cloud.

The hardware structure of the motor vehicle device 100b of the motor vehicle 1b is similar to that described in Embodiment 1.

Each of the traveling history accumulation server 210, the reference velocity judgment server 220, the traveling velocity calculation server 230, and the traveling fuel efficiency calculation server 240 is a computer.

The traveling history accumulation server 210, the reference velocity judgment server 220, the traveling velocity calculation server 230, and the traveling fuel efficiency calculation server 240 each include the processor 910, the storage device 920, and the communication device 950. Basic functions of the processor 910, the storage device 920, and the communication device 950 in each server are similar to those described in Embodiment 1. As illustrated in FIG. 18, the hardware pieces in each server are described as being distinguished with a subscript a, b, c, or d added to the reference numeral of each hardware piece.

The traveling history accumulation server 210 is described. A storage device 920a includes a main storage device which temporarily stores the process result regarding the traveling history accumulation process and an external storage device which stores the traveling history information. A processor 910a performs arithmetic operation process regarding the traveling history accumulation process. A communication device 950a transmits and receives the traveling history information 111 and the cartographic information 450.

The reference velocity judgment server 220 is described. A storage device 920b includes a main storage device which temporarily stores the process result regarding the process of calculation of the link reference velocity and an external storage device which stores the link reference velocity for each link. A processor 910b performs arithmetic operation process regarding generation of the link reference velocity. A communication device 950b transmits and receives the cartographic information 450 and the link reference velocity.

The traveling velocity calculation server 230 is described. A storage device 920c includes a main storage device which temporarily stores the process result regarding generation of the link traveling velocity and an external storage device which stores the link traveling velocity for each link. A processor 910c performs arithmetic operation process regarding generation of the link traveling velocity. A communication device 950c transmits and receives the traveling history information, the link reference velocity, and the link traveling velocity.

The traveling fuel efficiency calculation server 240 is described. A storage device 920d includes a main storage device which temporarily stores values and results of the respective arithmetic operation processes regarding fuel efficiency estimation. A processor 910d performs the respective arithmetic operation processes regarding fuel efficiency estimation. A communication device 950d transmits and receives the position information, the link traveling velocity, the cartographic information, and the traveling fuel efficiency information.

Figure 19:
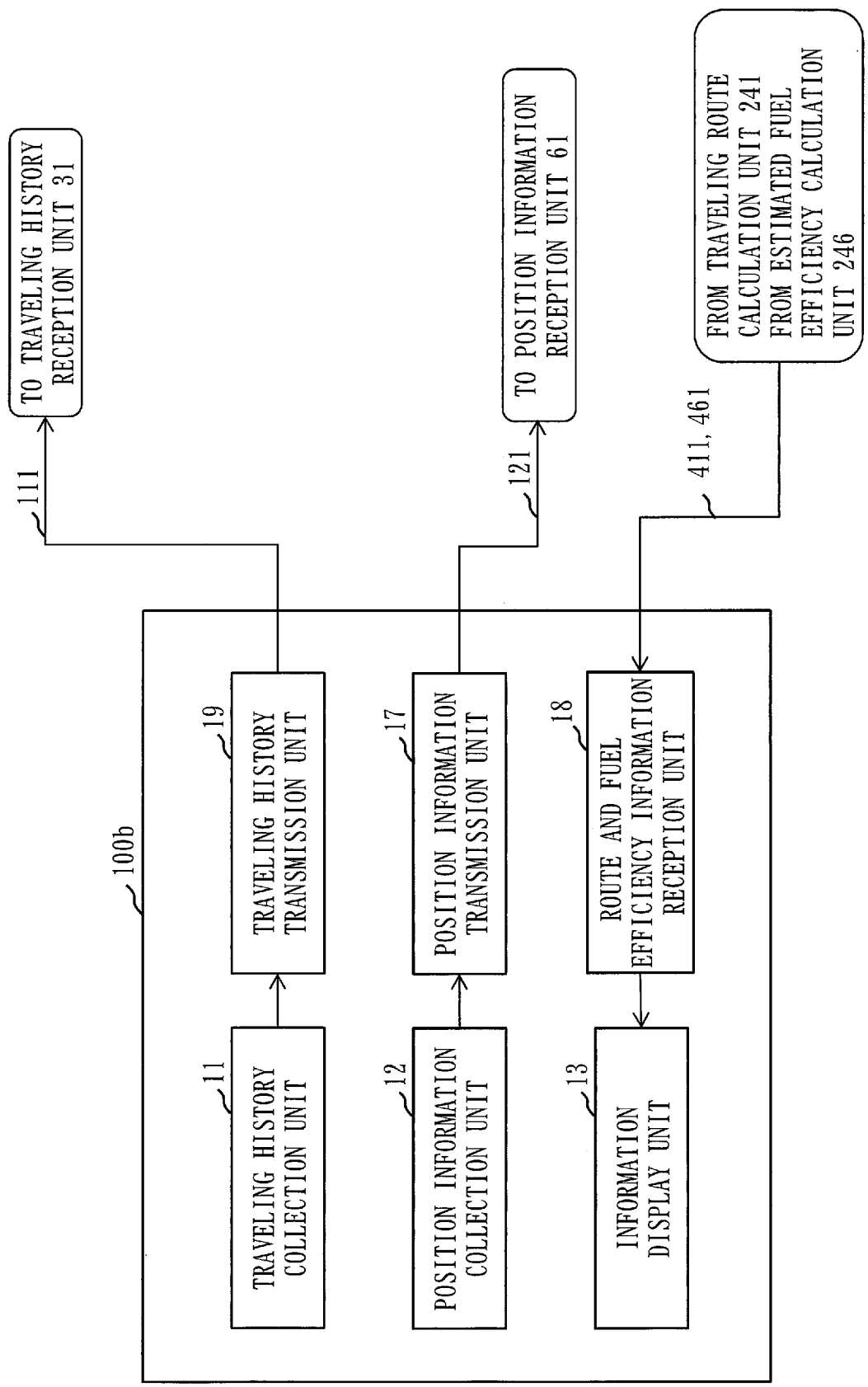
FIG. 19 illustrates a functional structure of a motor vehicle 100b according to Embodiment 3.
Figure 20:
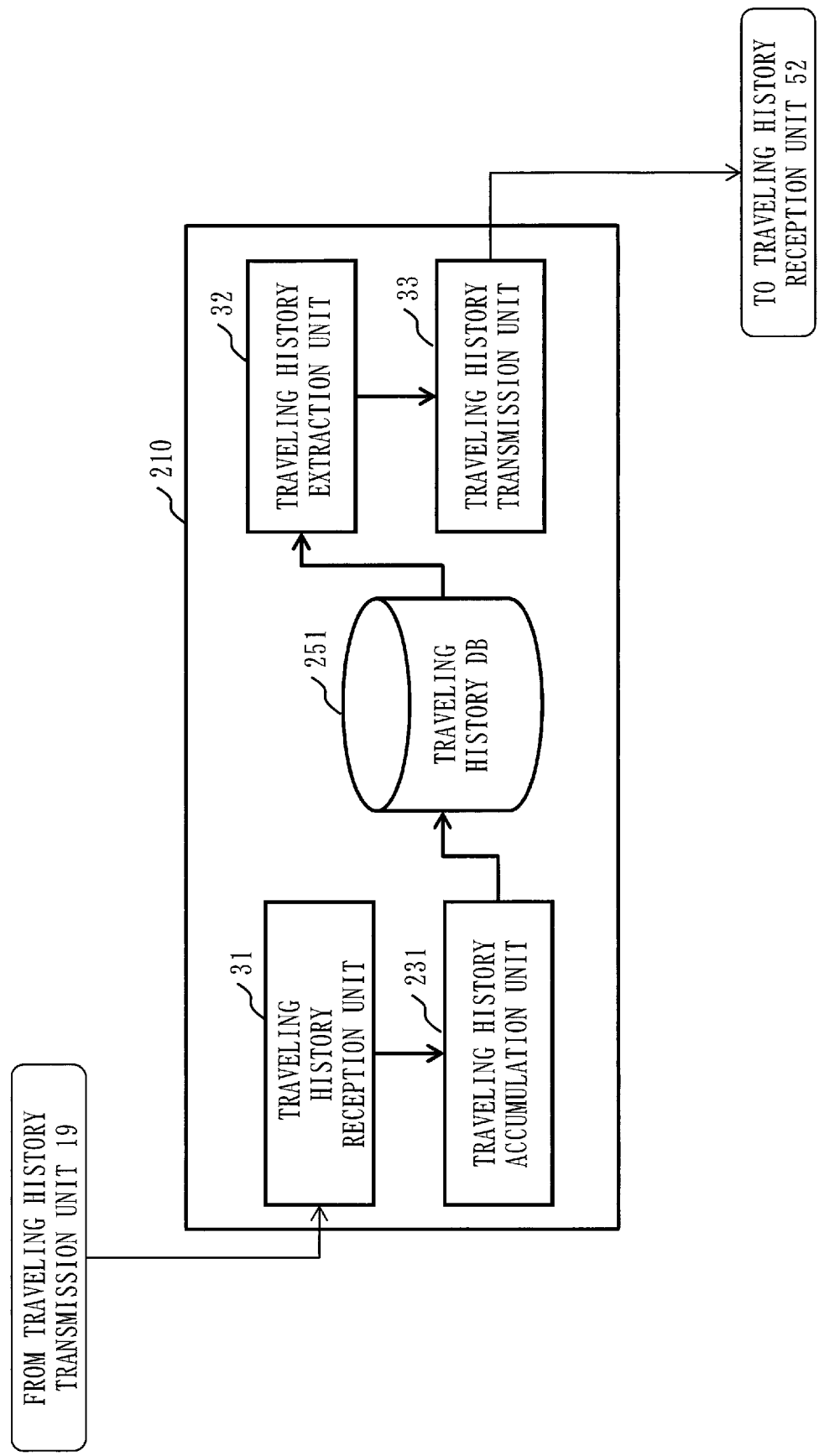
FIG. 20 illustrates a functional structure of a traveling history accumulation server 210 according to Embodiment 3.
Figure 21:
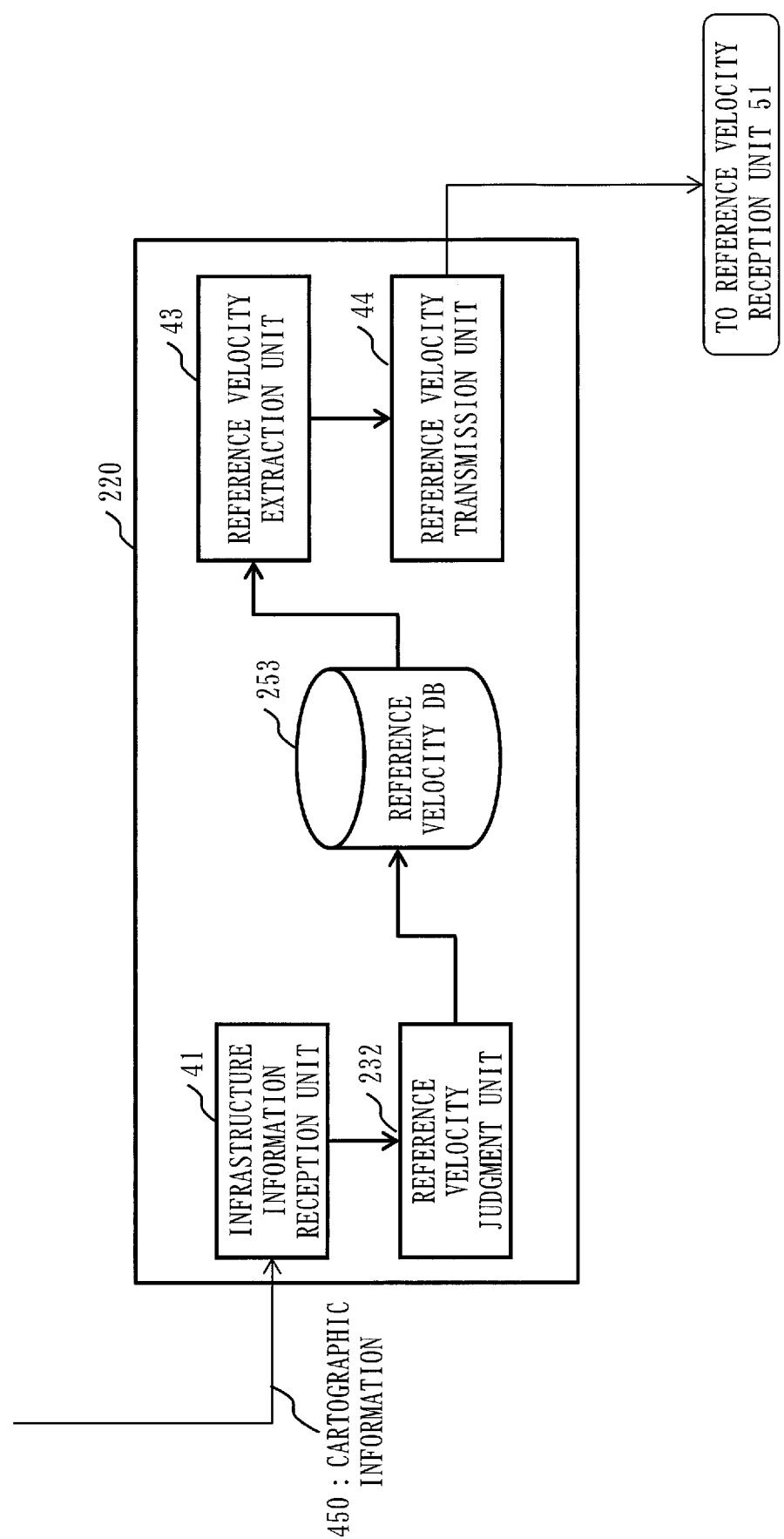
FIG. 21 illustrates a functional structure of a reference velocity judgment server 220 according to Embodiment 3.
Figure 22:
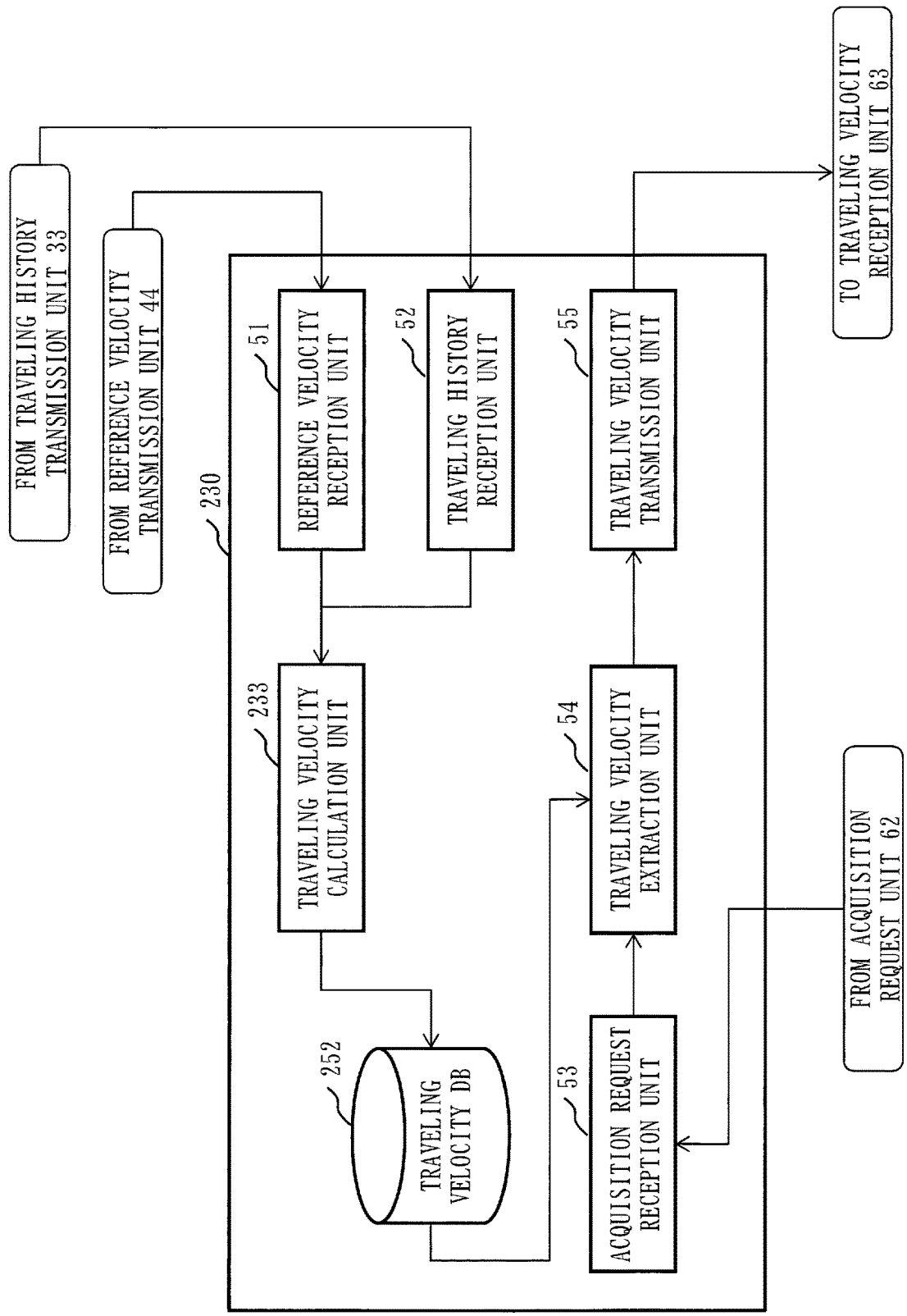
FIG. 22 illustrates a functional structure of a traveling velocity calculation server 230 according to Embodiment 3.
Figure 23:
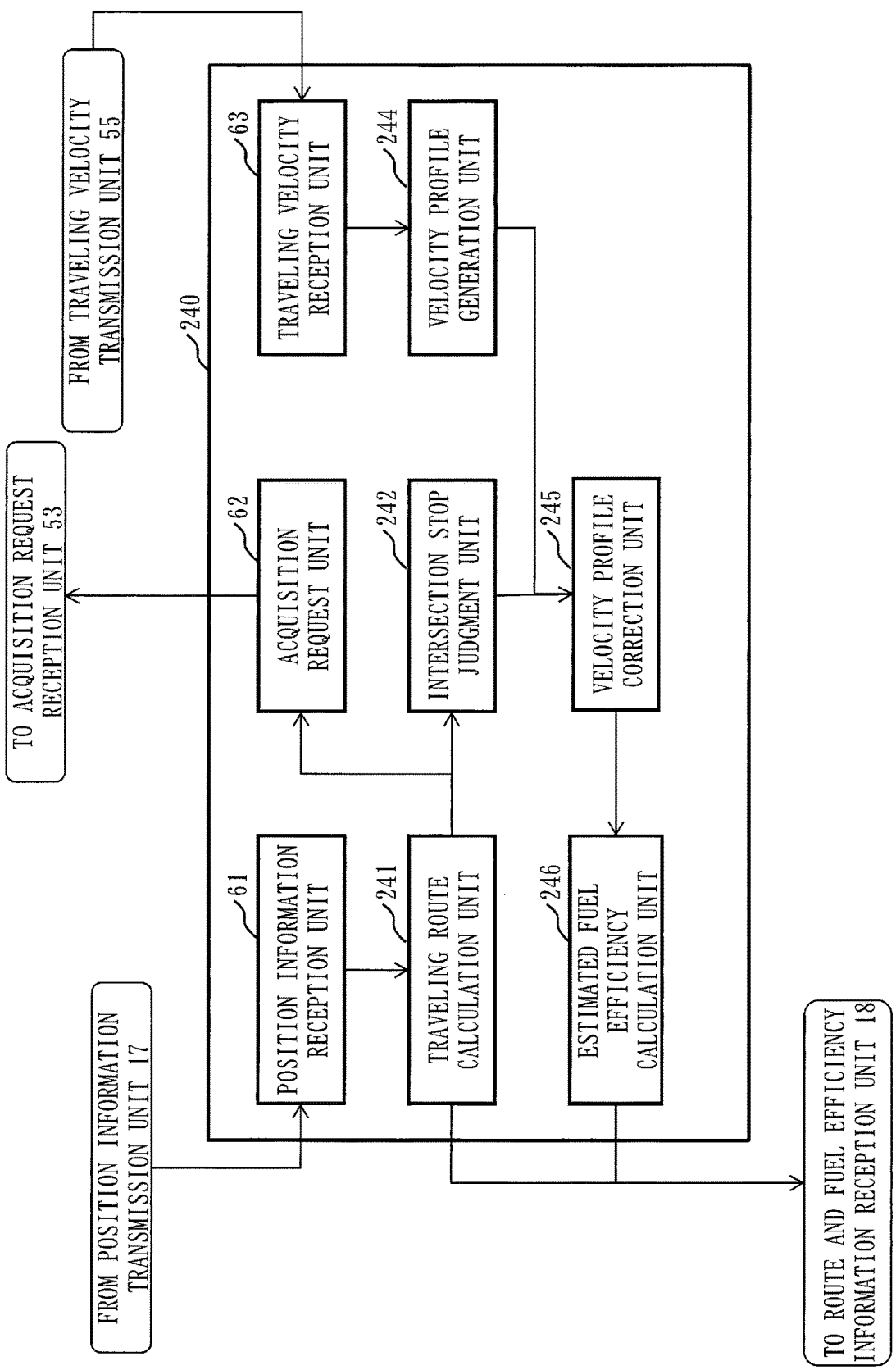
FIG. 23 illustrates a functional structure of a traveling fuel efficiency calculation server 240 according to Embodiment 3.

Also, FIG. 19 illustrates a functional structure of the motor vehicle 100b according to the present embodiment. FIG. 20 illustrates a functional structure of the traveling history accumulation server 210 according to the present embodiment. FIG. 21 illustrates a functional structure of the reference velocity judgment server 220 according to the present embodiment. FIG. 22 illustrates a functional structure of the traveling velocity calculation server 230 according to the present embodiment. FIG. 23 illustrates a functional structure of the traveling fuel efficiency calculation server 240 according to the present embodiment.

In the present embodiment, the functional structure diagram and the hardware structure diagram of each device of the fuel efficiency estimation system 500b are described as separate diagrams. However, a structure similar to the structure described in Embodiment 1 is provided with a same reference character and its description may be omitted.

The motor vehicle 1b includes the motor vehicle device 100b mounted on the motor vehicle 1b as a vehicle-mounted device. The motor vehicle device 100b includes, in addition to the traveling history collection unit 11, the position information collection unit 12, and the information display unit 13 described in Embodiment 1, a traveling history transmission unit 19, a position information transmission unit 17, and a route and fuel efficiency information reception unit 18. That is, the functions of the "units" of the motor vehicle device 100b are the functions of the traveling history collection unit 11, the position information collection unit 12, the information display unit 13, the traveling history transmission unit 19, the position information transmission unit 17, and the route and fuel efficiency information reception unit 18.

The traveling history transmission unit 19 transmits the traveling history information 111 to the traveling history accumulation server 210 via the communication device 850. The position information transmission unit 17 transmits the position information 121 including the origin and the destination to the traveling fuel efficiency calculation server 240 via the communication device 850. The route and fuel efficiency information reception unit 18 receives, via the communication device 850, the traveling route 411 and the fuel efficiency estimation result 461 calculated by the traveling fuel efficiency calculation server 240.

The traveling history accumulation server 210 includes, in addition to the traveling history accumulation unit 231 and the traveling history DB 251 described in Embodiment 1, a traveling history reception unit 31, a traveling history extraction unit 32, and a traveling history transmission unit 33. The traveling history reception unit 31 receives the traveling history information 111 transmitted from the motor vehicle 1b. The traveling history extraction unit 32 extracts necessary traveling history information 111 from the traveling history DB 251. The traveling history transmission unit 33 transmits the extracted traveling history information 111 to the traveling velocity calculation server 230.

The reference velocity judgment server 220 includes, in addition to the reference velocity judgment unit 232 and the reference velocity DB 253 described in Embodiment 1, an infrastructure information reception unit 41, a reference velocity extraction unit 43, and a reference velocity transmission unit 44. The infrastructure information reception unit 41 receives the cartographic information 450 as infrastructure information. The reference velocity extraction unit 43 extracts, from the reference velocity DB 253, the link reference velocity 321 on the link required. The reference velocity transmission unit 44 transmits the extracted link reference velocity 321 to the traveling velocity calculation server 230.

The traveling velocity calculation server 230 includes, in addition to the traveling velocity calculation unit 233 and the traveling velocity DB 252 described in Embodiment 1, a reference velocity reception unit 51, a traveling history reception unit 52, an acquisition request reception unit 53, a traveling velocity extraction unit 54, and a traveling velocity transmission unit 55. The reference velocity reception unit 51 receives the link reference velocity 321 from the reference velocity judgment server 220. The traveling history reception unit 52 receives the traveling history information 111 from the traveling history accumulation server 210. The acquisition request reception unit 53 accepts an acquisition request for the link traveling velocity 331 from the traveling fuel efficiency calculation server 240. The traveling velocity extraction unit 54 extracts, from the traveling velocity DB 252, the link traveling velocity 331 of the link requested for acquisition. The traveling velocity transmission unit 55 transmits the extracted link traveling velocity 331 to the traveling fuel efficiency calculation server 240.

The traveling fuel efficiency calculation server 240 includes the traveling route calculation unit 241, the intersection stop judgment unit 242, the velocity profile generation unit 244, the velocity profile correction unit 245, and the estimated fuel efficiency calculation unit 246 described in Embodiment 1. Also, the traveling fuel efficiency calculation server 240 includes, in addition to the above-described structure units, a position information reception unit 61, an acquisition request unit 62, and a traveling velocity reception unit 63. The position information reception unit 61 receives the position information 121 received from the motor vehicle 1b. In calculation of the velocity profile 441 indicating a change in traveling velocity on the traveling route 411, the acquisition request unit 62 requests the traveling velocity calculation server 230 for link traveling velocities for all links on the traveling route 411. The traveling velocity reception unit 63 receives the link traveling velocity acquired from the traveling velocity calculation server 230.

*Description of Operation*

Next, operation is described.

Embodiment 3 is different from Embodiment 1 and Embodiment 2 in that the traveling history accumulation process, the reference velocity judgment process, the link velocity calculation process, and the traveling fuel efficiency estimation process are performed by independent servers. Therefore, each process in each server is not required to be a synchronous process, and may be performed independently.

Figure 24:
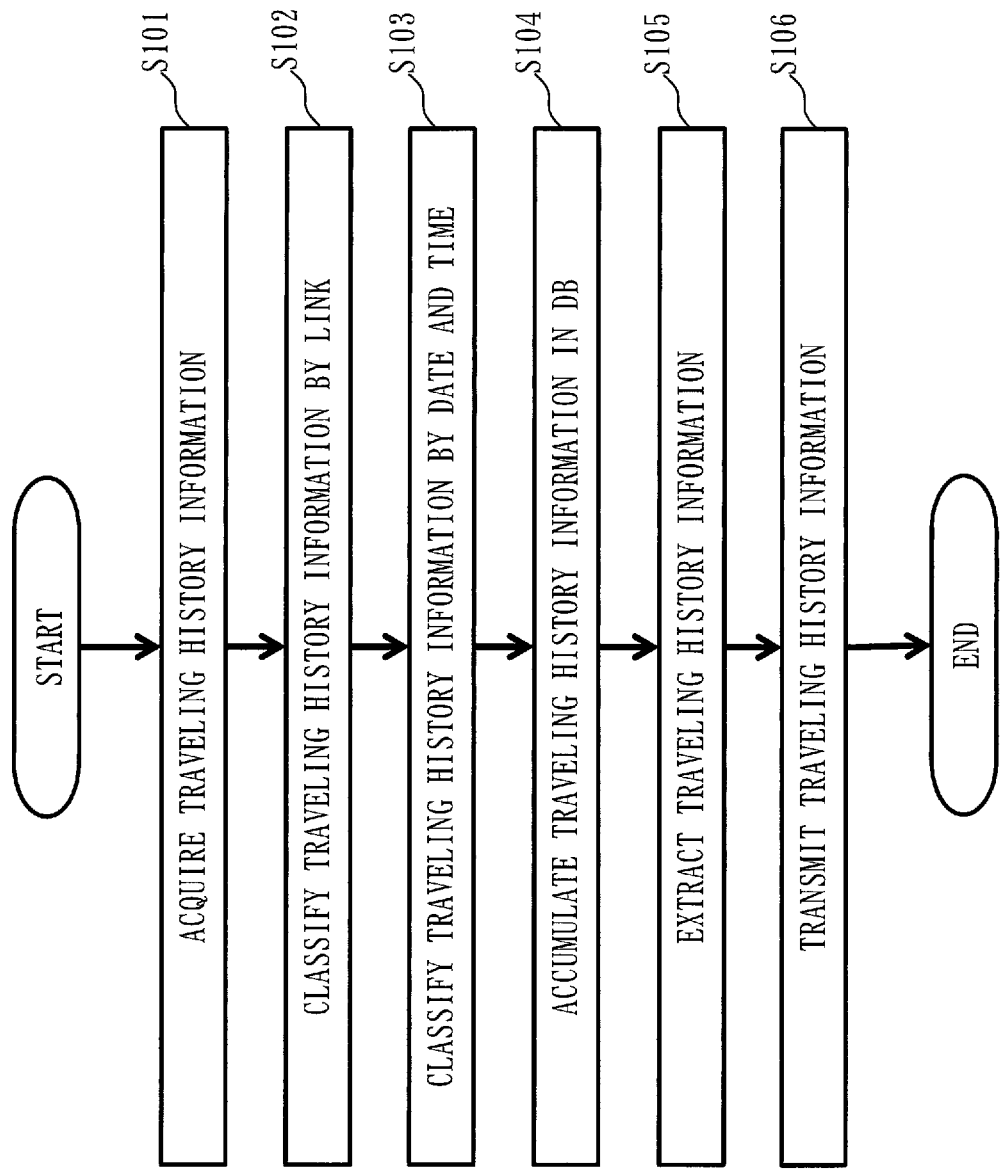
FIG. 24 is a process flowchart of the traveling history accumulation server 210 according to Embodiment 3.

FIG. 24 is a process flowchart of the traveling history accumulation server 210 according to the present embodiment.

First, the traveling history reception unit 31 acquires the traveling history information 111 (step S101). Here, it is assumed that the traveling history information 111 has at least a traveling position, traveling velocity, traveling direction, and traveling date and time information and the traveling history information 111 can be information-divided by link and by date and time. Also, the traveling history information 111 may have a traveling link, acceleration, gradient, weather at the time of traveling, road congestion situation at the time of traveling, and so forth.

Next, the traveling history accumulation unit 231 classifies the traveling history information 111 by link (step S102) and further by date and time (step S103), and stores the traveling history information 111 classified by link and by date and time in the traveling history DB 251 (step S104). The processes from step S102 to step S104 are similar to the processes at step S22 to step S24, and therefore detailed description is omitted.

Next, the traveling history extraction unit 32 extracts, from the traveling history DB 251, the traveling history information 111 to be passed to the traveling velocity calculation server 230 (step S105). Here, the traveling history information 111 may be extracted at certain intervals such as once a day or may be extracted only when a request from the traveling velocity calculation server 230 is received.

Lastly, the traveling history transmission unit 33 transmits the extracted traveling history information 111 to the traveling velocity calculation server 230 (step S106).

Figure 25:
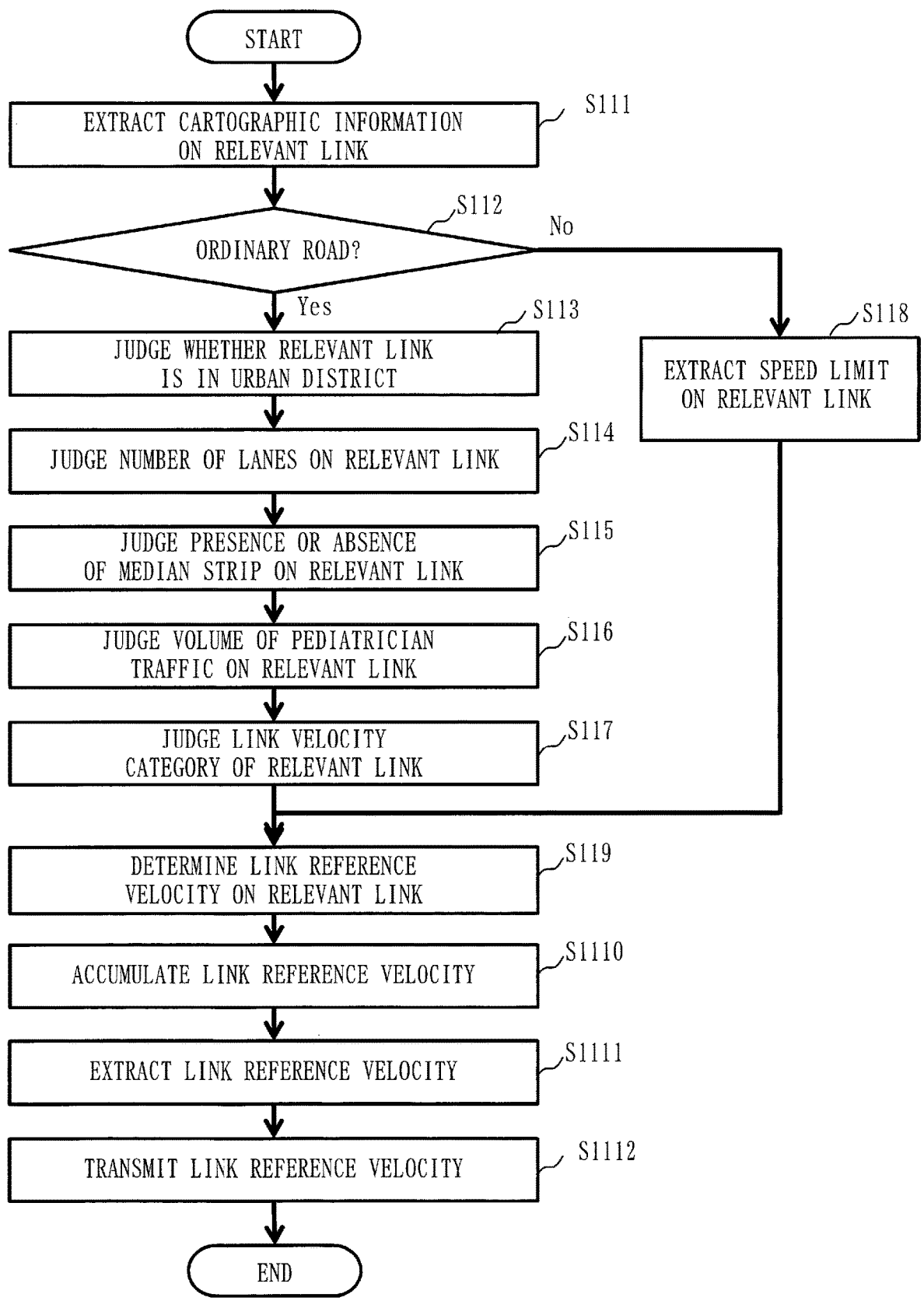
FIG. 25 is a process flowchart of the reference velocity judgment server 220 according to Embodiment 3.

FIG. 25 is a process flowchart of the reference velocity judgment server 220 according to the present embodiment.

First, the infrastructure information reception unit 41 acquires the cartographic information 450, and extracts the cartographic information 450 for the link L as a target for calculating the link reference velocity 321 (step S111). Here, from the cartographic information 450 to be extracted, information about at least a road type, the number of traveling lanes, the presence or absence of a median strip, the presence or absence of a walkway, and a site area of commercial facilities or shopping streets around the road are extracted. As for the cartographic information 450, digital cartographic information utilized by a car navigation system or the like for map display and route calculation may be used.

Next, the reference velocity judgment unit 232 judges, based on the cartographic information 450, whether the link L as a calculation target is an ordinary road (step S112). When the reference velocity judgment unit 232 judged that the link L is an ordinary road, it judges whether the location where the link L is positioned is in an urban district (step S113), the number of traveling lanes on the link L (step S114), whether a median strip is present on the road of the link L (step S115), the volume of pedestrian traffic on the link L (step S116), and the velocity category of the link L (step S117). When the reference velocity judgment unit 232 judged that the link L is not an ordinary road, it extracts the speed limit information on the link L (step S118). Based on the reference velocities in the twelve velocity categories (velocity category judgment table 60) extracted from the processes from step S113 to step S117 or the speed limit extracted from the process at step S118, the reference velocity judgment unit 232 determines the link reference velocity Vr(L) on the link L (step S119). The reference velocity judgment unit 232 accumulates the link reference velocity Vr(L) calculated at step S119 in the reference velocity DB 253 (step S1110). The processes from step S112 to step S1110 are similar to those of the processes from step S32 to step S310, and therefore detailed description is omitted.

Next, the reference velocity extraction unit 43 extracts, from the reference velocity DB 253, the link reference velocity 321 to be passed to the traveling velocity calculation server 230 (step S1111). Here, the link reference velocity 321 may be extracted at certain intervals such as once a day or may be extracted only when a request from the traveling velocity calculation server 230 is received.

Lastly, the reference velocity transmission unit 44 transmits the extracted link reference velocity 321 to the traveling velocity calculation server 230 (step S1112).

Figure 26:
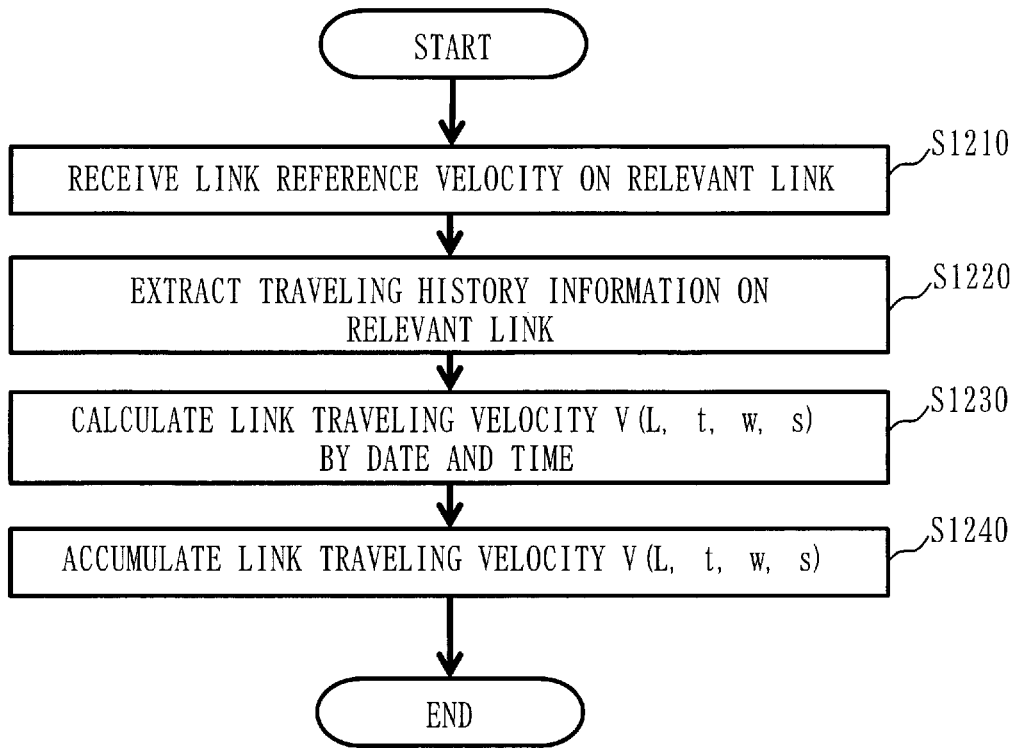
FIG. 26 is a flowchart of a traveling velocity generation process to be performed at the traveling velocity calculation server 230 according to Embodiment 3.

FIG. 26 is a flowchart of a traveling velocity generation process to be performed at the traveling velocity calculation server 230 according to the present embodiment. In the following, description is exemplarily made to calculation of the link traveling velocity 331 on the link L when the calculation date and time includes a traveling time t, a traveling day of the week w, and a traveling season s.

First, the reference velocity reception unit 51 receives the link reference velocity $V_r(L)$ on the link L (step S1210). Similarly, the traveling history reception unit 52 extracts the traveling history information 111 on the link L (step S1220). Next, the traveling velocity calculation unit 233 calculates a link traveling velocity V(L, t, w, s) on the link L by date and time (step S1230), and accumulates the link traveling velocity V(L, t, w, s) on the link L in the traveling velocity DB 252 (step S1240). The details of the processes from step S1210 to step S1240 are similar to those of the processes from step S41 to step S44, and therefore detailed description is omitted.

Figure 27:
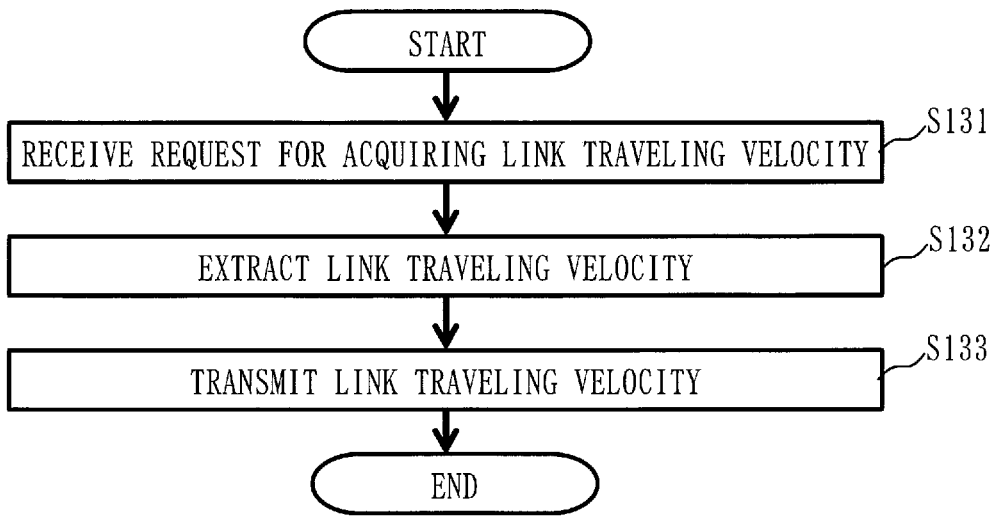
FIG. 27 is a process flowchart of a traveling velocity extraction process to be performed at the traveling velocity calculation server 230 according to Embodiment 3.

FIG. 27 is a process flowchart of a traveling velocity extraction process to be performed at the traveling velocity calculation server 230 according to the present embodiment. FIG. 27 is a flowchart of a process of extracting a link traveling velocity when the traveling velocity calculation server 230 receives an acquisition request for a link traveling velocity from the traveling fuel efficiency calculation server 240. In the following, description is exemplarily made to link traveling velocity extraction when the extraction date and time are a time t, a day of the week w, and a season s.

First, the acquisition request reception unit 53 receives an acquisition request for a link traveling velocity from the traveling fuel efficiency calculation server 240 (step S131). Also, as an acquisition request for a link traveling velocity, the acquisition request reception unit 53 can collectively receive and process acquisition requests for link traveling velocities for a plurality of links.

Next, the traveling velocity extraction unit 54 extracts, from the traveling velocity DB 252, a link traveling velocity V(L, t, w, s) for the link L at the time t, the day of the week w, and the season s (step S132).

Lastly, the traveling velocity transmission unit 55 transmits the extracted link traveling velocity V(L, t, w, s) to the traveling fuel efficiency calculation server 240 (step S133).

Figure 28:
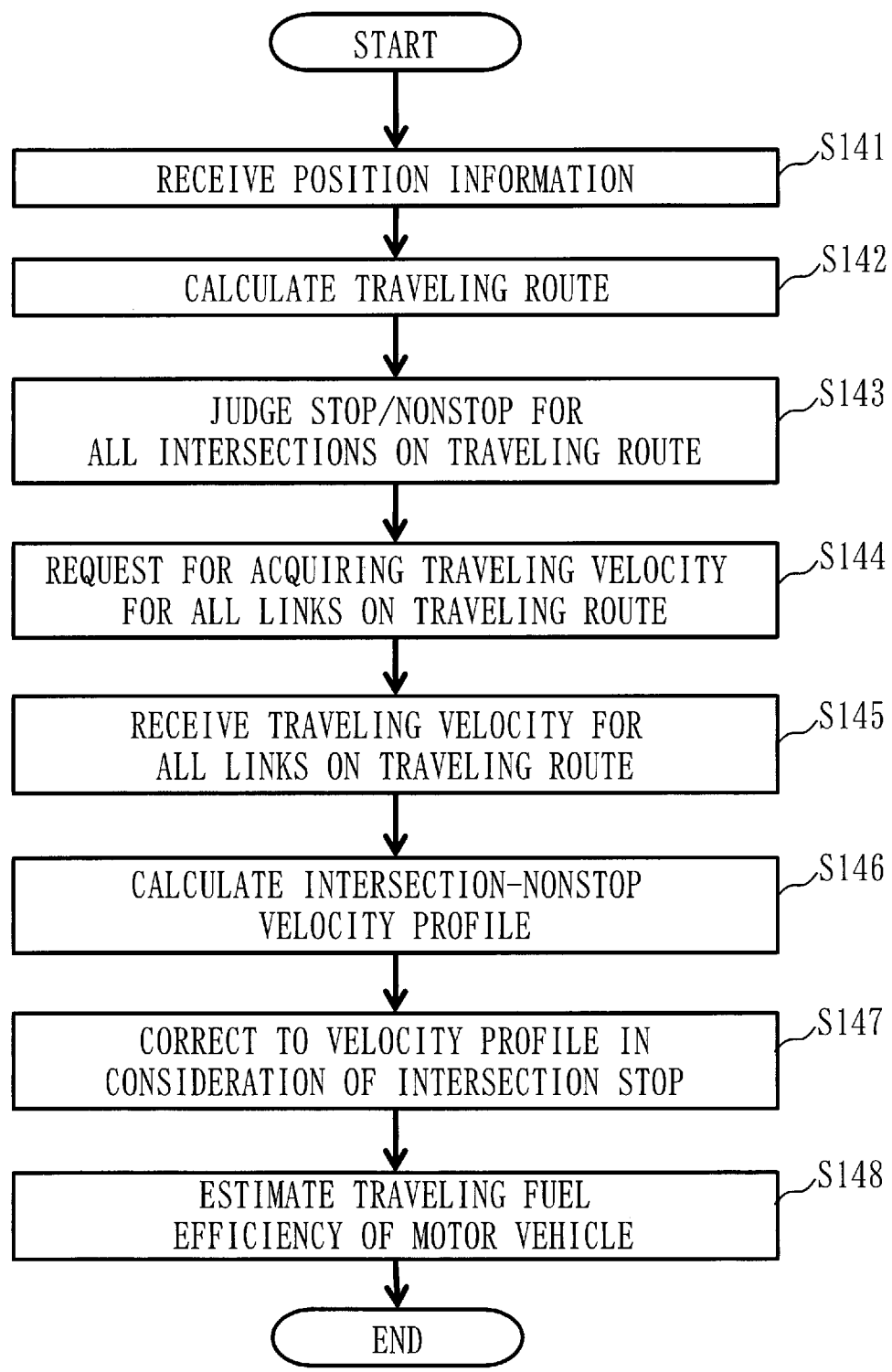
FIG. 28 is a process flowchart of the traveling fuel efficiency calculation server 240 according to Embodiment 3.

FIG. 28 is a process flowchart of the traveling fuel efficiency calculation server 240 according to the present embodiment. The process of FIG. 28 is sequentially performed when the position information reception unit 61 receives the position information 121 from the motor vehicle 1b (step S141). Note that, in the following, description is exemplarily made to the case in which a date and time (time $t_0$, day of the week $w_0$, season $s_0$) when the position information 121 is received (acquisition date and time) is taken as an estimation date and time of traveling fuel efficiency of the motor vehicle 1b.

First, the traveling route calculation unit 241 calculates a traveling route X of the motor vehicle 1b based on the position information 121 (step S142). Next, the intersection stop judgment unit 242 judges intersection stop/nonstop $S(i_1)$ to $S(i_m)$ for all intersections $i_1$ to $i_m$ on the traveling route X (step S143).

Here, the process at step S142 is similar to the process step S52 and the process at step S143 is similar to the process at step S53, and therefore detailed description is omitted.

Next, the acquisition request unit 62 requesting acquisition for the link traveling velocity requests the traveling velocity calculation server 230 for a link traveling velocity $V(L_k, t_k, w_k, s_k)$ ($1 \le k \le n$) for all passage links on the traveling route X (step S144). Next, the traveling velocity reception unit 63 receives the result of extraction of the link traveling velocity $V(L_k, t_k, w_k, s_k)$ ($1 \le k \le n$) (step S145).

Here, the operation from a time when the acquisition request unit 62 transmits the acquisition request for the link traveling velocity to the acquisition request reception unit 53 to a time when the traveling velocity reception unit 63 receives the link traveling velocity is as described in FIG. 27.

Next, the velocity profile generation unit 244 calculates the intersection-nonstop velocity profile $V_{profile-nonstop}(X)$ in traveling the traveling route X by using the link traveling velocity $V(L_k, t_k, w_k, s_k)$ ($1 \le k \le n$) received at the traveling velocity reception unit 63 (step S146). Next, for the intersection-nonstop velocity profile $V_{profile-nonstop}(X)$ calculated by the velocity profile generation unit 244, the velocity profile correction unit 245 reproduces acceleration/deceleration occurring due to intersection stop by using the intersection stop/nonstop $S(i_1)$ to $S(i_m)$ judged at the intersection stop judgment unit 242, and calculates the velocity profile $V_{profile}(X)$ in consideration of intersection stop (step S147). Lastly, for the velocity profile $V_{profile}(X)$ in consideration of intersection stop calculated by the velocity profile correction unit 245, the estimated fuel efficiency calculation unit 246 estimates the motor-vehicle traveling fuel efficiency in traveling the traveling route X by using the relational expression of fuel efficiency and traveling velocity (step S148).

Here, the process at step S146 is similar to the process at step S55, the process at step S147 is similar to the process at step S56, and the process at step S148 is similar to the process at step S57. Therefore, detailed description is omitted.

*Description of Effects According to Present Embodiment*

As described above, according to the fuel efficiency estimation system 500b of the present embodiment, the servers are distributed to allow the loads of the respective processes to be distributed. This can provide support without consideration of influences of load on another process when, for example, a large amount of traveling history information will be gathered in the future or it is desired to increase the frequency of calculation and updating of the link traveling velocity to enhance reproduction accuracy.

Embodiment 4

In the present embodiment, differences from Embodiments 1 to 3 are mainly described.

In the present embodiment, a structure similar to the structure described in Embodiments 1 to 3 is provided with a same reference character and its description is omitted.

\*\*\*Description of Structure\*\*\*

In Embodiments 1 to 3, the structure is such that processing is performed only at the motor vehicle and the central server. However, as for calculation of a link traveling velocity or the like, computation can be made for each link, and processing by edge computing can be performed.

Figure 29:
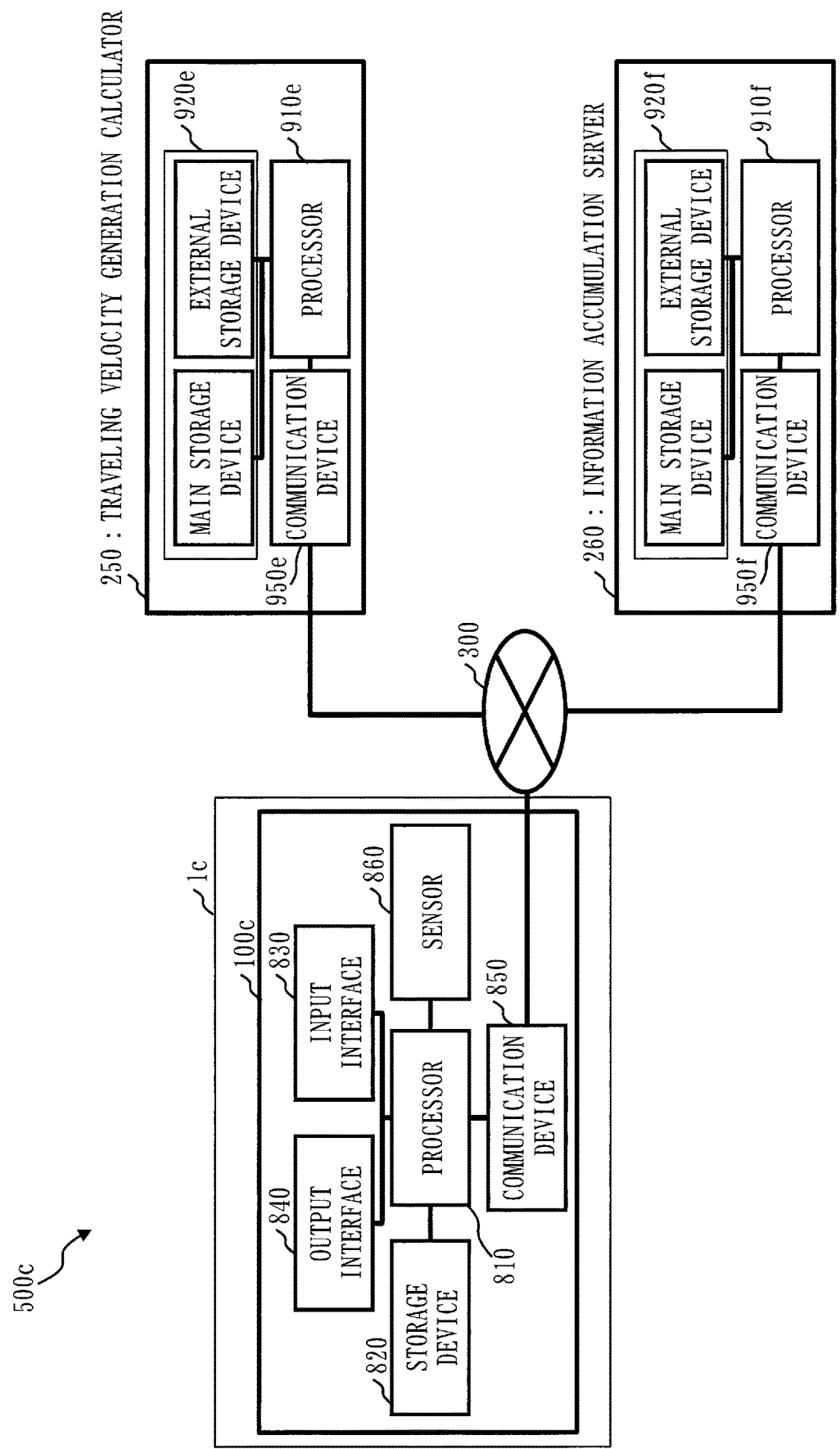
FIG. 29 illustrates a system structure of a fuel efficiency estimation system 500c according to Embodiment 4.

FIG. 29 illustrates a system structure of a fuel efficiency estimation system 500c according to the present embodiment. FIG. 29 illustrates a hardware structure of each device configuring the fuel efficiency estimation system 500c.

In FIG. 29, the fuel efficiency estimation system 500c is configured of a motor vehicle device 100c mounted on a motor vehicle 1c, a traveling velocity generation calculator 250, and an information accumulation server 260. Here, the configuration is taken in which one traveling velocity generation calculator 250 is installed at each link on the roads nationwide.

The motor vehicle device 100c, the traveling velocity generation calculator 250, and the information accumulation server 260 communicate with each other via the network 300.

Figure 30:
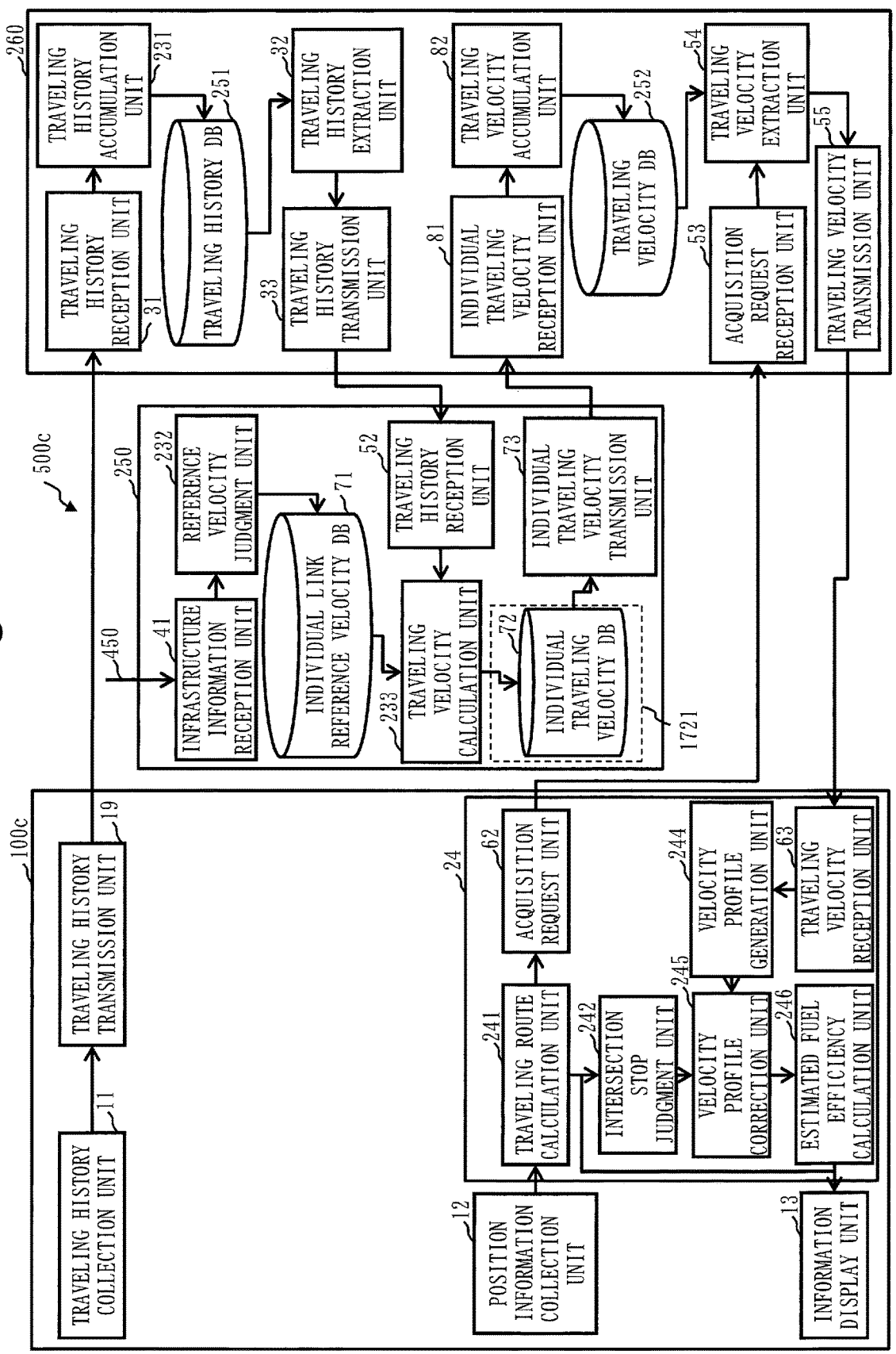
FIG. 30 illustrates a functional structure of the fuel efficiency estimation system 500c according to Embodiment 4.

FIG. 30 illustrates a functional structure of the fuel efficiency estimation system 500c according to the present embodiment.

The motor vehicle device 100c includes the traveling history collection unit 11, the position information collection unit 12, and the information display unit 13. Also, the motor vehicle device 100c includes the traveling history transmission unit 19 which transmits the traveling history information 111 to the information accumulation server 260 and the traveling fuel efficiency estimation unit 24 which calculates the traveling route 411 and estimates traveling fuel efficiency of the traveling route 411 based on the position information 121 and the cartographic information 450.

The traveling fuel efficiency estimation unit 24 includes the traveling route calculation unit 241, the intersection stop judgment unit 242, the acquisition request unit 62 which requests the information accumulation server 260 to acquire the link traveling velocities 331 for all links on the traveling route 411, and the traveling velocity reception unit 63 which receives the link traveling velocity 331 for the link requested for acquisition to the information accumulation server 260. Also, the traveling fuel efficiency estimation unit 24 includes the velocity profile generation unit 244 and the velocity profile correction unit 245 which generates the velocity profile 451 in consideration of intersection stop by adding a change in acceleration/deceleration due to intersection stop to the intersection-nonstop velocity profile 441 based on the intersection stop judgment result at all intervals on the traveling route calculated by the intersection stop judgment unit 242. Furthermore, the traveling fuel efficiency estimation unit 24 includes the estimated fuel efficiency calculation unit 246 which estimates fuel efficiency in traveling a specific route, that is, traveling the traveling route 411 based on the velocity profile 451 in consideration of intersection stop calculated by the velocity profile correction unit 245.

The traveling velocity generation calculator 250 includes the infrastructure information reception unit 41 which receives the cartographic information 450 as infrastructure information and the reference velocity judgment unit 232 which calculates the link reference velocity 321 on each individual link based on the cartographic information 450, and accumulates it in an individual link reference velocity DB 71. The individual link reference velocity DB 71 accumulates the link reference velocity 321 on each individual link. Also, the traveling velocity generation calculator 250 includes the traveling history reception unit 52 which receives the traveling history information 111 from the information accumulation server 260 and the traveling velocity calculation unit 233 which calculates the link traveling velocity 331 on each individual link from the link reference velocity 321 on each individual link and the traveling history information 111 and accumulates the link traveling velocity 331 in an individual traveling velocity DB 72. The link traveling velocity 331 on each individual link is also referred to as an individual traveling velocity. The individual traveling velocity DB 72 accumulates the link traveling velocity 331 on each individual link. The individual traveling velocity DB 72 is an example of an individual traveling velocity storage unit 1721. Also, the traveling velocity generation calculator 250 includes an individual traveling velocity transmission unit 73 which transmits the link traveling velocity 331 on each individual link to the information accumulation server 260.

The information accumulation server 260 includes the traveling history reception unit 31 which receives the traveling history information 111 transmitted from the motor vehicle device 100c, the traveling history accumulation unit 231 which accumulates the traveling history information 111 in the traveling history DB 251, and the traveling history extraction unit 32 which extracts the required traveling history information 111 from the traveling history DB 251. Also, the information accumulation server 260 includes the traveling history transmission unit 33 which transmits the extracted traveling history information 111 to the traveling velocity generation calculator 250 on each individual link and an individual traveling velocity reception unit 81 which receives the link traveling velocity 331 from the traveling velocity generation calculator 250 on each individual link. Furthermore, the information accumulation server 260 includes a traveling velocity accumulation unit 82 which accumulates the received link traveling velocity 331 in the DB and the traveling velocity DB 252 which accumulates the link traveling velocity 331 on each link. Still further, the information accumulation server 260 includes the acquisition request reception unit 53 which accepts an acquisition request for the link traveling velocity from the motor vehicle device 100c, the traveling velocity extraction unit 54 which extracts the link traveling velocity 331 on the link requested for acquisition from the traveling velocity DB 252, and the traveling velocity transmission unit 55 which transmits the extracted link traveling velocity 331 to the motor vehicle device 100c.

By using FIG. 29, the hardware structure in the present embodiment is described.

In the fuel efficiency estimation system 500c according to the present embodiment, each of the motor vehicle device 100c mounted on the motor vehicle 1c, the traveling velocity generation calculator 250, and the information accumulation server 260 is a computer. Here, one traveling velocity generation calculator 250 is held for each of the links nationwide. Also, the information accumulation server 260 may be a substantial data server or may be configured in the cloud.

The hardware structure of the motor vehicle device 100c of the motor vehicle 1c is similar to that described in Embodiments 1 to 3.

The traveling velocity generation calculator 250 and the information accumulation server 260 each include the processor 910, the storage device 920, and the communication device 950. Basic functions of the processor 910, the storage device 920, and the communication device 950 in each server are similar to those described in Embodiments 1 to 3. As illustrated in FIG. 29, the hardware pieces in each of the traveling velocity generation calculator 250 and the information accumulation server 260 are described as being distinguished with a subscript e or f added to the reference numeral of each hardware piece.

The traveling velocity generation calculator 250 is described. A storage device 920e includes a main storage device which temporarily stores the process result regarding generation of a link reference velocity and a link traveling velocity and an external storage device which stores the link reference velocity and the link traveling velocity for each link. A processor 910e performs arithmetic operation process regarding generation of a link reference velocity and a link traveling velocity. A communication device 950e transmits and receives the traveling history information, the link traveling velocity, and the cartographic information.

The information accumulation server 260 is described. A storage device 920f includes a main storage device which temporarily stores the process result regarding accumulation and extraction of traveling history information and a link traveling velocity and an external storage device which stores the traveling history information and the link traveling velocity. A processor 910f performs arithmetic operation process regarding accumulation and extraction of traveling history information and a link traveling velocity. A communication device 950f transmits and receives the traveling history information, the link traveling velocity, the cartographic information, and the acquisition request.

The motor vehicle device 100c is mounted on the motor vehicle 1c as a fuel efficiency estimation target, and includes the traveling history transmission unit 19 which transmits the traveling history information 111 indicating traveling history of the motor vehicle 1c.

Also, the traveling velocity generation calculator 250 is provided to each individual link for each of links as a plurality of road sections, and includes the traveling velocity calculation unit 233 which calculates the traveling velocity of the motor vehicle 1c on the individual link as an individual traveling velocity.

Also, the information accumulation server 260 includes the traveling history reception unit 31 which receives the traveling history information 111 from the motor vehicle device 100c, the traveling history accumulation unit 231 which accumulates the traveling history information 111 in the traveling history DB 251, and the traveling velocity accumulation unit 82 which receives an individual traveling velocity from the traveling velocity generation calculator 250 and stores the received individual traveling velocity in the traveling velocity DB 252.

And, the motor vehicle device 100c includes the traveling route calculation unit 241 which calculates the traveling route 411 based on the position information 121 including the origin and the destination, the traveling velocity reception unit 63 which receives the traveling velocity on the link included in the traveling route 411 from the information accumulation server 260, the velocity profile generation unit 244, the intersection stop judgment unit 242, the velocity profile correction unit 245, and the estimated fuel efficiency calculation unit 246.

As described above, in the present embodiment, a structure is taken in which the process of estimating traveling fuel efficiency of the motor vehicle 1c is performed on a motor vehicle side and the link traveling velocity required for estimation is acquired from the information accumulation server 260. Also, a structure is taken in which a process calculator is held for each link and the process of generating a link traveling velocity is individually performed for each link. This allows the process of generating a link traveling velocity and the process of estimating motor-vehicle traveling fuel efficiency required for improving accuracy of estimation of motor-vehicle traveling fuel efficiency and an information accumulation portion to be separated from each other to reduce a process load. In particular, with a process calculator held for each link, the process per process calculator can be reduced, and the size of the process calculator itself can be decreased.

\*\*\*Description of Operation\*\*\*

Next, the operation is described.

In the present embodiment, the traveling fuel efficiency estimation process is performed at the motor vehicle 1c, the reference velocity judgment process and the traveling velocity generation process are performed at the traveling velocity generation calculator 250, and the traveling history accumulation process and the traveling velocity accumulation process are performed at the information accumulation server 260. The operation of each device may be performed independently from one another.

The traveling history accumulation process in the information accumulation server 260 is performed by the traveling history reception unit 31, the traveling history accumulation unit 231, the traveling history DB 251, the traveling history extraction unit 32, and the traveling history transmission unit 33 of the information accumulation server 260. The present process is similar to the process of the traveling history accumulation server 210 in Embodiment 3 illustrated in FIG. 17, and therefore its description is omitted.

Figure 31:
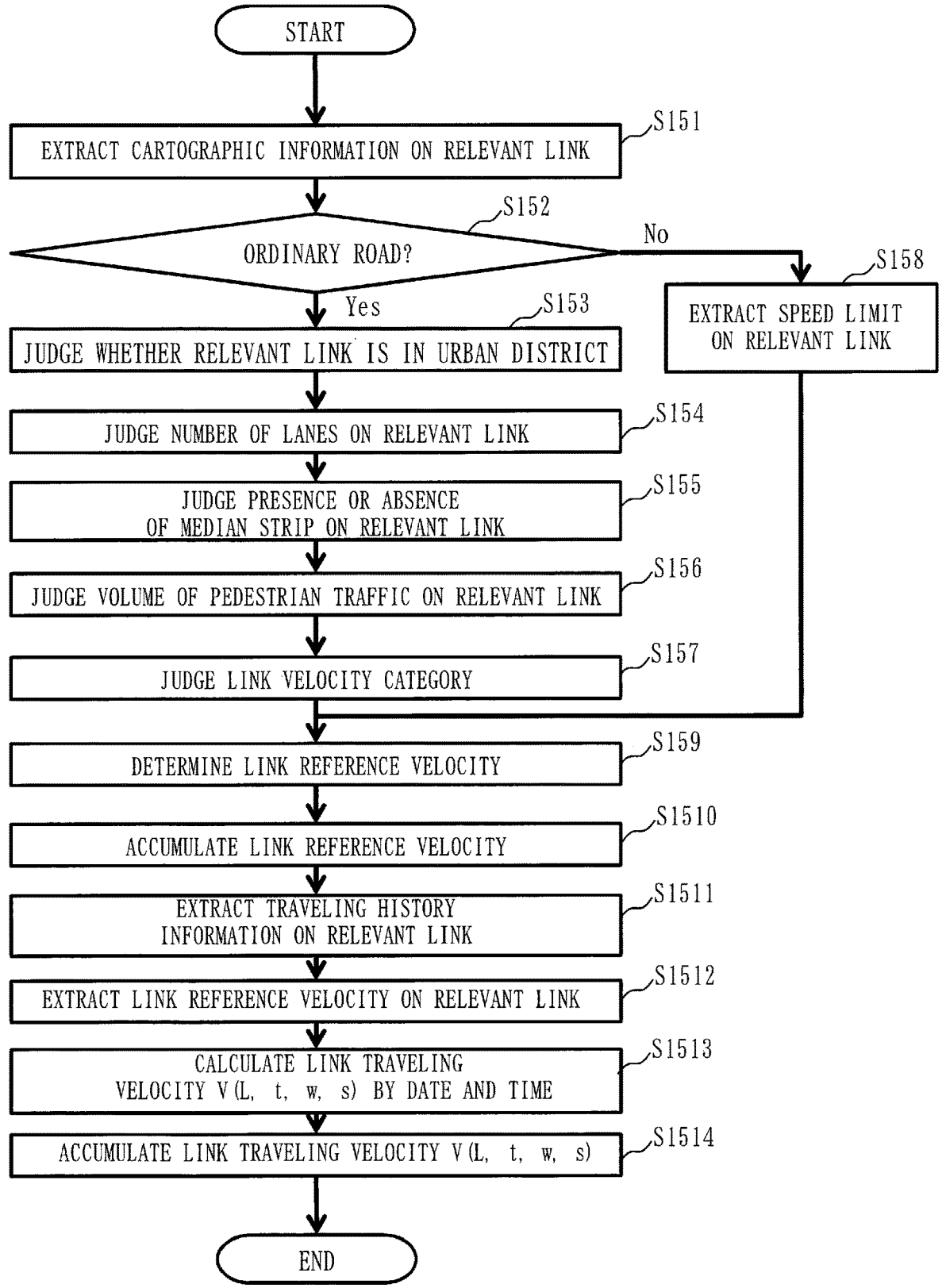
FIG. 31 is a process flowchart of a traveling velocity generation calculator 250 according to Embodiment 4.

FIG. 31 is a process flowchart of the traveling velocity generation calculator 250 according to the present embodiment.

First, the infrastructure information reception unit 41 acquires the cartographic information 450 and extracts the cartographic information 450 for the link L as a target for judgment of the link reference velocity 321 (step S151). Here, the cartographic information 450 to be extracted includes information about at least a road type, the number of traveling lanes, the presence or absence of a median strip, the presence or absence of a walkway, and a site area of commercial facilities or shopping streets around the road. As the cartographic information 450, digital cartographic information being utilized by a car navigation system or the like for map display and route calculation may be used.

Next, the reference velocity judgment unit 232 judges, based on the cartographic information 450, whether the link L as a calculation target is an ordinary road (step S152). When the reference velocity judgment unit 232 judged that the link L is an ordinary road, it judges whether the location where the link L is positioned is in an urban district (step S153), the number of traveling lanes on the link L (step S154), whether a median strip is present on the road of the link L (step S155), the volume of pedestrian traffic on the link L (step S156), and the velocity category for the link L (step S157). When the reference velocity judgment unit 232 judged that the link L is not an ordinary road, it extracts the speed limit on the link L (step S158). Based on the reference velocities in the twelve velocity categories (velocity category judgment table 60) extracted from the processes from step S153 to step S157 or the speed limit extracted from the process at step S158, the reference velocity judgment unit 232 determines the link reference velocity $V_r(L)$ on the link L (step S159). The reference velocity judgment unit 232 accumulates the link reference velocity $V_r(L)$ calculated at step S159 in the individual link reference velocity DB 71 (step S1510). The processes from step S152 to step S1510 are similar to the processes at step S32 to step S310, and therefore detailed description is omitted.

Next, the traveling history reception unit 52 extracts the traveling history information 111 on the link L from the information accumulation server 260 (step S1511). The process at step S1511 is similar to the process at step S42, and therefore detailed description is omitted.

Next, the traveling velocity calculation unit 233 extracts a link reference velocity $V_r(L)$ on the link L from the individual link reference velocity DB 71 (step S1512), calculates a link traveling velocity V(L, t, w, s) on the link L by date and time (step S1513), and accumulates the link traveling velocity V(L, t, w, s) on the link L in the individual traveling velocity DB 72 (step S1514). The details of the processes from step S1512 to step S1514 are similar to those of the processes at step S41, step S43, and step S44, and therefore detailed description is omitted.

Figure 32:
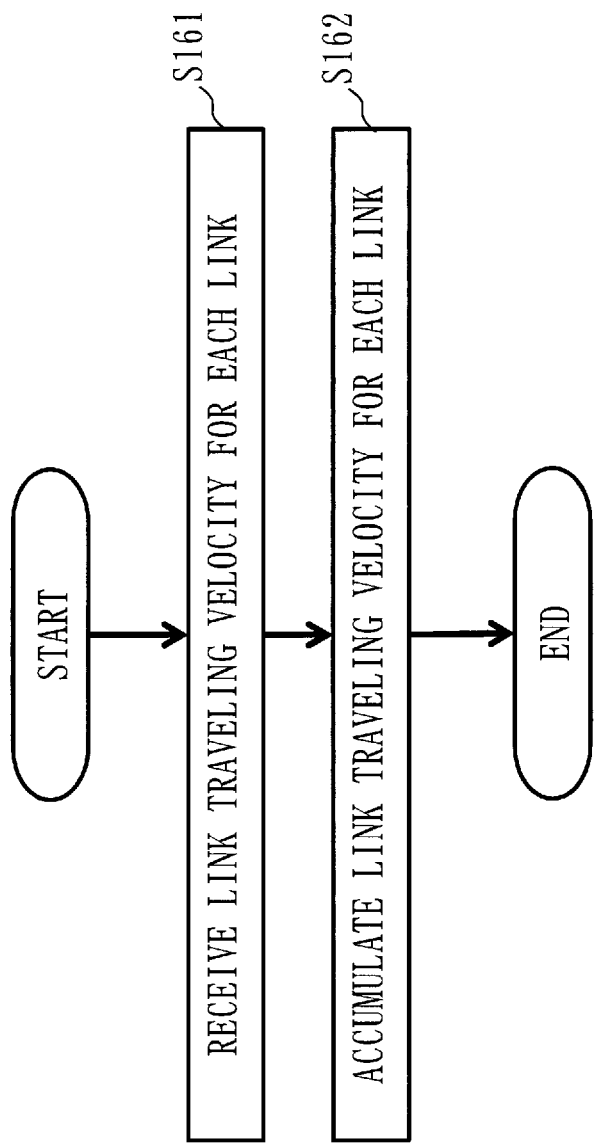
FIG. 32 is a process flowchart of a traveling velocity accumulation process to be performed at an information accumulation server 260 according to Embodiment 4.

FIG. 32 is a process flowchart of the traveling velocity accumulation process to be performed at the information accumulation server 260 according to the present embodiment.

First, the individual traveling velocity reception unit 81 receives the link traveling velocity 331 calculated for each link (step S161). Next, the traveling velocity accumulation unit 82 accumulates the received link traveling velocity 331 in the traveling velocity DB 252 (step S162). Here, the traveling velocity accumulation unit 82 performs accumulation of information in the traveling velocity DB 252 at every timing when the individual traveling velocity reception unit 81 receives the link traveling velocity 331.

The traveling fuel efficiency estimation process at the motor vehicle 1c is performed at the traveling fuel efficiency estimation unit 24. The present process is sequentially performed when the position information collection unit 12 receives the position information 121 including the origin and the destination from the driver. The processes after those of the traveling fuel efficiency estimation unit 24 are similar to the processes of the traveling fuel efficiency calculation server 240 in Embodiment 3, and therefore description is omitted.

\*\*\*Description of Effects According to Present Embodiment\*\*\*

As described above, according to the fuel efficiency estimation system 500c of the present embodiment, the process calculator is installed for each link to allow the processes to be distributed. This allows the process at each process unit to be minimized, and the process load at one calculator can be reduced.

While Embodiments 1 to 4 of the present invention have been described in the foregoing, among the "units" in the description of these embodiments, only one may be adopted, or any combination of several units may be adopted. That is, any functional block of the fuel efficiency estimation system that can achieve the function described in the above embodiments can be taken. The fuel efficiency estimation system may be configured by any combination of these functional blocks or by any functional blocks.

Also, while Embodiments 1 to 4 have been described, a plurality of embodiments among these embodiments may be combined for implementation. Also, among these embodiments, a plurality of portions may be combined for implementation. Alternatively, among these embodiments, one portion may be implemented. In addition, the details of these embodiments may be entirely or partially implemented in any combination.

Note that the above embodiments are intrinsically preferable examples, are not intended to limit the scope of the present invention, its applications, and its use purposes, and can be variously modified as required. The above embodiments are to help understanding the present scheme and are not to limit the invention.

REFERENCE SIGNS LIST 1, 1a, 1b, 1c: motor vehicle; 60: velocity category judgment table; 100, 100a, 100b, 100c: motor vehicle device; 11: traveling history collection unit; 12: position information collection unit; 13: information display unit; 14: information transmission unit; 15: information reception unit; 16: storage unit; 17: position information transmission unit; 18: route and fuel efficiency information reception unit; 19: traveling history transmission unit; 111: traveling history information; 121: position information; 411: traveling route; 450: cartographic information; 461: fuel efficiency estimation result; 210: traveling history accumulation server; 31: traveling history reception unit; 32: traveling history extraction unit; 33: traveling history transmission unit; 220: reference velocity judgment server; 41: infrastructure information reception unit; 43: reference velocity extraction unit; 44: reference velocity transmission unit; 230: traveling velocity calculation server; 51: reference velocity reception unit; 52: traveling history reception unit; 53: acquisition request reception unit; 54: traveling velocity extraction unit; 55: traveling velocity transmission unit; 240: traveling fuel efficiency calculation server; 61: position information reception unit; 62: acquisition request unit; 63: traveling velocity reception unit; 250: traveling velocity generation calculator; 71: individual link reference velocity DB; 72: individual traveling velocity DB; 73: individual traveling velocity transmission unit; 260: information accumulation server; 81: individual traveling velocity reception unit; 82: traveling velocity accumulation unit; 200: fuel efficiency estimation device; 21: information reception unit; 22: information transmission unit; 23: traveling velocity generation unit; 24: traveling fuel efficiency estimation unit; 25: storage unit; 231: traveling history accumulation unit; 232: reference velocity judgment unit; 233: traveling velocity calculation unit; 321: link reference velocity; 331: link traveling velocity; 241: traveling route calculation unit; 242: intersection stop judgment unit; 243: traveling velocity extraction unit; 244: velocity profile generation unit; 245: velocity profile correction unit; 246: estimated fuel efficiency calculation unit; 421: intersection stop judgment; 441, 451: velocity profile; 251: traveling history DB; 252: traveling velocity DB; 253: reference velocity DB; 300: network; 500, 500a, 500b, 500c: fuel efficiency estimation system; 510: fuel efficiency estimation method; 520: fuel efficiency estimation program; 809, 909: processing circuit; 810, 910, 910a, 910b, 910c, 910d, 910e, 910f: processor; 820, 920, 920a, 920b, 920c, 920d, 920e, 920f: storage device; 830: input interface; 840: output interface; 850, 950, 950a, 950b, 950c, 950d, 950e, 950f: communication device; 860: sensor; S110: traveling velocity generation process; S120: traveling fuel efficiency estimation process; S121: traveling velocity extraction process; S122: velocity profile generation process; S123: estimated fuel efficiency calculation process; 1721: individual traveling velocity storage unit; 2510: traveling history storage unit; 2520: traveling velocity storage unit; 2530: reference velocity storage unit.

The invention claimed is:

1. A fuel efficiency estimation system comprising:
processing circuitry
to calculate a traveling velocity of a motor vehicle for each of a plurality of road sections configuring a road and to store the calculated traveling velocity in a storage device;
to extract, based on traveling route information indicating a traveling route on the road, the calculated traveling velocity in a road section included in the traveling route from the storage device;
to generate a velocity profile indicating a change in velocity of the motor vehicle traveling the traveling route by using the extracted traveling velocity; and
to calculate fuel efficiency of the motor vehicle traveling the traveling route based on the velocity profile, wherein
the processing circuitry determines a reference velocity previously defined for each of the plurality of road sections based on a velocity category judgment table including a velocity category determined based on a road attribute as an attribute of the road section, calculates an actual traveling velocity for each of the plurality of road sections based on traveling history information for each of the plurality of road sections collected from the motor vehicle traveling the road, adds the reference velocity and the actual traveling velocity together by using a coefficient indicating an importance ratio between the reference velocity and the actual traveling velocity, and wherein the addition result and the coefficient are used to calculate the traveling velocity for each of the plurality of road sections.

2. The fuel efficiency estimation system according to claim 1, wherein
the processing circuitry determines the reference velocity by judging an attribute of a region, a number of lanes, presence or absence of a median strip, and a volume of pedestrian traffic as road attributes for each of the plurality of road sections and matching the judgment result and the velocity category judgment table.

3. The fuel efficiency estimation system according to claim 1, wherein
the processing circuitry stores the traveling velocity for each of the plurality of road sections in the storage device for each of date and time attributes as attributes of date and time.

4. The fuel efficiency estimation system according to claim 1, wherein the processing circuitry
judges stop/nonstop at an intersection included in the traveling route, and
corrects the velocity profile based on the stop/nonstop at the intersection.

5. The fuel efficiency estimation system according to claim 4, wherein the processing circuitry
acquires the traveling route information, and
generates, based on an acquisition date and time when the traveling route information has been acquired and the traveling velocity for each of the road sections configuring the traveling route, the velocity profile when traveling the traveling route with date and time attributes of the acquisition date and time.

6. The fuel efficiency estimation system according to claim 5, wherein
the processing circuitry calculates, for each of the road sections configuring the traveling route, an inflow date and time of inflow to the road section based on a date and time of inflow to a previous road section to be traveled before traveling the road section and a traveling time when traveling the previous road section, and extracts a traveling velocity in the road section based on the inflow date and time of inflow to the road section.

7. The fuel efficiency estimation system according to claim 4, comprising:
a motor vehicle device mounted on the motor vehicle as a fuel efficiency estimation target and a fuel efficiency estimation device to communicate with the motor vehicle device, wherein
the processing circuitry of the motor vehicle device transmits position information including an origin and a destination of the traveling route and the traveling history information indicating traveling history of the motor vehicle to the fuel efficiency estimation device, and
the processing circuitry of the fuel efficiency estimation device
calculates the traveling route based on the position information and outputs the traveling route information indicating the traveling route, and
accumulates the traveling history information.

8. The fuel efficiency estimation system according to claim 7, wherein the processing circuitry of the fuel efficiency estimation device
calculates the traveling velocity of the motor vehicle for each of the plurality of road sections configuring the road and stores the calculated traveling velocity,
extracts, based on the traveling route information indicating the traveling route on the road, the traveling velocity in the road section included in the traveling route,
generates the velocity profile indicating the change in velocity of the motor vehicle traveling the traveling route by using the extracted traveling velocity,
judges the stop/nonstop at the intersection included in the traveling route,
corrects the velocity profile based on the stop/nonstop at the intersection, and
calculates the fuel efficiency of the motor vehicle traveling the traveling route based on the velocity profile.

9. The fuel efficiency estimation system according to claim 4, comprising:
a motor vehicle device mounted on the motor vehicle as the fuel efficiency estimation target, wherein
the processing circuitry of the motor vehicle device
calculates the traveling velocity of the motor vehicle for each of the plurality of road sections configuring the road and stores the calculated traveling velocity,
extracts, based on the traveling route information indicating the traveling route on the road, the traveling velocity in the road section included in the traveling route,
calculates the fuel efficiency of the motor vehicle traveling the traveling route based on the velocity profile,
generates the velocity profile indicating the change in velocity of the motor vehicle traveling the traveling route by using the extracted traveling velocity,
judges the stop/nonstop at the intersection included in the traveling route, and
corrects the velocity profile based on the stop/nonstop at the intersection.

10. The fuel efficiency estimation system according to claim 4, comprising:

a motor vehicle device mounted on the motor vehicle as a fuel efficiency estimation target, the processing circuitry of the motor vehicle device transmitting position information including an origin and a destination of the traveling route and the traveling history information indicating traveling history of the motor vehicle;

a traveling history accumulation server, the processing circuitry of the traveling history accumulation server receiving the traveling history information from the motor vehicle device and accumulating the traveling history information;

a reference velocity judgment server, the processing circuitry of the reference velocity judgment server judging the reference velocity and storing the judged reference velocity;

a traveling velocity calculation server, the processing circuitry of the traveling velocity calculation server receiving the traveling history information from the traveling history accumulation server, receiving the reference velocity from the reference velocity judgment server, and storing the calculated traveling velocity in the storage device; and a traveling fuel efficiency calculation server, the processing circuitry of the traveling fuel efficiency calculation server receiving the position information from the motor vehicle device, receiving the traveling velocity in a road section included in the traveling route from the traveling velocity calculation server, calculating the fuel efficiency of the motor vehicle traveling the traveling route based on the velocity profile, generating the velocity profile indicating the change in velocity of the motor vehicle traveling the traveling route by using the extracted traveling velocity, judging the stop/nonstop at the intersection included in the traveling route, and correcting the velocity profile based on the stop/nonstop at the intersection.

11. The fuel efficiency estimation system according to claim 4, comprising:

a motor vehicle device mounted on the motor vehicle as a fuel efficiency estimation target, the processing circuitry of the motor vehicle device transmitting the traveling history information indicating traveling history of the motor vehicle;

a traveling velocity generation calculator provided in an individual road section for each of the plurality of road sections, the processing circuitry of the traveling velocity generation calculator calculating a traveling velocity of the motor vehicle in the individual road section as an individual traveling velocity; and an information accumulation server to receive the traveling history information from the motor vehicle device, to accumulate the traveling history information, and to receive the individual traveling velocity from the traveling velocity generation calculator and to store the received individual traveling velocity in the storage device.

12. The fuel efficiency estimation system according to claim 11, wherein the processing circuitry of the motor vehicle device calculates the traveling route based on position information including an origin and a destination, receives the traveling velocity in a road section included in the traveling route from the information accumulation server, generates the velocity profile indicating the change in velocity of the motor vehicle traveling the traveling route by using the extracted traveling velocity, judges the stop/nonstop at the intersection included in the traveling route, corrects the velocity profile based on the stop/nonstop at the intersection, and calculates the fuel efficiency of the motor vehicle traveling the traveling route based on the velocity profile.

13. A fuel efficiency estimation method comprising:

determining, based on a velocity category judgment table including a velocity category determined based on a road attribute for each of a plurality of road sections configuring a road, a reference velocity previously defined for each of the plurality of road sections, calculating an actual traveling velocity for each of the plurality of road sections based on traveling history information for each of the plurality of road sections collected from the motor vehicle traveling the road, adding the reference velocity and the actual traveling velocity together by using a coefficient indicating an importance ratio between the reference velocity and the actual traveling velocity, calculating a traveling velocity of a motor vehicle for each of the plurality of road sections by using the addition result and the coefficient, and storing the calculated traveling velocity in a storage device;

extracting, based on traveling route information indicating a traveling route on the road, a traveling velocity in a road section included in the traveling route from the storage device;

generating a velocity profile indicating a change in velocity of the motor vehicle traveling the traveling route by using the traveling velocity; and calculating fuel efficiency of the motor vehicle traveling the traveling route based on the velocity profile.

14. A non-transitory computer readable medium storing a fuel efficiency estimation program that causes a computer to execute:

a traveling velocity generation process of determining, based on a velocity category judgment table including a velocity category determined based on a road attribute for each of a plurality of road sections configuring a road, a reference velocity previously defined for each of the plurality of road sections, calculating an actual traveling velocity for each of the plurality of road sections based on traveling history information for each of the plurality of road sections collected from the motor vehicle traveling the road, adding the reference velocity and the actual traveling velocity together by using a coefficient indicating an importance ratio between the reference velocity and the actual traveling velocity, calculating a traveling velocity of a motor vehicle for each of the plurality of road sections by using the addition result and the coefficient, and storing the calculated traveling velocity in a storage device;

a traveling velocity extraction process of extracting, based on traveling route information indicating a traveling route on the road, the calculated traveling velocity in a road section included in the traveling route from the storage device;

a velocity profile generation process of generating a velocity profile indicating a change in velocity of the motor vehicle traveling the traveling route by using the traveling velocity extracted by the traveling velocity extraction process; and an estimated fuel efficiency calculation process of calculating fuel efficiency of the motor vehicle traveling the traveling route based on the velocity profile.

* * * * *